(12) United States Patent
Landers et al.

(10) Patent No.: US 12,551,885 B2
(45) Date of Patent: Feb. 17, 2026

(54) STORAGE OF CORROSIVE MATERIALS ON A FIBER-BASED FLUIDIC DEVICE AND RELATED METHODS THEREOF

(71) Applicant: University of Virginia Patent Foundation, Charlottesville, VA (US)

(72) Inventors: James P. Landers, Charlottesville, VA (US); Killian O'Connell, Charlottesville, VA (US)

(73) Assignee: University of Virgina Patent Foundation, Charlottesville, VA (US)

( * ) Notice: Subject to any disclaimer, the term of this patent is extended or adjusted under 35 U.S.C. 154(b) by 725 days.

(21) Appl. No.: 17/512,405

(22) Filed: Oct. 27, 2021

(65) Prior Publication Data

US 2022/0126293 A1    Apr. 28, 2022

Related U.S. Application Data

(60) Provisional application No. 63/106,660, filed on Oct. 28, 2020.

(51) Int. Cl.
*B01L 3/00* (2006.01)

(52) U.S. Cl.
CPC ... *B01L 3/502715* (2013.01); *B01L 3/502738* (2013.01); *B01L 3/502746* (2013.01);
(Continued)

(58) Field of Classification Search
None
See application file for complete search history.

(56) References Cited

U.S. PATENT DOCUMENTS

| 7,381,471 B2 | 6/2008 | Augustine et al. |
| 7,534,623 B2 | 5/2009 | Landers et al. |

(Continued)

FOREIGN PATENT DOCUMENTS

| WO | 2003104774 A1 | 12/2003 |
| WO | 2004007582 A2 | 1/2004 |

(Continued)

OTHER PUBLICATIONS

Krauss et al., Centrifugal microfluidic devices using low-volume reagent storage and inward fluid displacement for presumptive drug detection, 2018, Sensors and Actuators B: Chemical, vol. 284, Apr. 1, 2019, pp. 704-710; available online 2018 (Year: 2018).*

(Continued)

*Primary Examiner* — Maris R Kessel
*Assistant Examiner* — Mickey Huang
(74) *Attorney, Agent, or Firm* — Robert J. Decker

(57) ABSTRACT

A fluidic storage device capable of long-term storage of biological, chemical, and biochemical substances, including fluids and solids of a corrosive nature or generally incompatible with traditional reagent storage methods like blister packs. The fluidic device employs a fiber-based substrate which allows the substance to be stored long-term within the structure of the fiber-based substrate through capillary action. The stored substance can be released from the fiber-based substrate and used as needed as a result of active or passive forces incurred on the fluidic device. The storage as described herein will assist in minimizing the hazards associated with performing POI and POC testing by scaling down the required reagent volumes as well as facilitating long-term reagent storage and analysis on a single integrated, portable fluidic device.

37 Claims, 19 Drawing Sheets

(52) U.S. Cl.
CPC ............. B01L 2200/0605 (2013.01); B01L 2200/0642 (2013.01); B01L 2200/0647 (2013.01); B01L 2200/0684 (2013.01); B01L 2300/0838 (2013.01); B01L 2400/06 (2013.01)

(56) References Cited

U.S. PATENT DOCUMENTS

| | | |
|---|---|---|
| 7,815,802 B2 | 10/2010 | Wen et al. |
| 8,056,881 B2 | 11/2011 | Landers et al. |
| 8,220,493 B2 | 7/2012 | Easley et al. |
| 8,343,755 B2 | 1/2013 | Begley et al. |
| 8,403,294 B2 | 3/2013 | Landers et al. |
| 8,916,375 B2 | 12/2014 | Landers et al. |
| 9,044,735 B2 | 6/2015 | Wen et al. |
| 9,050,596 B2 | 6/2015 | Easley et al. |
| 9,987,576 B2 | 6/2018 | Landers et al. |
| 10,656,146 B2 | 5/2020 | Landers et al. |
| 11,135,583 B2 | 10/2021 | Landers et al. |
| 2004/0131504 A1 | 7/2004 | Landers et al. |
| 2005/0287661 A1 | 12/2005 | Landers |
| 2006/0144707 A1 | 7/2006 | Landers et al. |
| 2007/0166721 A1 | 7/2007 | Phan et al. |
| 2008/0193961 A1 | 8/2008 | Easley et al. |
| 2008/0277387 A1 | 11/2008 | Landers et al. |
| 2009/0215124 A1 | 8/2009 | Cao et al. |
| 2011/0033922 A1 | 2/2011 | Landers et al. |
| 2012/0149587 A1 | 6/2012 | Landers et al. |
| 2013/0004956 A1 | 1/2013 | Landers et al. |
| 2013/0084565 A1 | 4/2013 | Landers et al. |
| 2013/0157381 A1 | 6/2013 | Pang et al. |
| 2013/0203045 A1 | 8/2013 | Landers et al. |
| 2013/0295602 A1 | 11/2013 | Fowler et al. |
| 2014/0017802 A1 | 1/2014 | Smith |
| 2014/0134631 A1 | 5/2014 | Clime et al. |
| 2015/0093838 A1 | 4/2015 | Landers et al. |
| 2018/0313765 A1 | 11/2018 | Landers et al. |
| 2019/0054468 A1 | 2/2019 | Landers et al. |
| 2019/0275518 A1 | 9/2019 | Krauss |
| 2020/0023366 A1 | 1/2020 | Cruz et al. |
| 2022/0097042 A1 | 3/2022 | Landers et al. |

FOREIGN PATENT DOCUMENTS

| | | |
|---|---|---|
| WO | 2004027361 A1 | 4/2004 |
| WO | 2004033099 A2 | 4/2004 |
| WO | 2004046712 A2 | 6/2004 |
| WO | 2005033687 A1 | 4/2005 |
| WO | 2005079531 A2 | 9/2005 |
| WO | 2006039293 A2 | 4/2006 |
| WO | 2006044458 A2 | 4/2006 |
| WO | 2006069305 A2 | 6/2006 |
| WO | 2006088907 A2 | 8/2006 |
| WO | 2006093865 A1 | 9/2006 |
| WO | 2007024829 A2 | 3/2007 |
| WO | 2007030240 A2 | 3/2007 |
| WO | 2007041671 A2 | 4/2007 |
| WO | 2007047336 A2 | 4/2007 |
| WO | 2008058204 A1 | 5/2008 |
| WO | 2008080106 A1 | 7/2008 |
| WO | 2009114709 A2 | 9/2009 |
| WO | 2010141139 A1 | 12/2010 |
| WO | 2010141140 A1 | 12/2010 |
| WO | 2011056215 A1 | 5/2011 |
| WO | 2011150226 A1 | 12/2011 |
| WO | 2012151268 A1 | 11/2012 |
| WO | 2012151289 A2 | 11/2012 |
| WO | 2014093360 A1 | 6/2014 |
| WO | 2017019768 A1 | 2/2017 |
| WO | 2017066485 A1 | 4/2017 |
| WO | 2017070571 A2 | 4/2017 |
| WO | 2017070607 A1 | 4/2017 |
| WO | 2018148271 A1 | 8/2018 |

OTHER PUBLICATIONS

Wentland et al., Dry storage of multiple reagent types within a paper microfluidic device for phenylalanine monitoring, Anal. Methods, 2021, 13, 660 (Year: 2021).*

Musile, Giacomo et al., "The development of paper microfluidic devices for presumptive drug detection", Analytical Methods, vol. 7, 2015, pp. 8025-8033.

Qiao, Li'na et al., "A colorimetric sensor array based on sulfuric acid assisted KMnO4 fading for the detection and identification of pesticides", Talanta, 2018, vol. 181, pp. 305-310.

Mariet, Clarisse et al., "Microfluidics devices applied to radionuclides separation in acidic media for the nuclear fuel cycle", Micro and Nano Engineering, vol. 3, 2019, pp. 7-14.

Blackledge, William C. et al., "New facile method to measure cyanide in blood," Analytical chemistry, vol. 82, No. 10, May 15, 2010, pp. 4216-4221.

Gottschlich, Norbert, "Reagent Storage on Microfluidic Cartridges," IDEX Health Sciences, 2020, 14 pages.

Cissell, Derek D. et al., "A modified hydroxyproline assay based on hydrochloric acid in Ehrlich's solution accurately measures tissue collagen content", Tissue Engineering: Part C vol. 23, No. 4, https://doi.org/10.1089/ten.tec.2017.0018, 2017 (Online Publication Date, Mar. 30, 2017), pp. 243-250.

Zhong, Hongying et al., "Microwave-assisted acid hydrolysis of proteins combined with liquid chromatography MALDI MS/MS for protein identification", Journal of the American Society for Mass Spectrometry, vol. 16, https://doi.org/10.1016/j.jasms, 2005 (Published online Feb. 10, 2005), pp. 471-481.

Cannon, Joe et al., "High-throughput middle-down analysis using an orbitrap", Journal of proteome research, vol. 9, No. 8, https://doi.org/10.1021/pr1000994, 2010 (Published on Web Jun. 17, 2010), pp. 3886-3890.

Fenselau, Catherine et al., "Microwave assisted acid cleavage for denaturation and proteolysis of intact human adenovirus", International journal of mass spectrometry, vol. 301, No. 1-3, 2011 (Available online Jun. 8, 2010), pp. 7-11.

Mohanan, Nisha et al., "Microbial and enzymatic degradation of synthetic plastics", Frontiers in Microbiology, vol. 11, Article 580709, doi.org/10/33 89/fmicb.2020.580709, Nov. 26, 2020, pp. 1-22.

Thompson, Brandon L. et al., "Protein quantitation from whole blood on polyester-toner laser-printed microfluidic discs with cell phone image analysis", Oct. 26, 2014, URL:http//www.rsc.org/images/loc/2014/PDFs/Papers/474_0913.pdf., pp. 1434-1326.

Thompson, Brandon L. et al., "Inexpensive, rapid prototyping of microfluidic devices using overhead transparencies and a laser print, cut and laminate fabrication method", Nature protocols, vol. 10, No. 6, May 14, 2015, pp. 875-886.

Choodum, Aree et al., "A sol-gel colorimetric sensor for methamphetamine detection", Sensors and Actuators B: Chemical: International Journal Devoted to Research and Development of Physical and Chemical Transducers, vol. 215, Apr. 14, 2014, pp. 553-560.

Krauss, S. et al., "First-Generation NARCDISC™; Cost-Effective Printed Microdevices for Screening of Narcotics at the Point of Interdiction with Cell Phone Detection", 19th International Conference on Miniaturized Systems for Chemistry and Life Sciences, Oct. 29, 2015, pp. 1810-1812.

Krauss, Shannon T. et al., "Objective method for presumptive field-testing of illicit drug possession using centrifugal microdevices and smartphone analysis", Analytical Chemistry, Sep. 6, 2016, vol. 88, No. 17, pp. 8689-8697.

Ouyang, Yiwen, et al. "Multilevel fluidic flow control in a rotationally-driven polyester film microdevice created using laser print, cut and laminate.", Lab on a Chip, The Royal Society of Chemistry, Dec. 16, 2015, vol. 16, No. 2, pp. 377-387.

Utility U.S. Appl. No. 16/039,184, entitled "Method for Detecting Nucleic Acids Based on Aggregate Formation", filed Jul. 18, 2018.

Utility U.S. Appl. No. 13/849,691, entitled Electrostatic Actuation for Management of Flow in Micro-Total Analysis Systems (u-TAS) and Related Method Thereof, filed Mar. 25, 2013.

* cited by examiner

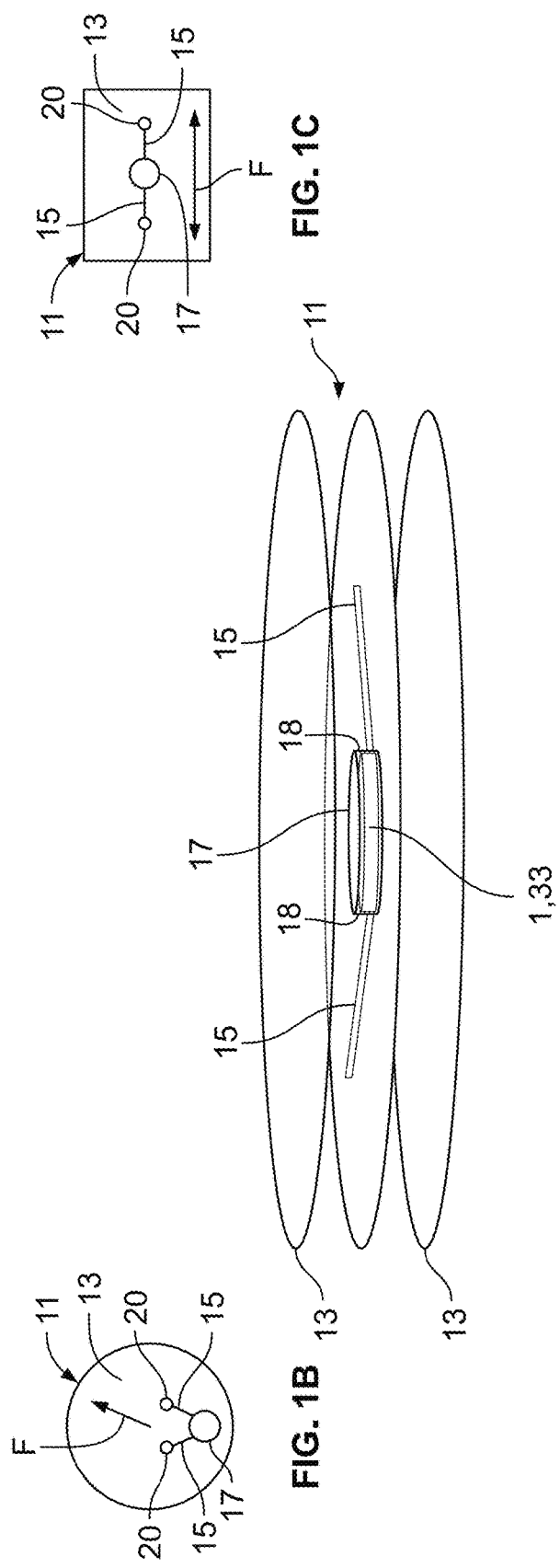
FIG. 1A
FIG. 1B
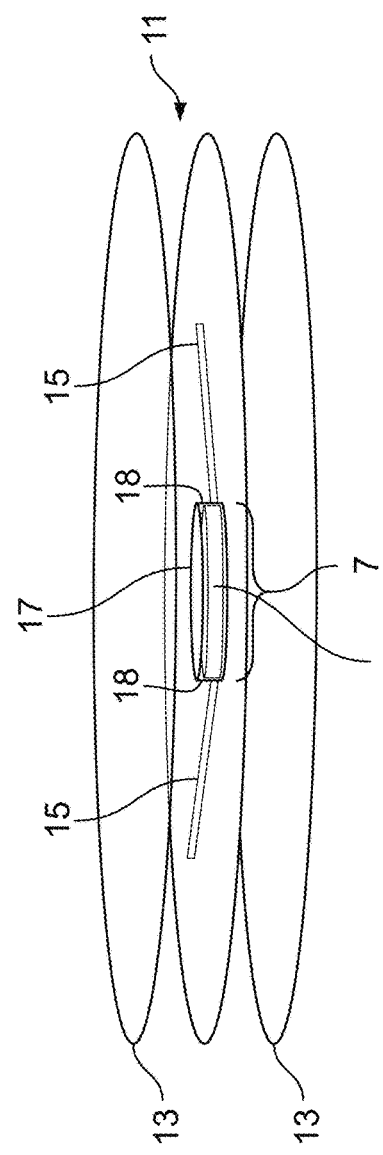
FIG. 1C
FIG. 1E
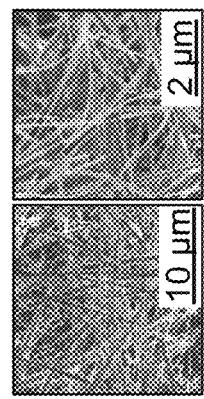
FIG. 1D

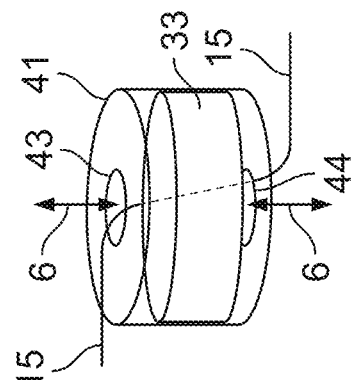
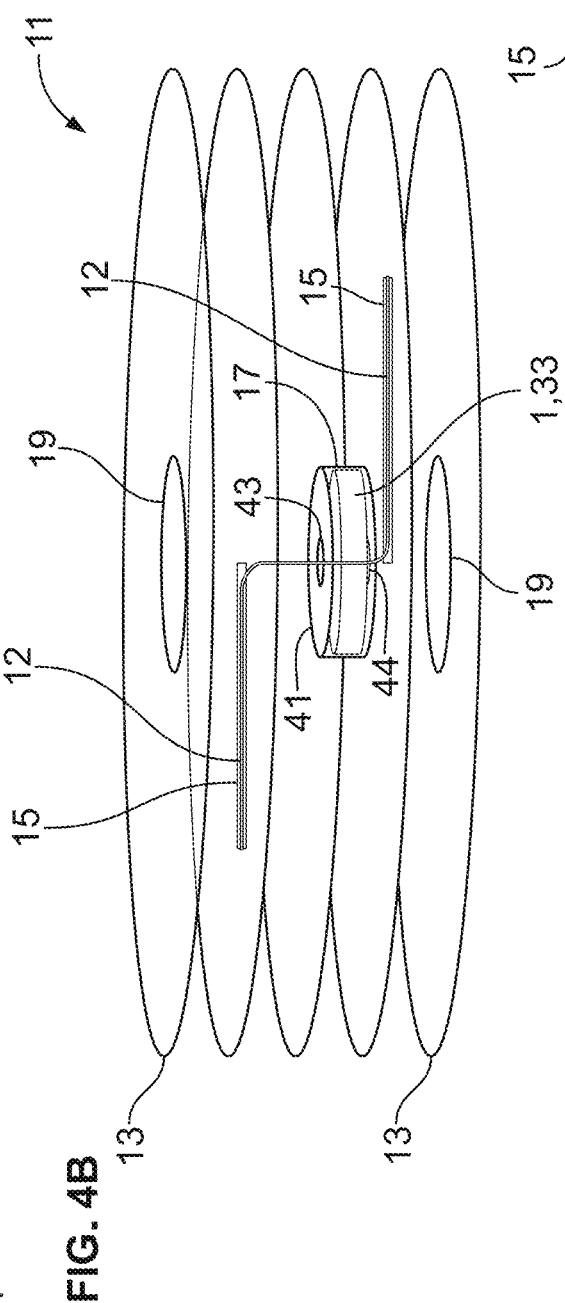

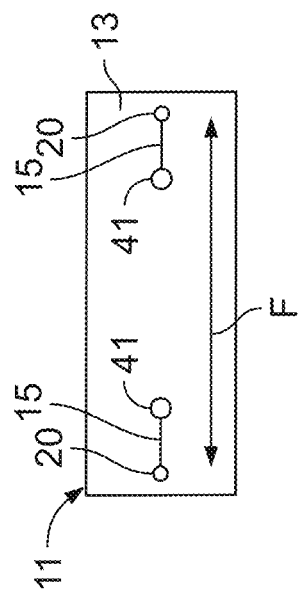
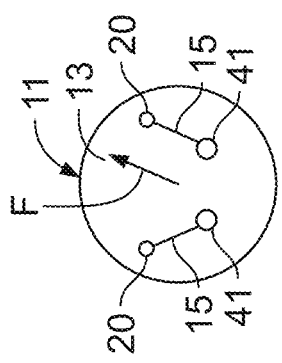
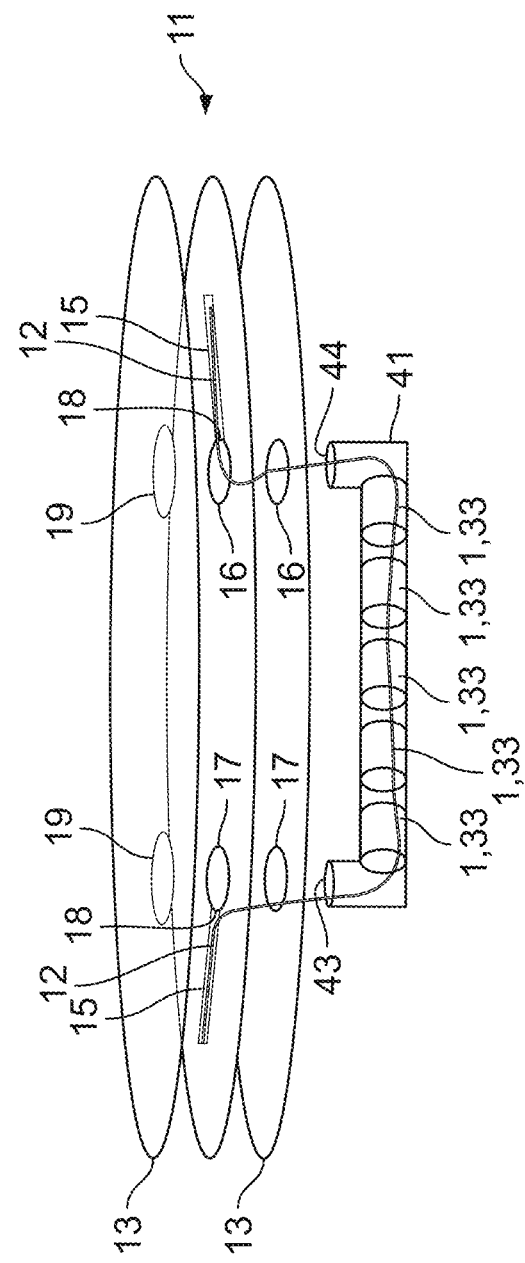

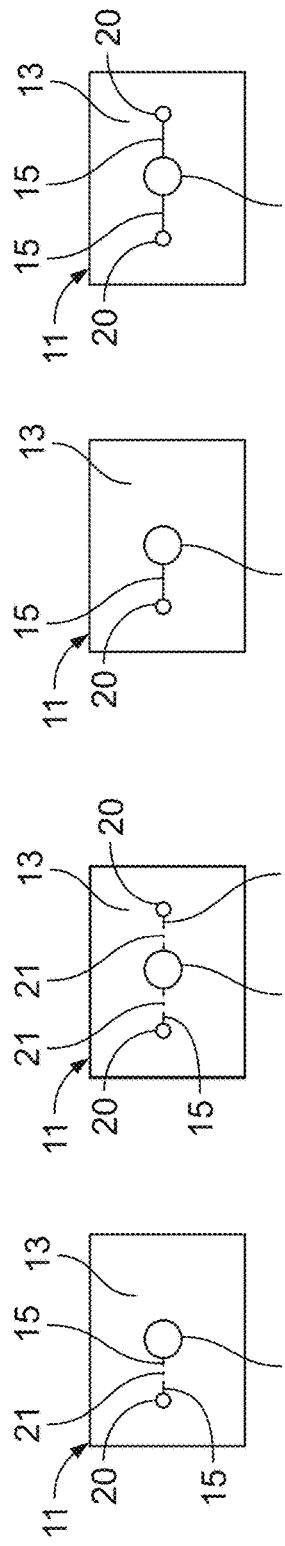
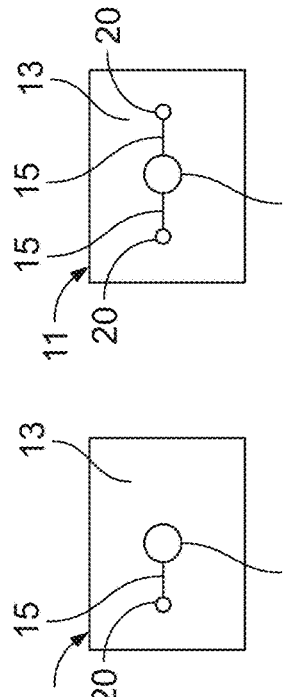
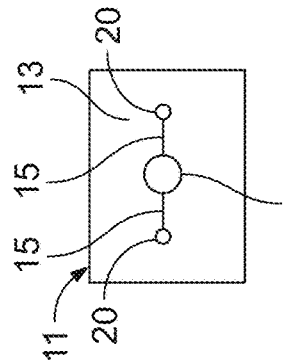
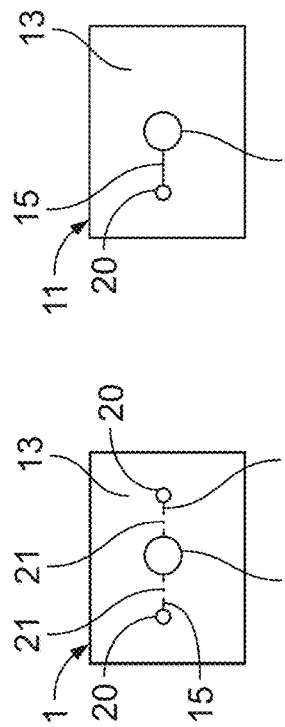
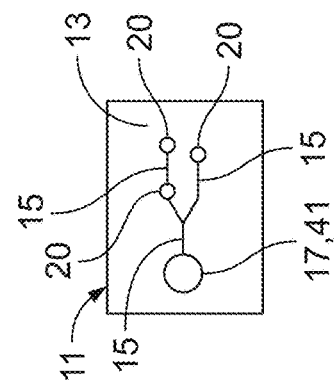
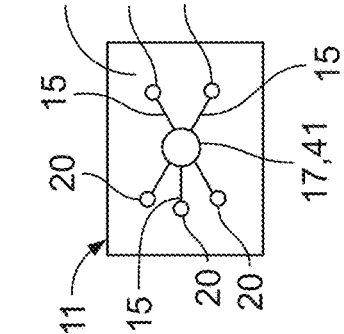
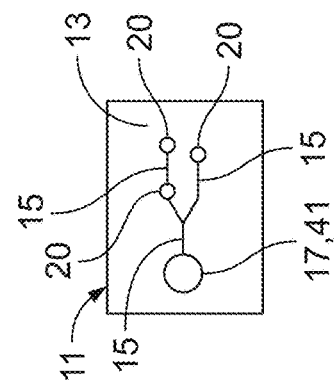
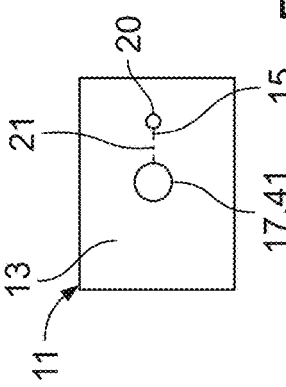

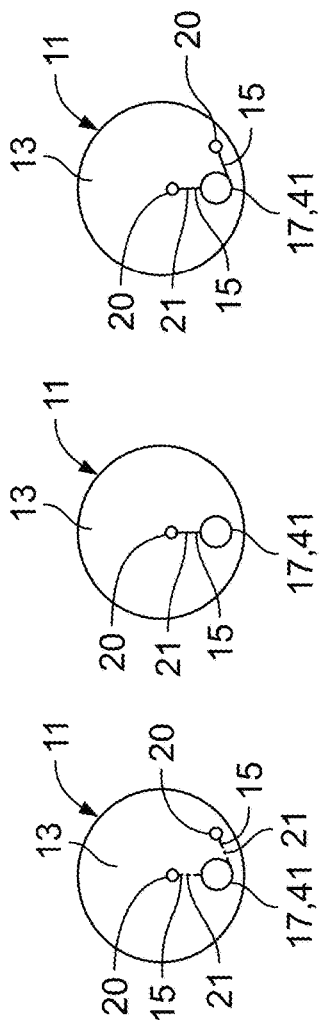
FIG. 14A
FIG. 14B
FIG. 14C
FIG. 14D
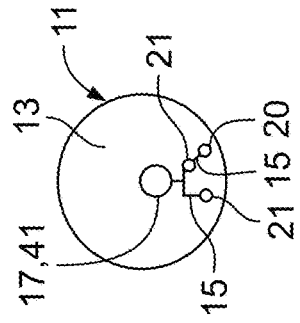
FIG. 14E
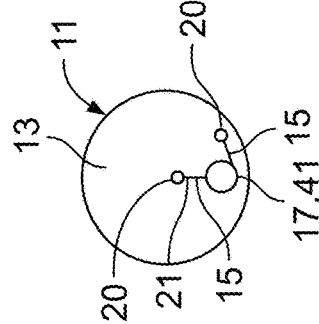
FIG. 14F
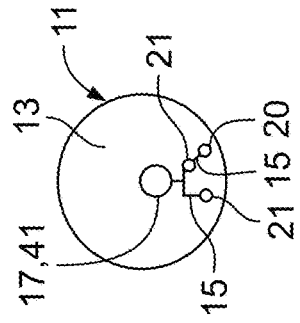
FIG. 14G
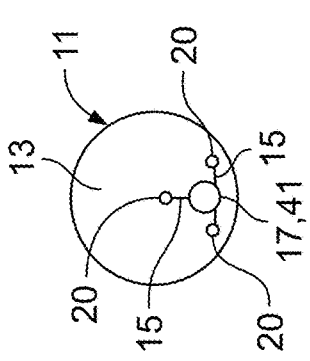
FIG. 14H
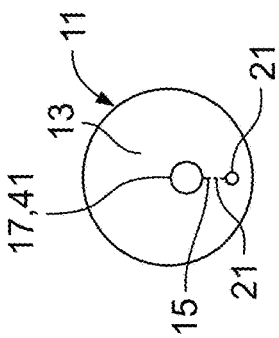
FIG. 14I A) Sample Preparation Chamber
B) Liquid Sample Inlet
C) Vent(s)
D) Intergrated Solid Phase Extraction (SPE) Microcolumn
E) Waste Chamber(s)
F) Optofluidic Valve(s)
G) Metering Chamber(s)
17,41) for Example, Detection Chamber or Capsule

STORAGE OF CORROSIVE MATERIALS ON A FIBER-BASED FLUIDIC DEVICE AND RELATED METHODS THEREOF

CROSS REFERENCE TO RELATED APPLICATIONS

The present application claims benefit of priority under 35 U.S.C § 119 (e) from U.S. Provisional Application Ser. No. 63/106,660, filed Oct. 28, 2020, entitled "Storage of Highly Corrosive Reagents on a Hybrid Polymeric/Glass Microfiber Microfluidic Device"; the disclosure of which is hereby incorporated by reference herein in its entirety.

FIELD OF INVENTION

The present disclosure relates generally to a fluidic storage device and the operation of said device. More particularly, a fluidic storage device capable of long-term storage of biological, chemical, and biochemical substances including fluids and solids of a corrosive nature (e.g. acidic or oxidative).

BACKGROUND

Separation of chemical components prior to or after a reaction is an important chemical analysis process, with applications in organic, molecular, and inorganic chemistry. Examples of involved chemical reactions include thermal cycling amplification, polymerase chain reaction (PCR), ligase chain reaction (LCR), etc. The separation of chemical components can be achieved by conventional electrophoresis, isoelectric focusing, gas chromatography, and molecular filtering and sieving. The separation of chemical components can be achieved by: filtration, dialysis, distillation, centrifugation, chromatography, mass spectrometry, electrophoresis, etc. Biological/molecular examples may include but not limited thereto the following: 1) hydroxyproline assay for quantification of collagen content in tissue; 2) acid-assisted hydrolysis of proteins, viruses, or organelles for chromatographic analysis, or 3) total iron content of environmental microbes (aquatic or soil-dwelling, terrestrial or extraterrestrial) [7, 8, 9, and 10]. Of increasing interest in the field of chemical separation is the use of devices that integrate reagent storage, reaction chambers, and the separation regions, within the same apparatus. Analytical microfluidic devices are one such device, and they offer many advantages due to their small size and said integrated design.

Analytical microfluidic devices offer many advantages due to their small size, including: rapid analysis times, sample conservation, low reagent consumption, and cost efficiency. A critical requirement for potential automation and portability of microfluidic devices is that the reagents necessary for analytical tests are integrated within the microfluidic device prior to use. Unfortunately, a number of applications for point-of-care (POC) and point-of-interdiction (POI) testing require reagents that are not amenable to long-term storage on microfluidic devices, such as highly corrosive reagents and concentrated acids. Common color tests for presumptive chromogenic detection of illicit drugs, such as the Marquis and Mandelin reagents, require highly concentrated sulfuric acid (conc. H2SO4) [1]. Colorimetric sensor arrays for the identification of harmful pesticides rely on a mix of conc. H2SO4 and potassium permanganate (KMnO$_4$), a strong oxidizing reagent [2]. Additionally, radionuclide purification and separation, for evaluation of nuclear reactor fuel waste, must be performed in an acidic media, namely conc. nitric or hydrochloric acid [3]. Finally, the detection of cyanide poisoning in blood samples necessitates the use of trichloroacetic acid [4]. The requirement for storing these reagents has largely prevented the development of portable analytical microfluidic device enabling rapid, on-site detection.

The present inventor asserts that analytical microfluidic devices (or fluidic device or nanofluidic device) would assist in minimizing the hazards associated with performing the above-described tests by scaling down the required reagent volumes. Additionally, the present inventor asserts that translating these assays onto a portable analytical microfluidic device (or fluidic device or nanofluidic device) would offer a new capability for rapid detection of harmful or illicit substances in the forensic, environmental, and clinical fields.

A variety of methods exist for integration and storage of either dry or liquid reagents on microfluidic devices. For storage of dry reagents, inkjet printing or pipetting can be used to deposit compounds onto paper-based devices. Unfortunately, highly corrosive and acidic reagents like those required for the above-described tests will damage printers and degrade cellulose-based substrates. Alternatively, liquid reagents can be stored on centrifugal microfluidic devices using blister packs (flexible sheets of polymer) or miniaturized glass ampules. To dispense the contents of these storage containers, external mechanical force is needed to pierce the blister pack or crush the glass ampule. Dispensing liquid reagents in this manner carries four disadvantages. First, blister packs are not capable of dispensing volumes less than 150 µL [5], compared to the typical microfluidic working volumes of 1-10 µL. Therefore, an additional metering step is required which adds architectural complexity and increases analytical time, both of which increase the cost of analysis. This also necessitates added space on the microfluidic device to store the largely excess volume derived from the blister pack. Second, although glass ampules can achieve storage and delivery of volumes less than 10 µL, the exact recovery volume can vary by as much as 5% per ampule. The resulting variability of operational reagent volume necessitates reagent storage in excess of the analytically-required volume to ensure complete reaction, increasing cost and complicating architecture to accommodate the capture of potential excess reagent volume. Third, the broken glass debris associated with using miniaturized glass ampules has the potential to clog microfluidic channels and impede or prevent fluid flow throughout the device, increasing costs and damaging the reliability of the device as an analytical assay. Lastly, the external mechanical forces needed to crush the ampule also complicate automation potential. Of these two storage methods, only glass ampules have demonstrated success at storing highly corrosive reagents [6]. In contrast, although microfluidic devices composed entirely of glass are potentially capable of storing corrosive reagents, they are expensive to fabricate and not robust enough for on-site use. Additionally, they require external hardware for driving fluid flow, which increases their cost and further limits their portability.

This disclosure presents, among other things, a facile method and system for the long-term storage of highly corrosive reagents in a cost-effective manner on a portable and automatable polymeric microfluidic device (or fluidic device or nanofluidic device). This new method and system provides, but not limited thereto, a means for the storage of custom volumes of reagents, including highly corrosive (e.g. acidic or oxidative) reagents, without the generation of excess waste, and requires no metering step or user intervention during the course of the assay protocol.

SUMMARY OF ASPECTS OF EMBODIMENTS OF THE PRESENT INVENTION

An aspect of an embodiment of the present invention relates generally to a fluidic storage device and the operation of said device. More particularly, a fluidic storage device capable of long-term storage of biological, chemical, and biochemical substances, including fluids in aliquots of as little as 1 µL of fluid volume, and solids with a mass in the picogram-milligram range. Similarly, a fluidic storage device capable of long-term storage of biological, chemical, and biochemical substances may apply to the storage of desired solid mass that is dispersed in a liquid matrix (known concentration) for dispensing into the fiber-based substrate (e.g., glass microfiber substrate). This device is useful in, among other things, a wide variety of point of care (POC) and point of interdiction (POI) testing, which requires reagents either incapable of storage on ordinary fluidic device component materials due to their corrosive nature, or requires storage of said reagents in a way necessitating manual mechanical force to dispense the reagent for a reaction with low recovery volume accuracy.

In an embodiment, the fluidic storage device is capable of long-term storage of biological, chemical, and biochemical substances in the range of about six months to about one year. In another embodiment, the long-term storage may in the range of about two to about three years. In an embodiment, the duration of storage may be less than six months or greater than three years.

An aspect of an embodiment provides for a fluidic device configured to store, retain, and receive chemical substances into one or more of the fiber-based substrates (e.g., glass microfiber substrates or glass nanofiber substrates) part of said device.

The device described below provides an improved method for long-term storage of chemical, biological, and biochemical substances on and for use with microfluidic devices (or the fluidic devices or nanofluidic devices). An exemplary embodiment of this fluidic device can comprise: a base constructed of one or more polymeric layers; a chamber embedded within said base; multiple fiber-based substrates (e.g., glass microfiber substrates or glass nanofiber substrates) disposed entirely within the chambers and positioned in such a manner as to permit the fluid flow to travel a) off of or out from, b) onto or into, or c) through said fiber-based substrate (e.g., glass microfiber substrate or glass nanofiber substrate); one or more multidirectional microfluidic access ports disposed in said base, and in fluidic communication with said microfluidic channels (or the fluidic channels or nanofluidic channels) that enable a fluid flow to travel to or from said chamber. In one aspect of the embodiment, components of the fluidic device in direct fluidic communication with the substance(s) to be stored on said fiber-based substrate (e.g., microfiber glass substrate) are compatible with said substance.

A component of the fluidic device (or the microfluidic device or nanofluidic device) is "compatible" with a substance if contact with the substance does not corrode, degrade, dissolve, or react with the material(s) comprising the component, or alter the component's structure or otherwise renders the component inoperable. A component of the fluidic device (or the microfluidic device or nanofluidic device) is "incompatible" with a substance if contact with the substance corrodes, degrades, dissolves, or reacts with the material(s) comprising the component, or alters the component's structure or otherwise renders the component inoperable.

A type of reaction may include a chemical reaction, but is not necessarily limited thereto.

In one aspect of the embodiment, fluid travels into the device through the first multidirectional microfluidic channel (or the fluidic channel or nanofluidic channel) into the chamber through the multidirectional access ports, through the fiber-based substrate (e.g., glass microfiber substrate or glass nanofiber substrate) with the chemical substance disposed onto the fiber-based substrate (e.g., glass microfiber substrate or glass nanofiber substrate); and out of the device through a second multidirectional microfluidic channel (or the fluidic channel or nanofluidic channel).

Other embodiments of the device may have one or more parts of the fluidic device (or the micofluidic device or nanofluidic device) which are incompatible with the substance stored on said fiber-based substrate (e.g., glass microfiber substrate or glass nanofiber substrate). Such embodiments further comprise a barrier protective region disposed in the base adjacent to the first access port, wherein said barrier protective region is compatible with the chemical substance intended to be stored, received or retained on the fiber substrate (e.g., glass microfiber substrate or glass nanofiber substrate), and is positioned in a way to protect incompatible base materials (or materials of other components of the device) from contact with the fluid flow at the vicinity of the first port. The embodiment as described further comprises a vent in fluidic communication with at least one microfluidic channel (or the fluidic channel or nanofluidic channel) whereby the fluid travels through the device in a linear trajectory with bi-directional capabilities.

An aspect of an embodiment of the present invention provides, among other things, a method for the long-term storage of highly corrosive reagents (or other specified substances), which could not otherwise be stored on microfluidic devices (or the fluidic devices or nanofluidic devices) for any significant period of time due to degradation of the microfluidic device materials (or the fluidic device materials or nanofluidic device materials). The fiber-based substrate (e.g., glass microfiber substrate or glass nanofiber substrate) comprises of non-porous individual fibers, and accomplishes this (i.e., storage without degradation) by taking advantage of the chemical inactivity of the substrate material in the presence of these types of reagents (or other specified substances). In other words, the individual fibers themselves are non-porous. Moreover, in an embodiment, the non-porous fibers (e.g., glass microfibers or glass nanofibers) may form any one of the following: mesh, web, screen, network of pores, solid matrix with pores, fabric, or lattice network which retains the reagent (or other specified substance) within the fiber-based substrate via capillary action, preventing unintended transfer or movement of the reagent (or other specified substance) into other locations within the microfluidic device (or the fluidic device or nanofluidic device) which may not be compatible with the reagent (or other specified substance).

An aspect of an embodiment of the present invention provides, among other things, a method for the long-term storage of highly volatile solvents, which could not otherwise be stored on microfluidic devices for any significant period of time due to the potential for the solvent to dissolve parts of the fluidic device (or microfluidic device or nanofluidic device). All aspects of the fluidic device may be within the micro regime or nano regime. All aspects of the fluidic device may be larger than the micro regime or nano regime.

An aspect of an embodiment of the present invention provides, among other things, a method for the long-term storage of biochemical and biological substances (i.e. enzymes and microbes), which could not otherwise be stored on microfluidic devices (or fluidic devices or nanofluidic devices) for any significant period of time due to the potential for the substance to degrade the microfluidic device (or the fluidic device or nanofluidic device).

An additional aspect of an embodiment of the present invention provides, among other things, a method for the storage of precise volumes of reagents within the microfluidic device (or the fluidic device or nanofluidic device). The volume of reagent to be stored within the fiber-based substrate (e.g., glass microfiber substrate or glass nanofiber substrate) can be customized as necessary depending on the reaction that the microfluidic device (or the fluidic device or nanofluidic device) intends to accomplish, which eliminates issues associated with excess reagent volume that would potentially need to be collected, processed, and captured in other circumstances. It should be appreciated that this feature is particularly valuable in the context of corrosive reagents, where any excess reagent volume represents a health and safety risk and can degrade the incompatible portions of the microfluidic device (or the fluidic device or nanofluidic device).

An additional aspect of an embodiment of the present invention provides, among other things, a method for the release of the stored reagent by non-mechanical forces. Current technology requires the puncturing or breakage of a chamber or cell in order to release reagents within a microfluidic device chamber. An aspect of an embodiment of the present invention eliminates this issue in that the reagent can be released through non-mechanical forces, including centrifugal, pressure, gravity, and others. The ability to retain and release the reagent without the use of external mechanical forces results in increased reliability of the device, with no risk of injury or internal blockages.

An aspect of an embodiment of the present invention provides, among other things, a method for the release of the stored reagent without necessitating the recovery of the reagent from the storage vessel prior to use within the assay. For ordinary microdevices that use centrifugal-based flow, the liquid containers must be located near the center of the disc to facilitate such a "recovery step". In contrast, in an embodiment of the present invention, the microencapsulation wells (or nanoencapsulation wells) may be placed and used anywhere on the microdevice (or nanodevice) according to the assay protocol.

An aspect of an embodiment of the present invention provides, among other things, a method for heating stored reagents (or other specified substances) on the microfluidic device (or the fluidic device or nanofluidic device). The claimed method for microencapsulation (or nanoencapsulation) of device-incompatible reagents is resistant to the degradative effects of heat and can act as a heating chamber using the same mechanism (oven, Peltier, IR, microwave, etc.) as may be used elsewhere for the microdevice (or nanodevice). By contrast, blister packs, ampoules, or open reservoirs would either require a secondary heating mechanism or cannot be directly heated to high temperatures (>100° C.).

An advantage of an aspect of an embodiment of the present invention device and method is the ability to fabricate a microfluidic device (or the fluidic device or nanofluidic device) out of any desired material—without being limited by the storage requirements of a corrosive/oxidative reagents. Whereas, current devices composed solely of glass are difficult to integrate valves into, and automation of fluid flow is more expensive (as it is undesirable to spin a glass disc at high RPM, for example, as associated with current devices). Current devices are also limited in physical properties relative to the embodiments of the present invention's enormous range of polymer substrates available: weight and durability for POC or POI applications, for example. The cost per device and the fabrication methods regarding current devices are also higher than embodiments of the present invention device and method. Disposability of current glass devices versus the embodiments of the present invention plastic device is also less facile.

An aspect of an embodiment of the present invention provides, among other things, a chamber for use with a fluidic device. In an embodiment, the chamber is configured to house a fiber-based substrate that is disposed in the chamber; and the fiber-based substrate is configured to retain, receive and/or release a substance. In an embodiment, the fiber-based substrate is configured in such a manner as to prevent the retained substance thereon from contacting other regions of the fluidic device, beyond the perimeter of the fiber-based substrate, during retention of the substance on the fiber-based substrate.

An aspect of an embodiment of the present invention provides, among other things, a chamber for use with a fluidic device. In an embodiment, the chamber is configured to house a fiber-based substrate that is disposed in the chamber; and the fiber-based substrate is configured to retain, receive and/or release a substance. In addition, an area of the chamber includes a treated surface or coated surface that is compatible with the substance intended to be retained by, received by, and/or released from the fiber-based substrate. Moreover, one of the following configurations apply: a) the fiber-based substrate is configured in such a manner as to prevent the retained substance thereon from contacting other regions of the fluidic device, beyond the treated area or the coated area of the chamber, during retention of the substance on the fiber-based substrate; or b) the fiber-based substrate is configured in such a manner as to prevent the retained substance thereon from contacting other regions of the fluidic device, beyond the perimeter of the fiber-based substrate, during retention of the substance on the fiber-based substrate.

An aspect of an embodiment of the present invention provides, among other things, a capsule for use with a fluidic device. In an embodiment, the capsule is configured to encapsulate a fiber-based substrate that is disposed in the capsule. In addition, the fiber-based substrate is configured to retain, receive, and/or release a substance. Moreover, one of the following configurations apply: a) the capsule is configured in such a manner as to prevent the retained substance on the fiber-based substrate and within the capsule from contacting other regions of the fluidic device outside the capsule; b) the fiber-based substrate is configured in such a manner as to prevent the retained substance thereon from contacting other regions of the fluidic device outside the capsule; or c) the fiber-based substrate is configured in such a manner as to prevent the retained substance thereon from contacting other regions of the fluidic device, beyond the perimeter of the fiber-based substrate, during retention of the substance on the non-porous fiber-based substrate.

An aspect of an embodiment of the present invention provides, among other things, a method of using a chamber for use with a fluidic device. In an embodiment, the method comprises retaining a substance on a fiber-based substrate, receiving the substance on the fiber-based substrate, and/or releasing a substance from the fiber-based substrate; wherein the fiber-based substrate is housed in the chamber. In addition, the method comprises preventing the retained substance thereon the fiber-based substrate from contacting other regions of the fluidic device, beyond the perimeter of the fiber-based substrate, during retention of the substance on the fiber-based substrate.

An aspect of an embodiment of the present invention provides, among other things, a method of using a chamber for use with a fluidic device. In an embodiment, the method comprises: retaining a substance on a fiber-based substrate, receiving the substance on the fiber-based substrate, and/or releasing the substance on the fiber-based substrate; wherein the fiber-based substrate is disposed on an area of the chamber that includes a treated surface or coated surface that is compatible with the substance intended to be retained by, received by, and/or released from the fiber-based substrate. In addition, one of the following steps apply: a) preventing the retained substance thereon the fiber-based substrate from contacting other regions of the fluidic device, beyond the treated area or the coated area of the chamber, during retention of the substance on the fiber-based substrate; or b) preventing the retained substance thereon the fiber-based substrate from contacting other regions of the fluidic device, beyond the perimeter of the fiber-based substrate, during retention of the substance on the fiber-based substrate.

An aspect of an embodiment of the present invention provides, among other things, a method of using a capsule for use with a fluidic device. In an embodiment, the method comprises: retaining a substance on a fiber-based substrate, receiving the substance on the fiber-based substrate, and/or releasing the substance on the fiber-based substrate; wherein the fiber-based substrate is encapsulated by the capsule. In an embodiment, one of the following steps apply: a) preventing the retained substance on the fiber-based substrate and within the capsule from contacting other regions of the fluidic device outside the capsule; b) preventing the retained substance thereon the fiber-based substrate from contacting other regions of the fluidic device outside the capsule; or c) preventing the retained substance thereon from contacting other regions of the fluidic device, beyond the perimeter of the fiber-based substrate, during retention of the substance on the fiber-based substrate.

An aspect of an embodiment of the present invention provides, among other things, a fluidic storage device (and related method) that is capable of long-term storage of biological, chemical, and biochemical substances, including fluids and solids of a corrosive nature or generally incompatible with traditional reagent storage methods like blister packs. The fluidic device (and related method) employs a fiber-based substrate which allows the substance to be stored long-term within the structure of the fiber-based substrate through capillary action. The stored substance can be released from the fiber-based substrate and used as needed as a result of active or passive forces incurred on the fluidic device. The storage as described herein will assist in minimizing the hazards associated with performing POI and POC testing by scaling down the required reagent volumes as well as facilitating long-term reagent storage and analysis on a single integrated, portable fluidic device. The storage as described herein will assist in minimizing the hazards associated with performing POI and POC testing by scaling down the required reagent volumes as well as in translating analytical assays onto a portable fluidic device by allowing long-term reagent storage within an integrated fluidic device.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user/operator/customer/client or machine/system/computer/processor. Moreover, the various components may be in communication via wireless and/or hardwire or other desirable and available communication means, systems and hardware. Moreover, various components and modules may be substituted with other modules or components that provide similar functions.

It should be appreciated that the device and related components discussed herein may take on all shapes along the entire continual geometric spectrum of manipulation of x, y and z planes to provide and meet the environmental and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

It should be appreciated that as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g. rat, dog, pig, monkey), etc. It should be appreciated that the subject may be any applicable human patient, for example.

As discussed herein, a "subject" may be any applicable human, animal, or other organism, living or dead, or other biological or molecular structure or chemical environment, and may relate to particular components of the subject, for instance specific tissues or fluids of a subject (e.g., human tissue in a particular area of the body of a living subject), which may be in a particular location of the subject, referred to herein as an "area of interest" or a "region of interest."

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention itself, together with further objects and attendant advantages, will best be understood by reference to the following detailed description, taken in conjunction with the accompanying drawings.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 1A schematically illustrates an exploded view of an embodiment of a fluidic device that includes a chamber in relation to the base, wherein a fiber-based substrate (e.g., glass microfiber substrate or glass nanofiber substrate) is disposed in the chamber.

FIG. 1B schematically illustrates a plan view of an embodiment generally reflected as the fluidic device of FIG. 1A.

FIG. 1C schematically illustrates a plan view of an embodiment generally reflected as the fluidic device of FIG. 1A.

FIG. 1D provides a micrographic depiction of a portion of an embodiment of a fiber-based substrate (e.g., glass microfiber substrate or glass nanofiber substrate) generally reflected in FIG. 1A.

FIG. 1E schematically illustrates an exploded view of an embodiment of a fluidic device that includes a chamber in relation to the base, wherein a fiber-based substrate (e.g., glass microfiber substrate or glass nanofiber substrate) is disposed in the chamber.

FIGS. 4A-4D correspond with the fluidic device reflected in FIGS. 3A-3D, respectively, and further depicts in FIGS. 4A and 4D a fluid flow path as related to an aspect of an embodiment.

FIGS. 12A-12C correspond with the fluidic device reflected in FIGS. 11A-11C, respectively, and further depicts in FIG. 12A a fluid flow path as related to an aspect of an embodiment.

FIG. 13A schematically illustrates a plan view of an embodiment of a fluidic device that may be configured for non-centrifugal forces whereby the valve is in a disconnected state and the chamber or capsule is provided for a terminal application.

FIG. 13B schematically illustrates a plan view of an embodiment of a fluidic device that may be configured for non-centrifugal forces whereby the valve is in a disconnected state and the chamber or capsule is provided for a flow-through application.

FIG. 13C schematically illustrates a plan view of an embodiment of a fluidic device that may be configured for non-centrifugal forces whereby the valve is in a connected state and the chamber or capsule is provided for a terminal application.

FIG. 13D schematically illustrates a plan view of an embodiment of a fluidic device that may be configured for non-centrifugal forces whereby the valve is in a connected state and the chamber or capsule is provided for a flow-through application.

FIG. 13E schematically illustrates a plan view of an embodiment of a fluidic device that may be configured for non-centrifugal forces whereby the valve is in a connected state and the chamber or capsule is provided for a flow-through application as well as having a plurality of vents, of which the valves and vents may be a variety of different types of access points.

FIG. 13F schematically illustrates a plan view of an embodiment of a fluidic device that may be configured for non-centrifugal forces whereby the valve is in a connected state and the chamber or capsule is provided for a flow-through application as well as having a plurality of vents, of which the valves and vents may be a variety of different types of access points.

FIG. 13G schematically illustrates a plan view of an embodiment of a fluidic device that may be configured for non-centrifugal forces whereby the valve is in a connected state and the chamber or capsule is provided for a flow-through application as well as having a plurality of vents, of which the valves and vents may be a variety of different types of access points.

FIG. 13H schematically illustrates a plan view of an embodiment of a fluidic device that may be configured for non-centrifugal forces whereby the valve is in a connected state and the chamber or capsule is provided for an antecedent application.

FIG. 13I schematically illustrates a plan view of an embodiment of a fluidic device that may be configured for non-centrifugal forces whereby the valve is in a disconnected state and the chamber or capsule is provided for an antecedent application.

FIG. 14A schematically illustrates a plan view of an embodiment of a fluidic device that may be configured for centrifugal forces whereby the valve is in a disconnected state and the chamber or capsule is provided for a terminal application.

FIG. 14B schematically illustrates a plan view of an embodiment of a fluidic device that may be configured for centrifugal forces whereby the valve is in a disconnected state and the chamber or capsule is provided for a flow-through application.

FIG. 14C schematically illustrates a plan view of an embodiment of a fluidic device that may be configured for centrifugal forces whereby the valve is in a connected state and the chamber or capsule is provided for a terminal application.

FIG. 14D schematically illustrates a plan view of an embodiment of a fluidic device that may be configured for centrifugal forces whereby the valve is in a connected state and the chamber or capsule is provided for a flow-through application.

FIG. 14E schematically illustrates a plan view of an embodiment of a fluidic device that may be configured for centrifugal forces whereby the valve is in a connected state and the chamber or capsule is provided for a flow-through application as well as having a plurality of vents, of which the valves and vents may be a variety of different types of access points.

FIG. 14F schematically illustrates a plan view of an embodiment of a fluidic device that may be configured for centrifugal forces whereby the valve is in a connected state and the chamber or capsule is provided for a flow-through application as well as having a plurality of vents, of which the valves and vents may be a variety of different types of access points.

FIG. 14G schematically illustrates a plan view of an embodiment of a fluidic device that may be configured for centrifugal forces whereby the valve is in a connected state and the chamber or capsule is provided for a flow-through application as well as having a plurality of vents, of which the valves and vents may be a variety of different types of access points.

FIG. 14H schematically illustrates a plan view of an embodiment of a fluidic device that may be configured for centrifugal forces whereby the valve is in a connected state and the chamber or capsule is provided for an antecedent application.

FIG. 14I schematically illustrates a plan view of an embodiment of a fluidic device that may be configured for centrifugal forces whereby the valve is in a disconnected state and the chamber or capsule is provided for an antecedent application.

DETAILED DESCRIPTION OF EXEMPLARY EMBODIMENTS

Figure 2C:
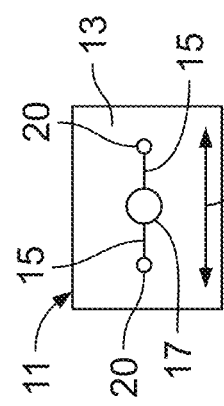
FIGS. 2A-2C correspond with the fluidic device reflected in FIGS. 1A-1C, respectively, and further depicts in FIG. 2A a fluid flow path as related to an aspect of an embodiment.

In describing and claiming the invention, the following terminology will be used in accordance with the definitions set forth below:

As used herein a "microchannel" is a passageway (in any form, including a closed channel, a capillary, a trench, groove, or the like) formed on or in a microfluidic substrate (a chip, bed, wafer, laminate or the like) having at least one region with a cross-sectional dimension of about 5 mm$^2$ to about 100 μm$^2$, preferably about 0.5 mm$^2$ to about 7,000 μm$^2$, and more preferably about 0.275 mm$^2$ to about 30,000 μm$^2$. It should be appreciated that an embodiment of the microchannel (or any type of channel) may include a cross-sectional dimension greater than or less the aforementioned ranges.

A channel, microchannel, nanochannel may be attached above, embedded or positioned within, or attached below a base (and may be implemented with any of the embodiments disclosed herein).

A fluidic element, fluidic component, microfluidic element, microfluidic component, nanofluidic element, or nanofluidic component may be attached above, embedded or positioned within, or attached below a base (and may be implemented with any of the embodiments disclosed herein).

In an embodiment, a "fluidic device", "microfluidic device" or "nanofluidic device" are an apparatus or component of an apparatus that includes at least one channel, microchannel, or nanochannel, respectively.

A "fluidic channel", "microfluidic device", or "nanofluidic device" may be any passage or pathway via which the fluid is able to travel by applied force.

A "capsule" may be variety of structures or regions, such as a container, repository, receptacle, or holder.

A "fluid", for example, is a liquid, gas, or other material that continuously deforms (flows) under an applied shear stress, or external force. A "fluid", for example, is any substance that flows or deforms under applied shear stress and comprises a subset of states of matter (including liquids, gases, and plasma). For example, in an aspect of an embodiment, but not limited thereto, the fiber-based substrate (e.g., microfiber glass substrate) itself retains liquid reagent(s) (or other specified substances) best, but a sealed encapsulation chamber with the fiber-based substrate (e.g., microfiber glass substrate) is also capable of localizing vapors or gasses derived from the stored liquid reagent(s) on a fluidic device (e.g., microdevice or nanodevice).

"Vapors" are a suspension of liquid particles (i.e., a mixture of liquid and gas) while "gasses" are suspended molecules in a single state of matter.

Referring generally to FIGS. 1A-1C and 2A-2C, for example, but not wishing to be constrained by the illustrated depictions reflected in said cited Figures, FIG. 1A schematically illustrates a chamber 17 for use with a fluidic device 11 (as schematically illustrated in the exploded view). The chamber 17 is configured to house a fiber-based substrate (e.g., glass microfiber substrate) 33 that is disposed in said chamber 17, wherein the fiber-based substrate (e.g., glass microfiber substrate) 33 is configured to retain, receive and/or release a substance 1. The fiber-based substrate (e.g., glass microfiber substrate) 33 is configured in such a manner as to prevent the retained substance 1 thereon from contacting other regions of said fluidic device 11, beyond the perimeter of said fiber-based substrate (e.g., glass microfiber substrate) 33, during retention of said substance 1 on said fiber-based substrate (e.g., glass microfiber substrate) 33.

Still referring generally to FIG. 1A, an embodiment provides a fluidic device 11 (as schematically illustrated in the exploded view) configured for use with the chamber 17 that includes a base 13 wherein the chamber 17 is disposed in said base 13. In an embodiment, the chamber 17 is compatible with the substance 1 intended to be retained by, received by, and/or released from said fiber-based substrate (e.g., glass microfiber substrate) 33. In an embodiment, the fluidic device 11 further comprises fluidic channels 15 disposed on said base 13 wherein said fluidic channels 15 are configured to be in fluidic communication with said chamber 17 in a manner to define a fluid flow path 12. The fiber-based substrate (e.g., glass microfiber substrate) 33, disposed within said chamber 17, is positioned in the defined fluid flow path 12, wherein said fiber-based substrate (e.g., glass microfiber substrate) 33 is configured to retain, receive, and/or release a substance thereon and be compatible with the substance 1 intended to be retained by, received by, and/or released from said fiber-based substrate (e.g., microfiber substrate) 33. In an embodiment, the chamber includes one or more accesses including a first access 18 and/or a second access 18 to provide for the fluidic communication between the chamber 17 and the fluidic channels 15.

Still referring generally to FIG. 1A, in an embodiment the base 13 may be one of the following: one or more material layers, microfluidic chip (or nanofluidic chip), disk, housing, container, vessel, platform, or any surface (or structure) that can retain, hold or house said fiber-based substrate (e.g., microfiber glass substrate) and said chamber. In an embodiment, the channels 15 includes one of the following: microchannels, nanochannels, pathways, trenches, grooves, capillaries, or passageways. In an embodiment, the material of the fiber-based substrate may include, but is not limited thereto, one of more of the following: glass microfiber or glass nanofiber. The glass may be one of more of the following: soda-lime, borosilicate, or quartz. In an embodiment, the fiber-based substrate may include, but is not limited thereto, one of more of the following stainless steel microfiber, stainless steel nanofiber, polypropylene microfiber or polypropylene nanofiber. In an embodiment, the substrate may be comprised of other fiber-based materials (or other types of materials) as desired or required to effectuate storage; meet the environmental and structural demands and operational requirements. In an embodiment, fluidic device 11 further comprises: a vent 20 in fluidic communication with at least one said fluidic channel; and/or a valve 21 in fluidic communication with at least one said fluidic channel. In an embodiment, the chamber 17 includes one of the following: cavity, cylinder, cell, recess, compartment, aperture, receptacle, or widened-fluidic channel.

Still referring generally to FIG. 1A, as well as FIGS. 1B and 1C, an embodiment of the device 11 is configured to be subjected to an active force F (such as for example, but not limited thereto, an active mechanism that causes or results in fluid flow that overcomes fluidic inertia); and wherein any traveling of the substance 1 on the fluid flow path 12 is a result of the active force, F, incurred on or applied to said device 11. In an embodiment, the active force, F, causes angular acceleration of the device 11 resulting in an apparent centrifugal force, wherein any traveling of the substance 1 on the fluid flow path 12 is a result of the centrifugal force experienced on said device 11 as a result of angular acceleration of said device (for example, spinning of said device). In an embodiment, the active force F is one or more of the following: external fluid pressure, external gas pressure, internal hydrodynamic pressure, electrokinetic, dielectrophoretic, magnetic, or optical. For example, but not limited thereto, in an embodiment the device 11 may be exposed to different forms of applied or apparent force to induce traveling, such as mechanical, centrifugal, heat energy, gas expansion, pneumatic, vacuum or laser or mechanical puncture. In an embodiment, the device is configured to be subjected to a passive force F; and wherein any traveling of the substance 1 on the fluid flow path 12 is a result of the passive force F incurred on or applied to said device 11. In an embodiment, the passive force F includes one or more of the following: gravity or interfacial surface tension gradients.

Still referring generally to FIG. 1A, an embodiment provides the substance that is one or more of the following: chemical substance, biochemical substance, or biological substance. An example of a chemical substance includes one of the following: corrosive reagents (including but not limited to: concentrated acids and strong oxidizers) and volatile liquids (including but not limited to: volatile organic solvents). An example of a biochemical substance includes hydrolase enzymes (e.g. cellulase, PETase, MHETase and others). An example of a biological substance includes small or microbial organisms (e.g. worms, fungi, or bacteria).

Still referring generally to FIG. 1A, an embodiment includes the base, chamber and fluidic channels that comprises one or more of the following materials: polymer, glass, or metal. In an embodiment, the treated surface or coated surface 7 of the chamber 17 being of polymer material may comprise one or more of the following thermoplastic, thermoset, or elastomeric materials: Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP). In an embodiment the base 13, chamber 17, and fluidic channels 15 are compatible with the substance 1 intended to be retained by, received by, and/or released from said fiber-based substrate (e.g., glass microfiber substrate) 33.

In an embodiment, the base 13 may be constructed by laminating multiple layers of a polymeric substance or other suitable material disclosed herein, by 3D printing, or by a plurality of other construction methods. Depending on the construction method of the base 13, the chamber(s) may be constructed by punching a hole(s) in each laminated layer, by 3D printing multiple voids, or by another method demanded by the construction method of the base. The fluidic channels 15 may be constructed by etching, carving, printing voids, or by another method demanded by the construction method of the base 13. The fluidic device 11 (or microfluidic device or nanofluidic device) or any components of such device may be may be fabricated via: glass etching, photolithography, print-cut-laminate (PCL), injection molding, 3D printing, computer numerical controlled (CNC) micromachining, embossing, casting/molding, laser ablating/printing, deposition, and lamination, etc. The construction and fabrication methods may be applied to any embodiments or aspects of embodiments disclosed herein.

FIG. 1B schematically illustrates a plan view of an embodiment generally reflected as the fluidic device 11 of FIG. 1A (as well as FIG. 2E). The device 11 further comprises a vent 20 and a valve 21 in fluidic communication with at least one microfluidic channel or nanofluidic channel 15. This embodiment may be configured for, but not necessarily, centrifugal forces (or other active forces or alternatively passive forces). The base is illustrated as circular but may be a variety of geometries, shapes and contours.

FIG. 1C schematically illustrates a plan view of an embodiment generally reflected as the fluidic device 11 of FIG. 1A (as well as FIG. 2E). The device further comprises a vent 20 in fluidic communication with at least one microfluidic channel 15. This embodiment may be configured for, but not necessarily, non-centrifugal forces (or other active forces or alternatively passive forces). The base is illustrated as rectangular but may be a variety of geometries, shapes and contours.

FIG. 1D provides a micrographic depiction of a portion of an embodiment of a glass microfiber substrate 33 generally reflected in the fluidic device 11 of FIGS. 1A and 1E.

Figure 2A:
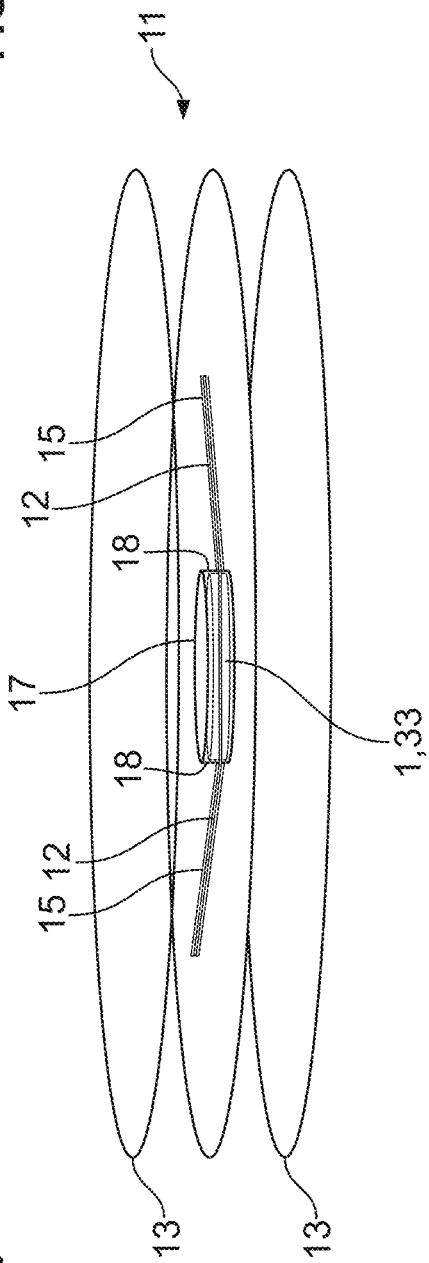
Figure 2B:
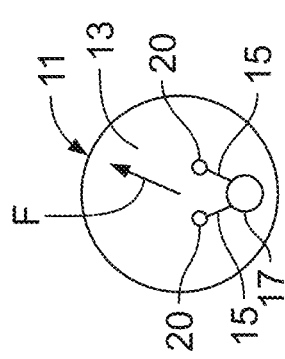

FIGS. 2A-2C correspond with the fluidic device 11 reflected in FIGS. 1A-1C, respectively, and further depicts a fluid flow path 12 as related to an aspect of an embodiment. In an application of an embodiment, but not limited thereto, fluid may travel within the device 11 through a first multi-directional microfluidic channel 15 into the chamber 17 through the access ports 18; through the fiber-based substrate (e.g., glass microfiber substrate) 33 with the substance 1 disposed onto the fiber-based substrate (e.g., glass microfiber substrate) 33; and out of the chamber 17 through the second multidirectional microfluidic channel 15. In an embodiment, the flow path 12 may pass through a variety of fluidic channels 15 (e.g., passages) and fluidic elements (e.g., components) and may start and finish at a variety of locations on the base 13 and fluidic device 11 as desired or required for structural demands and operational requirements. The fluidic device 11 may have a plurality of various fluidic channels 15 (e.g., passages) and fluidic elements (e.g., components) positioned on and spanning across various peripheries and regions of the base 13 and device 11 as desired or required for structural demands and operational requirements.

Referring generally to FIGS. 1E and 2A-2C, for example but not wishing to be constrained by the illustrated depictions reflected in said cited Figures, FIG. 1E schematically illustrates a chamber 17 for use with a fluidic device 11 (as schematically illustrated in the exploded view) wherein the chamber 17 houses a fiber-based substrate (e.g., glass microfiber substrate) 33 that is disposed in the chamber 17, and wherein the fiber-based substrate (e.g., glass microfiber substrate) 33 is configured to retain, receive and/or release a substance 1. Further, in an embodiment, an area 7 of said chamber 17 includes a treated surface or coated surface that is compatible with the substance 1 intended to be retained by, received by, and/or released from said fiber-based substrate (e.g., microfiber substrate) 33. Further still, in an embodiment, the glass substrate 33 is configured in such a manner as to prevent the retained substance 1 thereon from contacting other regions of said fluidic device 11, beyond said treated area or said coated area 7 of said chamber 17, during retention of said substance 1 on said fiber-based substrate (e.g., glass microfiber substrate) 33.

Still referring generally to FIG. 1E, an embodiment provides a fluidic device 11 (as schematically illustrated in the exploded view) configured for use with said chamber 17 that includes a base 13 wherein the chamber 17 is disposed in said base. The base, fluidic channels, and chamber (such as other than said treated surface or coated surface of the chamber), are incompatible with the substance intended to be retained by, received by, and/or released from said glass microfiber substrate. In an embodiment, the fluidic device 11 further comprises fluidic channels 15 disposed on said base 13 wherein said fluidic channels 15 are configured to be in fluidic communication with said chamber 17 in a manner to define a fluid flow path 12. The glass microfiber substrate 33, disposed within said chamber 17, is positioned in the defined fluid flow path 12, wherein the glass microfiber substrate 33 is configured to retain, receive, and/or release a substance 1 thereon and be compatible with the substance 1 intended to be retained by, received by, and/or released from said fiber-based substrate (e.g., microfiber substrate) 33. In an embodiment, the chamber 17 includes one or more accesses including a first access 18 and/or a second access 18 to provide for the fluidic communication between said chamber 17 and said fluidic channels 15.

Still referring generally to FIG. 1E, in an embodiment the base 13 may be one of the following: one or more material layers, microfluidic chip, nanofluidic chip, disk, housing, container, vessel, platform, or any surface (or structure) that can retain, hold or house said fiber-based substrate (e.g., microfiber glass substrate and said chamber). In an embodiment, the channels 15 include one of the following: microchannels, nanochannels, pathways, or passages. In an embodiment, the material of said fiber-based substrate 33 may include, but is not limited thereto or more of the following: glass microfiber or glass nanofiber. The glass may be one of more of the following: soda-lime, borosilicate, or quartz. In an embodiment, the fiber-based substrate may include, but is not limited thereto, one of more of the following stainless steel microfiber, stainless steel nanofiber, polypropylene microfiber or polypropylene nanofiber. In an embodiment, the substrate may be comprised of other fiber-based materials (or other types of materials) as desired or required to effectuate storage; meet the environmental and structural demands and operational requirements. In an embodiment, device 11 further comprises: a vent 20 in fluidic communication with at least one said fluidic channel 15; and/or a valve 21 in fluidic communication with at least one said fluidic channel 15 (as well an any other fluidic element as required or desired to be in fluidic communication with at least one fluidic channel or other fluidic element). In an embodiment, the chamber 17 includes one of the following: cavity, cylinder, cell, recess, compartment, aperture, receptacle, or widened-fluidic channel.

Still referring generally to FIG. 1E, as well as FIGS. 1B and 1C, an embodiment of the device 11 is configured to be subjected to an active force F; and wherein any traveling of the substance 1 on the fluid flow path 12 is a result of the active force, F, incurred on or applied to said device 11. In an embodiment, the active force, F, causes angular acceleration of the device 11 resulting in an apparent centrifugal force, wherein any traveling of the substance 1 on the fluid flow path 12 is a result of the centrifugal force experienced on said device 11 as a result of angular acceleration of said device (e.g., spinning of said device). In an embodiment, the active force F is one or more of the following: external fluid pressure, external gas pressure, internal hydrodynamic pressure, electrokinetic, dielectrophoretic, magnetic, or optical. For example, but is not limited thereto, in an embodiment the device 11 may be exposed to different forms of applied force to induce traveling, such as mechanical, angular acceleration, apparent centrifugal, heat energy, gas expansion, pneumatic, vacuum or laser or mechanical puncture. In an embodiment, the device is configured to be subjected to a passive force F; and wherein any traveling of the substance 1 on the fluid flow path 12 is a result of the passive force F incurred on or applied to said device 11. In an embodiment, the passive force, F, includes one or more of the following: gravity or interfacial surface tension gradients.

Still referring generally to FIG. 1E, an embodiment provides the substance that is one or more of the following: chemical substance, biochemical substance, or biological substance. An example of a chemical substance includes one of the following: corrosive reagents (including but not limited thereto: concentrated acids and strong oxidizers) and volatile liquids (including but not limited to: volatile organic solvents). An example of a biochemical substance includes hydrolase enzymes (e.g. cellulase, PETase, MHETase and others). An example of a biological substance includes microbial organisms (e.g. worms, fungi, or bacteria).

Still referring generally to FIG. 1E, an embodiment includes the treated surface or coated surface 7 of the chamber 17 that comprises one or more of the following materials: polymer, glass, or metal. In an embodiment, the treated surface or coated surface 7 of the chamber 17 being of polymer material may comprise one or more of the following thermoplastic, thermoset, or elastomeric materials: Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP). In an embodiment the treated surface or coated surface 7 of the chamber 17 are compatible with the substance 1 intended to be retained by, received by, and/or released from said fiber-based substrate (e.g., glass microfiber substrate) 33.

Referring generally to FIGS. 3-12, for example but not wishing to be constrained by the illustrated depictions reflected in said cited Figures, FIGS. 3-12 schematically illustrate a capsule 41 for use with a fluidic device 11 (as schematically illustrated in the exploded view). The capsule 41 is configured to encapsulate a fiber-based substrate (e.g., glass microfiber substrate) 33 that is disposed in the capsule 41. The fiber-based substrate (e.g., glass microfiber substrate) 33 is configured to retain, receive, and/or release a substance 1. In an embodiment, the capsule 41 is configured in such a manner as to prevent the retained substance 1 on said fiber-based substrate (e.g., glass microfiber substrate) 33 and within the capsule 41 from contacting other regions of the fluidic device 11 outside said capsule 41. In an embodiment, the fiber-based substrate (e.g., glass substrate) 33 is configured in such a manner as to prevent the retained substance 1 thereon from contacting other regions of the fluidic device 11 outside the capsule 41. In an embodiment, the fiber-based substrate (e.g., glass substrate) 33 is configured in such a manner as to prevent the retained substance 1 thereon from contacting other regions of said fluidic device 11, beyond the perimeter of said fiber-based substrate (e.g., glass microfiber substrate) 33, during retention of said substance 1 on said fiber-based substrate (e.g., glass microfiber).

Figure 3C:
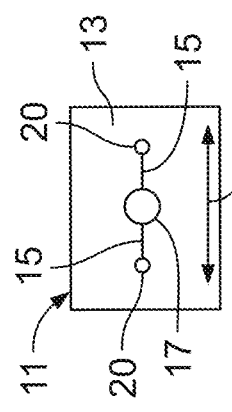
FIG. 3C schematically illustrates a plan view of an embodiment generally reflected as the fluidic device of FIG. 3A.
Figure 3D:
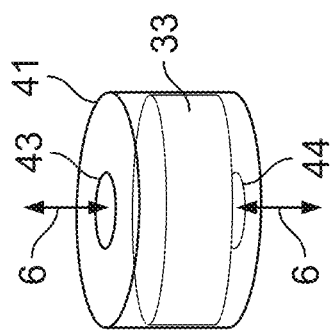
FIG. 3D schematically illustrates an enlarged view of an embodiment of the capsule generally reflected in FIG. 3A with bidirectional fluid flow capabilities depicted.
Figure 3A:
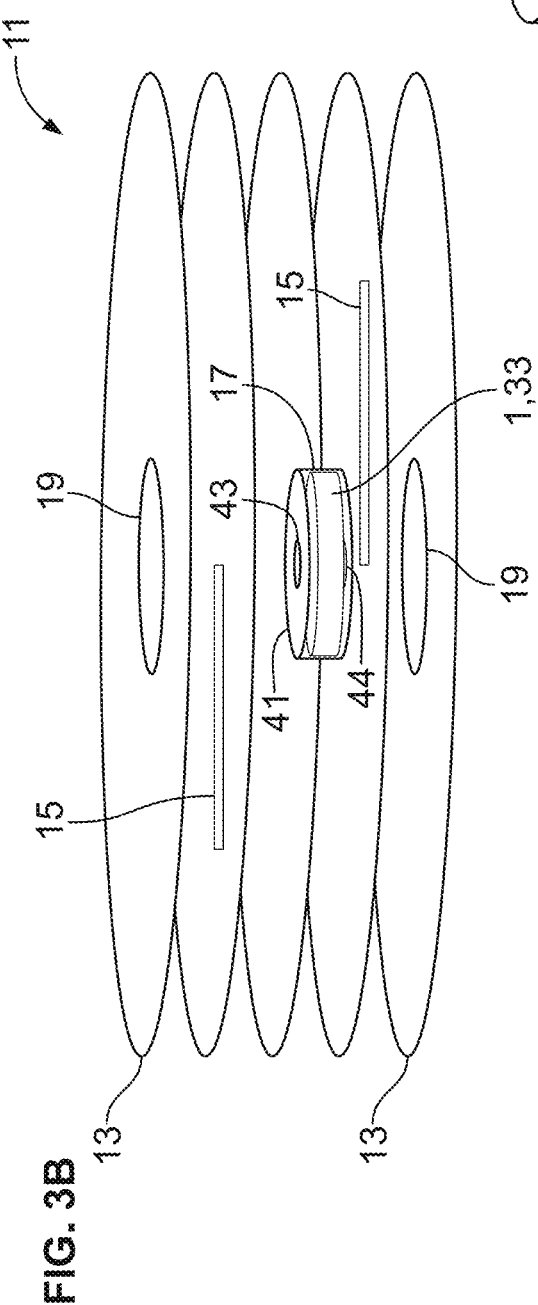
FIG. 3A schematically illustrates an exploded view of an embodiment of a fluidic device that includes a chamber and capsule disposed in the base, wherein a fiber-based substrate (e.g., glass microfiber substrate or glass nanofiber substrate) is disposed in the capsule.

FIG. 3A is a schematic illustration of an exploded view of an embodiment of a fluidic device 11. The illustrated fluidic device 11 of FIG. 3A (as schematically illustrated in the exploded view) is configured for use with the capsule 41 and comprises a base 13, a chamber 17 disposed in the base 13; and wherein the capsule 41 is disposed in the chamber 17. In an embodiment, the base 13, chamber 17, and fluidic channels 15 are incompatible with the substance 1 intended to be retained by, received by, and/or released from the fiber-based substrate (e.g., glass microfiber substrate) 33. In an embodiment, the fluidic device 11 may comprise fluidic channels 15 disposed on the base 13 wherein the fluidic channels 15 are configured to be in fluidic communication with the capsule 41 in a manner to define a fluid flow path 12. Further, the fiber-based substrate (e.g., glass microfiber substrate) 33, which is disposed within said capsule 41, is positioned in the defined fluid flow path 12, and wherein the fiber-based substrate (e.g., glass microfiber substrate) 33 is compatible with the substance 1 intended to be retained by, received by, and/or released from the fiber-based substrate (e.g., microfiber substrate) 33. In an embodiment, the capsule 41 includes one or more ports, including a first port 43 and/or a second port 44 to provide for the fluidic communication with the fluidic channels 15.

Still referring to FIG. 3A, in an embodiment the fluid device 11 may comprise a barrier 19 disposed in the base 13 adjacent to the first port 43 and/or second port 44, wherein the barrier 19 is compatible with the substance 1 intended to be retained by, received by, and/or released from the fiber-based substrate (e.g., glass microfiber substrate) 33, wherein said barrier 19 is positioned to protect the incompatible base 13 from contact with the fluid flow 12 at the vicinity of the first port 43 and/or second port 44. In an embodiment, the barrier 19 may be a vapor cover. In an embodiment, the barrier 19 may comprises one or more of the following materials: polymer, glass, or metal (or other suitable materials that are compatible with the substance 1 intended to be retained by, received by, and/or released from the fiber-based substrate (e.g., glass microfiber substrate) 33).

Still referring generally to FIG. 3A, in an embodiment the base 13 includes one of the following: one or more material layers, microfluidic chip, nanofluidic chip, disk, housing, container, vessel, platform, or any surface (or structure) that can retain, hold or house said fiber-based substrate (e.g., microfiber glass substrate) 33 and said chamber 17. In an embodiment, the channels 15 include one of the following: microchannels, nanochannels, pathways, trenches, grooves, capillaries, or passageways. In an embodiment, the material of said fiber-based substrate 33 may include, but is not limited thereto one or more of the following materials: glass microfiber or glass nanofiber. The glass may be one of more of the following: soda-lime, borosilicate, or quartz. In an embodiment, the fiber-based substrate may include, but is not limited thereto, one of more of the following stainless steel microfiber, stainless steel nanofiber, polypropylene microfiber or polypropylene nanofiber. In an embodiment, the substrate may be comprised of other fiber-based materials (or other types of materials) as desired or required to effectuate storage; meet the environmental and structural demands and operational requirements. In an embodiment, device 11 further comprises: a vent 20 in fluidic communication with at least one said fluidic channel 15; and/or a valve 21 in fluidic communication with at least one said fluidic channel 15 (as well an any other fluidic element as required or desired to be in fluidic communication with at least one fluidic channel or other fluidic element). In an embodiment, the chamber 17 includes one of the following: cavity, cylinder, cell, recess, compartment, aperture, receptacle, or widened-fluidic channel. In an embodiment, the capsule includes one of the following: container, repository, receptacle, or holder.

Figure 3B:
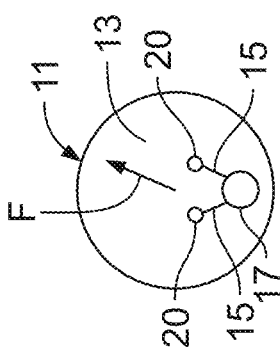
FIG. 3B schematically illustrates a plan view of an embodiment generally reflected as the fluidic device of FIG. 3A.

Still referring generally to FIG. 3A, as well as FIGS. 3B and 3C, an embodiment of the device 11 is configured to be subjected to an active force, F; and wherein any traveling of the substance 1 on the fluid flow path 12 is a result of the active force, F, incurred on or applied to said device 11. In an embodiment, the active force, F, experienced on said device 11 is a result of angular acceleration of said device 11, wherein any traveling of the substance 1 on the fluid flow path 12 is a result of the angular acceleration experienced on said device 11 (e.g., as a result of said device spinning). In an embodiment, the active force, F, is one or more of the following: external fluid pressure, external gas pressure, internal hydrodynamic pressure, electrokinetic, dielectrophoretic, magnetic, or optical. For example, but not limited thereto, in an embodiment the device 11 may be exposed to different forms of applied force to induce traveling, such as mechanical, angular acceleration, heat energy, gas expansion, pneumatic, vacuum or laser or mechanical puncture. In an embodiment, the device 11 is configured to be subjected to a passive force, F; and wherein any traveling of the substance 1 on the fluid flow path 12 is a result of the passive force, F, incurred on or applied to said device 11. In an embodiment, the passive force, F, includes one or more of the following: gravity or interfacial surface tension gradients.

Still referring generally to FIG. 3A, an embodiment provides the substance that is one or more of the following: chemical substance, biochemical substance, or biological substance. An example of a chemical substance includes one of the following: corrosive reagents (including but not limited to: concentrated acids and strong oxidizers) and volatile liquids (including but not limited to: volatile organic solvents). An example of a biochemical substance includes hydrolase enzymes (e.g. cellulase, PETase, MHETase and others). An example of a biological substance includes small or microbial organisms (e.g. worms, fungi, or bacteria).

Still referring generally to FIG. 3A, in an embodiment the capsule 41 comprises one or more of the following materials: polymer, glass, or metal. In an embodiment, the capsule 41 being of polymer material may comprise one or more of the following thermoplastic, thermoset, or elastomeric materials: Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP). In an embodiment, the capsule 41 is compatible with the substance 1 intended to be retained by, received by, and/or released from said fiber-based substrate (e.g., glass microfiber substrate) 33.

In an embodiment, the fluidic device 11 further comprises: a barrier 19 disposed in the base 13 adjacent to an area wherein said capsule 41 establishes communication with said fluidic channels 15, and wherein said barrier 18 is compatible with the substance 1 intended to be retained by, received by, and/or released from said fiber-based substrate (e.g., glass microfiber substrate) 33, wherein said barrier 19 is positioned to protect said incompatible base 13 from contact with the fluid flow 12 at the vicinity of the communication area. In an embodiment, the barrier 19 is a vapor cover. In an embodiment, the barrier 19 comprises one or more of the following materials: polymer, glass, or metal.

FIG. 3B schematically illustrates a plan view of an embodiment generally reflected as the fluidic device 11 of FIG. 3A. The device 11 further comprises a vent 20 and a valve 21 in fluidic communication with at least one microfluidic channel 15 disposed on the base 13. This embodiment may be configured for, but not necessarily, centrifugal forces (or other active forces or alternatively passive forces). The base is illustrated as circular but may be a variety of geometries, shapes and contours.

FIG. 3C schematically illustrates a plan view of an embodiment generally reflected as the fluidic device 11 of FIG. 3A. The device further comprises a vent 20 in fluidic communication with at least one microfluidic channel 15 disposed on the base 13. This embodiment may be configured for, but not necessarily, non-centrifugal forces (or other active forces or alternatively passive forces). The base is illustrated as rectangular but may be a variety of geometries, shapes and contours.

FIGS. 4A-4C correspond with the fluidic device 11 reflected in FIGS. 3A-3C, respectively, and further depicts a fluid flow path 12 as related to an aspect of an embodiment. In an application of an embodiment, but not limited thereto, fluid may travel within the device 11 through a first multi-directional microfluidic channel 15 into the capsule 41 through the first port 43; through the glass microfiber substrate 33 with the substance 1 disposed onto the glass microfiber substrate 33; and out of the capsule 41 through the second port 44 through the second multidirectional microfluidic channel 15. In an embodiment, the flow path 12 may pass through a variety of fluidic channels 15 (e.g., passages) and fluidic elements (e.g., components) and may start and finish at a variety of locations on the base 13 and fluidic device 11 as desired or required for structural demands and operational requirements. The fluidic device 11 may have a plurality of various fluidic channels 15 (e.g., passages) and fluidic elements (e.g., components) positioned on and spanning across various peripheries and regions of the base 13 and device 11 as desired or required for structural demands and operational requirements.

Figure 5C:
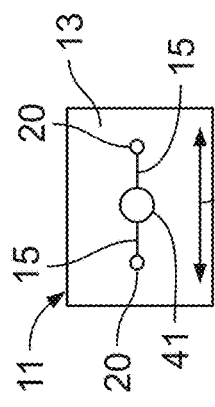
FIG. 5C schematically illustrates a plan view of an embodiment generally reflected as the fluidic device of FIG. 5A.
Figure 5A:
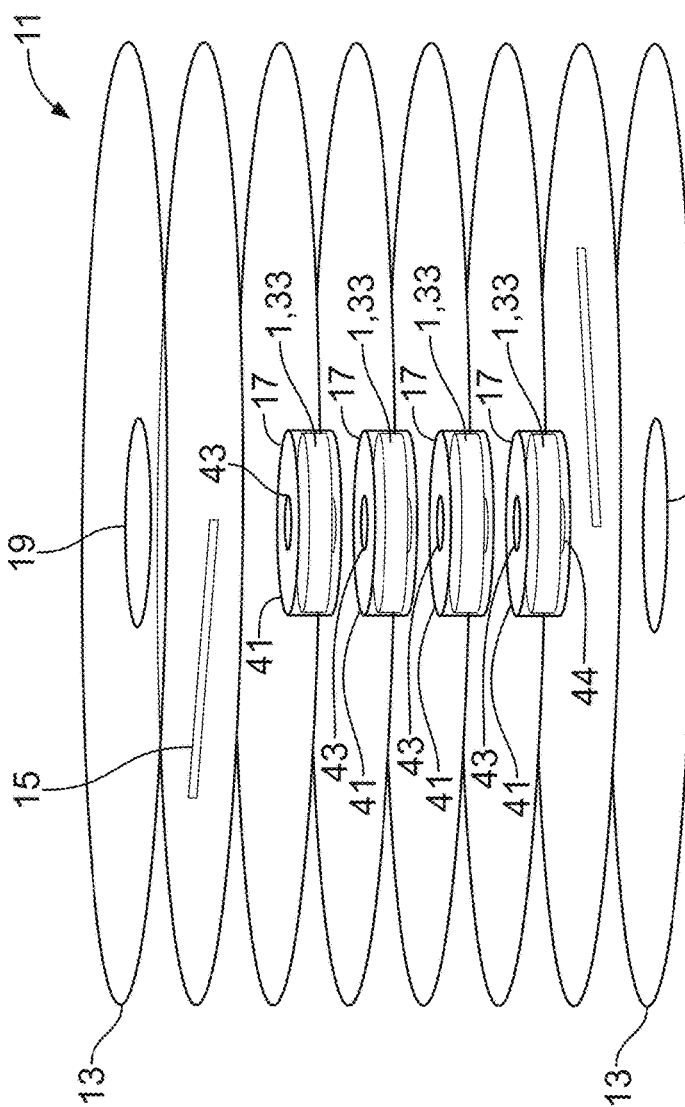
FIG. 5A schematically illustrates an exploded view of an embodiment of a fluidic device that includes an arrangement of chambers and capsules disposed in the base, wherein a fiber-based substrate (e.g., glass microfiber substrate or glass nanofiber substrate) is disposed in the respective capsules.

Referring generally to FIG. 5A, for example but not wishing to be constrained by the illustrated depictions reflected in said cited Figures, FIG. 5A schematically illustrates a base 13 that provides sufficient volume or thickness as to permit an arrangement of multiple of said capsules 41 in series disposed in said base 13 of the fluidic device 11 (as schematically illustrated in the exploded view). In an embodiment, the individual capsules 41, with said fiber-based substrate (e.g., glass-microfiber substrate) 33 disposed therein, are positioned in such a manner that said first port 43 and second port 44 of individual said capsules 41 are arranged to enable sequential fluid flow 12 to travel through said arranged capsules 41 within said base 13. In an embodiment, the arrangement of the capsules 41 include a vertical alignment in said base 13 or a stacking in said base 13. As the fluidic device 11 is illustrated in an exploded view, the plurality of capsules may be located in a single continuous chamber 17 of the base 13, such as an open cylinder or aperture.

Figure 5B:
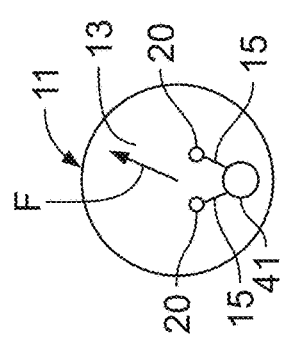
FIG. 5B schematically illustrates a plan view of an embodiment generally reflected as the fluidic device of FIG. 5A.

FIG. 5B schematically illustrates a plan view of an embodiment generally reflected as the fluidic device 11 of FIG. 5A. The device 11 further comprises a vent 20 and a valve 21 in fluidic communication with at least one microfluidic channel 15 disposed on the base 13. This embodiment may be, but not necessarily, configured for centrifugal forces (or other active forces or alternatively passive forces). The base is illustrated as circular but may be a variety of geometries, shapes and contours.

FIG. 5C schematically illustrates a plan view of an embodiment generally reflected as the fluidic device 11 of FIG. 5A. The device further comprises a vent 20 in fluidic communication with at least one microfluidic channel 15 disposed on the base 13. This embodiment may be configured for, but not necessarily, non-centrifugal forces (or other active forces or alternatively passive forces). The base is illustrated as rectangular but may be a variety of geometries, shapes and contours.

Figure 6C:
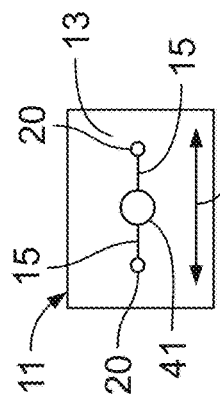
FIGS. 6A-6C correspond with the fluidic device reflected in FIGS. 5A-5C, respectively, and further depicts in FIG. 6A a fluid flow path as related to an aspect of an embodiment.
Figure 6A:
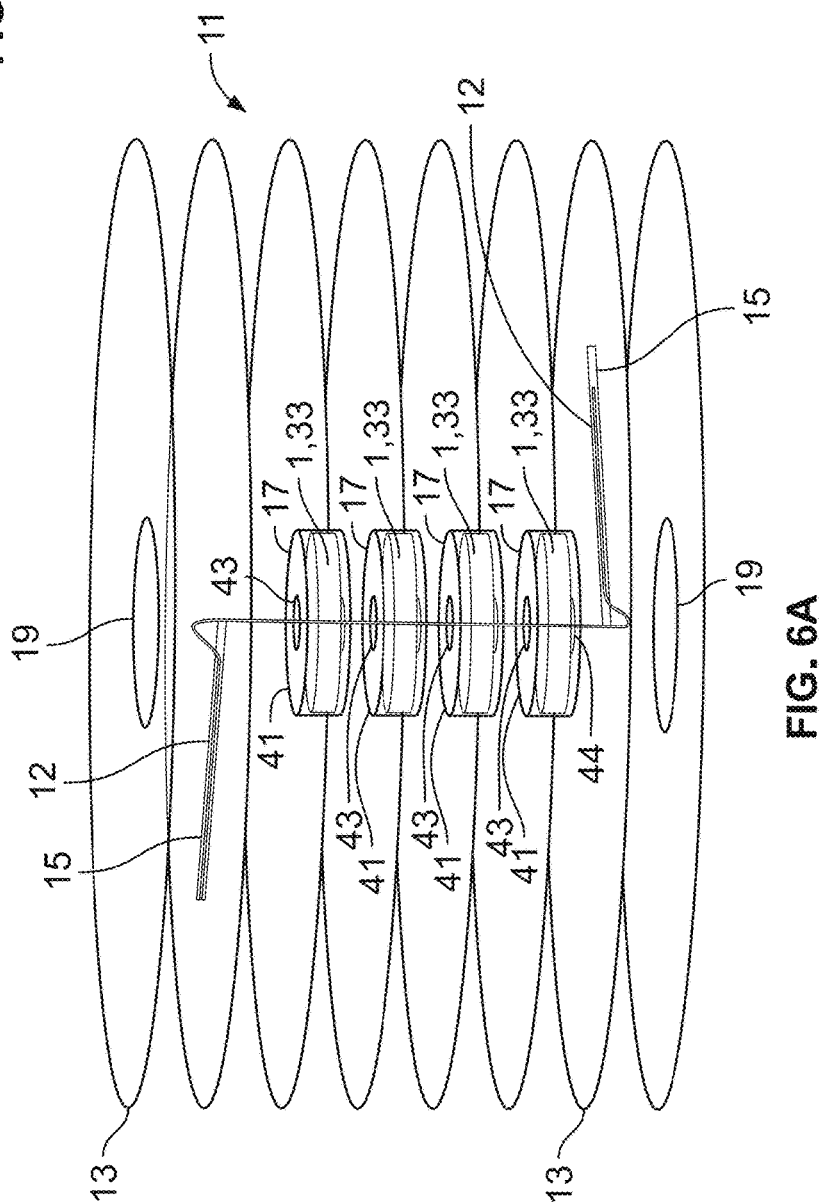
Figure 6B:
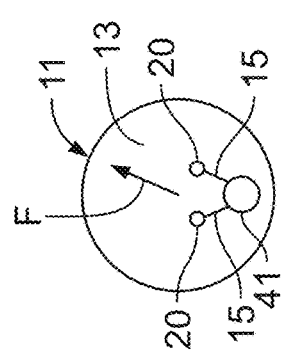

FIGS. 6A-6C correspond with the fluidic device 11 reflected in FIGS. 5A-5C, respectively, and further depicts a fluid flow path 12 as related to an aspect of an embodiment. In an application of an embodiment, but not limited thereto, fluid may travel within the device 11 through a first multi-directional microfluidic channel 15 into the first capsule 41 through its first port 43; through its respective glass microfiber substrate 33 with the substance 1 disposed onto the fiber-based substrate (e.g., glass microfiber substrate) 33; and out of the first capsule 41 through its second port 44 and then through the designated remaining capsules 41 in a similar fashion and subsequently through the second multi-directional microfluidic channel 15. In an embodiment, the flow path 12 may pass through a variety of fluidic channels 15 (e.g., passages) and fluidic elements (e.g., components) and may start and finish at a variety of locations on the base 13 and fluidic device 11 as desired or required for structural demands and operational requirements. The fluidic device 11 may have a plurality of various fluidic channels 15 (e.g., passages) and fluidic elements (e.g., components) positioned on and spanning across various peripheries and regions of the base 13 and device 11 as desired or required for structural demands and operational requirements.

Figure 7C:
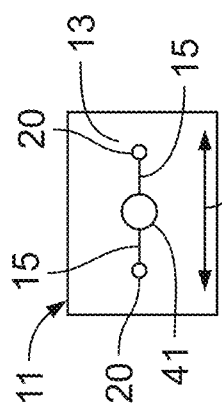
FIG. 7C schematically illustrates a plan view of an embodiment generally reflected as the fluidic device of FIG. 7A.
Figure 7D:
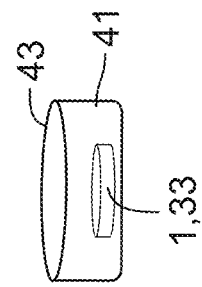
FIG. 7D schematically illustrates an embodiment of the capsule generally reflected in FIG. 7A with an alternative fiber-based substrate (e.g., glass microfiber substrate or glass nanofiber substrate) depicted therein.
Figure 7A:
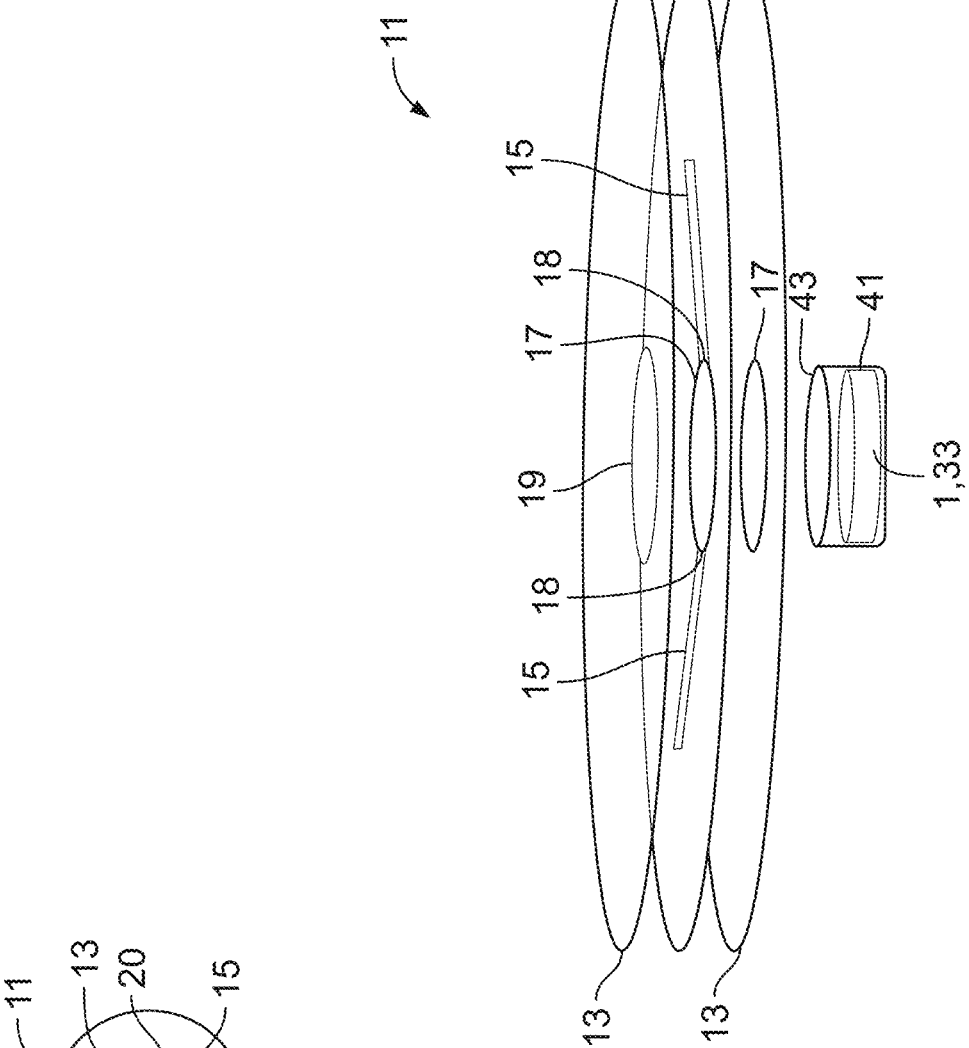
FIG. 7A schematically illustrates an exploded view of an embodiment of a fluidic device that includes a chamber and capsule disposed in relation to the base, and wherein a fiber-based substrate (e.g., glass microfiber substrate or glass nanofiber substrate) is disposed in the capsule.

FIG. 7A is a schematic illustration of an exploded view of an embodiment of a fluidic device 11 (as schematically illustrated in the exploded view). The illustrated fluidic device 11 of FIG. 7A is configured for use with the capsule 41 and comprises a base 13, a chamber 17 disposed in the base 13; and wherein the capsule 41 is configured to be in fluidic communication with the chamber 17. In an embodiment, the base 13, chamber 17, and fluidic channels 15 are incompatible with the substance 1 intended to be retained by, received by, and/or released from the fiber-based substrate (e.g., glass microfiber substrate) 33. In an embodiment, the capsule 41 may be utilized with one of the following implementations: a) said capsule 41 is configured to be attachable for connecting in mechanical communication with said base 13; b) said capsule 41 is configured to be both attachable for connecting in mechanical communication with said base 13 as well as being detachable for disconnecting from mechanical communication with said base 13; c) said capsule 41 is configured to be fixedly disposed to said base 13; or d) said capsule 41 is configured to be partially encapsulated by said base 13. In an embodiment, fluidic channels 15 are disposed on said base 13 wherein said fluidic channels 15 are configured to be in fluidic communication with said capsule 41 in a manner to define the fluid flow path 12. Further, the fiber-based substrate (e.g., glass microfiber substrate) 33 is disposed within said capsule 41 positioned in the defined fluid flow path 12, wherein said glass microfiber substrate 33 is configured to retain, receive and/or release a substance 1 thereon and be compatible with the substance 1 intended to be retained by, received by, or released from said microfiber substrate 33. In an embodiment, the capsule 41 includes a first port 43 in fluidic communication with said fluidic channels 15 that enables a fluid flow 12 to travel to or from said capsule 41. In an embodiment, the capsule 41 is in fluidic communication with a first access 18 and a second access 18 of the chamber 17 for the capsule 41 to be fluidic communication with said fluidic channels 15 that enables a fluid flow 12 to travel to or from said capsule 41.

Still referring to FIG. 7A, in an embodiment the fluid device 11 may comprise a barrier 19 disposed in the base 13 adjacent to the first port 43, wherein the barrier 19 is compatible with the substance 1 intended to be retained by, received by, and/or released from the glass microfiber substrate 33, wherein said barrier 19 is positioned to protect the incompatible base 13 from contact with the fluid flow 12 at the vicinity of the first port 43. In an embodiment, the barrier 19 may be a vapor cover. In an embodiment, the barrier 19 may comprises one or more of the following materials: polymer, glass, or metal (or other suitable materials that are compatible with the substance 1 intended to be retained by, received by, and/or released from the fiber-based substrate (e.g., glass microfiber substrate 33).

Still referring generally to FIG. 7A, in an embodiment the base 13 includes one of the following: one or more material layers, microfluidic chip, nanofluidic chip, disk, housing, container, vessel, platform, or any surface (or structure) that can retain, hold or house said fiber-based substrate (e.g., microfiber glass substrate) 33 and said chamber. In an embodiment, the channels 15 include one of the following: microchannels, nanochannels, pathways, trenches, grooves, capillaries, or passageways. In an embodiment, the material of said fiber-based substrate 33 may include, but is not limited thereto one or more of the following: glass microfiber or glass nanofiber. The glass may be one of more of the following: soda-lime, borosilicate, or quartz. In an embodiment, the fiber-based substrate may include, but is not limited thereto, one of more of the following stainless steel microfiber, stainless steel nanofiber, polypropylene microfiber or polypropylene nanofiber. In an embodiment, the substrate may be comprised of other fiber-based materials (or other types of materials) as desired or required to effectuate storage; meet the environmental and structural demands and operational requirements. In an embodiment, device 11 further comprises: a vent 20 in fluidic communication with at least one said fluidic channel 15; and/or a valve 21 in fluidic communication with at least one said fluidic channel 15 (as well an any other fluidic element required or desired to be in fluidic communication with at least one fluidic channel or other fluidic element). In an embodiment, the chamber 17 includes one of the following: cavity, cylinder, cell, recess, compartment, aperture, receptacle, or widened-fluidic channel. In an embodiment, the capsule includes one of the following: container, repository, receptacle, or holder.

Figure 7B:
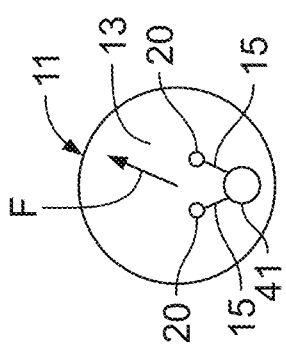
FIG. 7B schematically illustrates a plan view of an embodiment generally reflected as the fluidic device of FIG. 7A.

Still referring generally to FIG. 7A, as well as FIGS. 7B and 7C, an embodiment of the device 11 is configured to be subjected to an active force F; and wherein any traveling of the substance 1 on the fluid flow path 12 is a result of the active force, F, incurred on or applied to said device 11. In an embodiment, the active force, F, is an apparent centrifugal force, wherein any traveling of the substance 1 on the fluid flow path 12 is a result of the angular acceleration experienced on said device 11 (e.g., as a result of said device spinning). In an embodiment, the active force F is one or more of the following: external fluid pressure, external gas pressure, internal hydrodynamic pressure, electrokinetic, dielectrophoretic, magnetic, or optical. For example, but is not limited thereto, in an embodiment the device 11 may be exposed to different forms of applied force to induce traveling, such as mechanical, angular acceleration, heat energy, gas expansion, pneumatic, vacuum or laser or mechanical puncture. In an embodiment, the device 11 is configured to be subjected to a passive force F; and wherein any traveling of the substance 1 on the fluid flow path 12 is a result of the passive force F incurred on or applied to said device 11. In an embodiment, the passive force F includes one or more of the following: gravity or interfacial surface tension gradients.

Still referring generally to FIG. 7A, an embodiment provides the substance that is one or more of the following: chemical substance, biochemical substance, or biological substance. An example of a chemical substance includes one of the following: corrosive reagents (including but not limited to: concentrated acids and strong oxidizers) and volatile liquids (including but not limited to: volatile organic solvents). An example of a biochemical substance includes hydrolase enzymes (e.g. cellulase, PETase, MHETase and others). An example of a biological substance includes small or microbial organisms (e.g. worms, fungi, or bacteria).

Still referring generally to FIG. 7A, in an embodiment the capsule 41 comprises one or more of the following materials: polymer, glass, or metal. In an embodiment, the capsule 41 being of polymer material may comprise one or more of the following thermoplastic, thermoset, or elastomeric materials: Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP). In an embodiment, the capsule 41 is compatible with the substance 1 intended to be retained by, received by, and/or released from said fiber-based substrate (e.g., glass microfiber substrate) 33.

In an embodiment, the fluidic device 11 further comprises: a barrier 19 disposed in the base 13 adjacent to an area wherein said capsule 41 establishes communication with said fluidic channels 15, and wherein said barrier 18 is compatible with the substance 1 intended to be retained by, received by, and/or released from said fiber-based substrate (e.g., glass microfiber substrate) 33, wherein said barrier 19 is positioned to protect said incompatible base 13 from contact with the fluid flow 12 at the vicinity of the communication area. In an embodiment, the barrier 19 is a vapor cover. In an embodiment, the barrier 19 comprises one or more of the following materials: polymer, glass, or metal.

FIG. 7B schematically illustrates a plan view of an embodiment generally reflected as the fluidic device 11 of FIG. 7A. The device 11 further comprises a vent 20 and a valve 21 in fluidic communication with at least one microfluidic channel 15 disposed on the base 13. This embodiment may be configured for, but not necessarily, centrifugal forces (or other active forces or alternatively passive forces). The base is illustrated as circular but may be a variety of geometries, shapes and contours.

FIG. 7C schematically illustrates a plan view of an embodiment generally reflected as the fluidic device 11 of FIG. 7A. The device further comprises a vent 20 in fluidic communication with at least one microfluidic channel 15 disposed on the base 13. This embodiment may be configured for, but not necessarily, non-centrifugal forces (or other active forces or alternatively passive forces). The base is illustrated as rectangular but may be a variety of geometries, shapes and contours.

FIG. 7D schematically illustrates an embodiment of the capsule 41 generally reflected in FIG. 7A with an alternative glass microfiber substrate 33 depicted therein. The specified diameter or width of the fiber-based substrate (e.g., glass microfiber substrate) 33 is designed to be less that the diameter or width of the capsule 41. The glass microfiber substrate 33 may take on all shapes along the entire continual geometric spectrum of manipulation of x, y and z planes to provide and meet the environmental and structural demands and operational requirements.

Figure 8C:
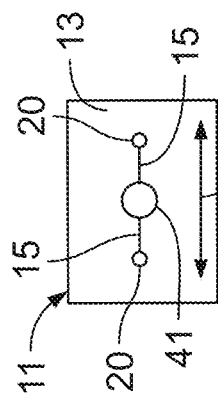
FIGS. 8A-8C correspond with the fluidic device reflected in FIGS. 7A-7C, respectively, and further depicts in FIG. 8A a fluid flow path as related to an aspect of an embodiment.
Figure 8A:
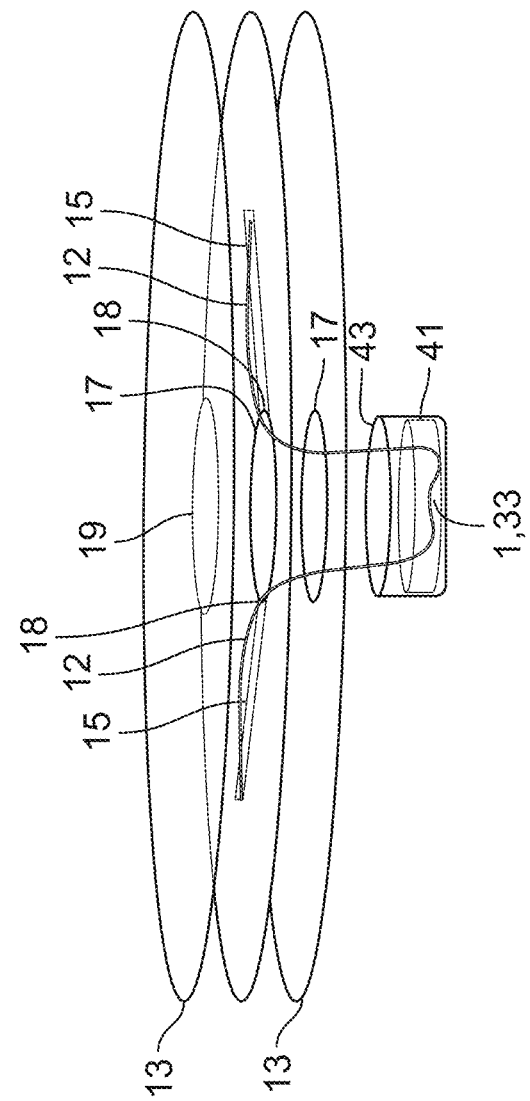
Figure 8B:
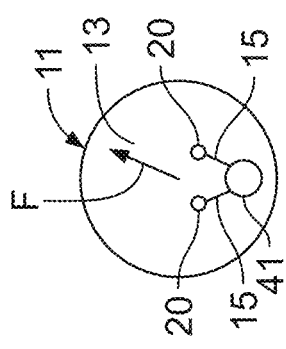

FIGS. 8A-8C correspond with the fluidic device 11 reflected in FIGS. 7A-7C, respectively, and further depicts a fluid flow path 12 as related to an aspect of an embodiment. In an application of an embodiment, but not limited thereto, fluid may travel within the device 11 through a first multi-directional microfluidic channel 15 into the capsule 41 through the port 43 (or first access 18 of the chamber 17); through the glass microfiber substrate 33 with the substance 1 disposed onto the fiber-based substrate (e.g., glass microfiber substrate) 33; and out of the capsule 41 through the port 43 (or second access 18 of the chamber 17) through the second multidirectional microfluidic channel 15. In an embodiment, the flow path 12 may pass through a variety of fluidic channels 15 (e.g., passages) and fluidic elements (e.g., components) and may start and finish at a variety of locations on the base 13 and fluidic device 11 as desired or required for structural demands and operational requirements. The fluidic device 11 may have a plurality of various fluidic channels 15 (e.g., passages) and fluidic elements (e.g., components) positioned on and spanning across various peripheries and regions of the base 13 and device 11 as desired or required for structural demands and operational requirements.

Figure 9C:
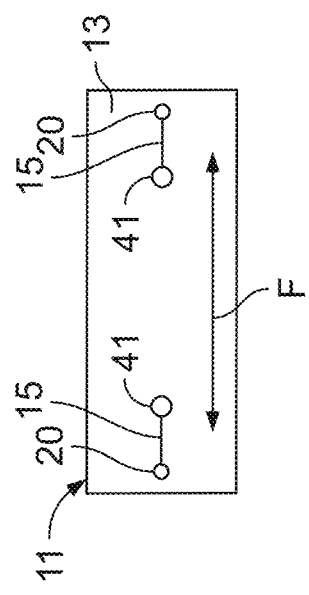
FIG. 9C schematically illustrates a plan view of an embodiment generally reflected as the fluidic device of FIG. 9A.
Figure 9D:
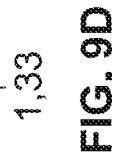
FIG. 9D schematically illustrates an embodiment of the capsule generally reflected in FIG. 9A with an alternative fiber-based substrate (e.g., glass microfiber substrate or glass nanofiber substrate) depicted therein.
Figure 9B:
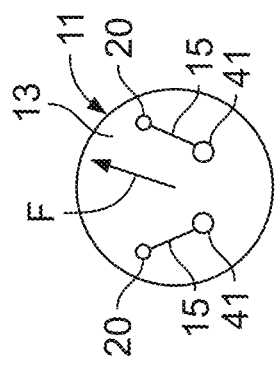
FIG. 9B schematically illustrates a plan view of an embodiment generally reflected as the fluidic device of FIG. 9A.
Figure 9A:
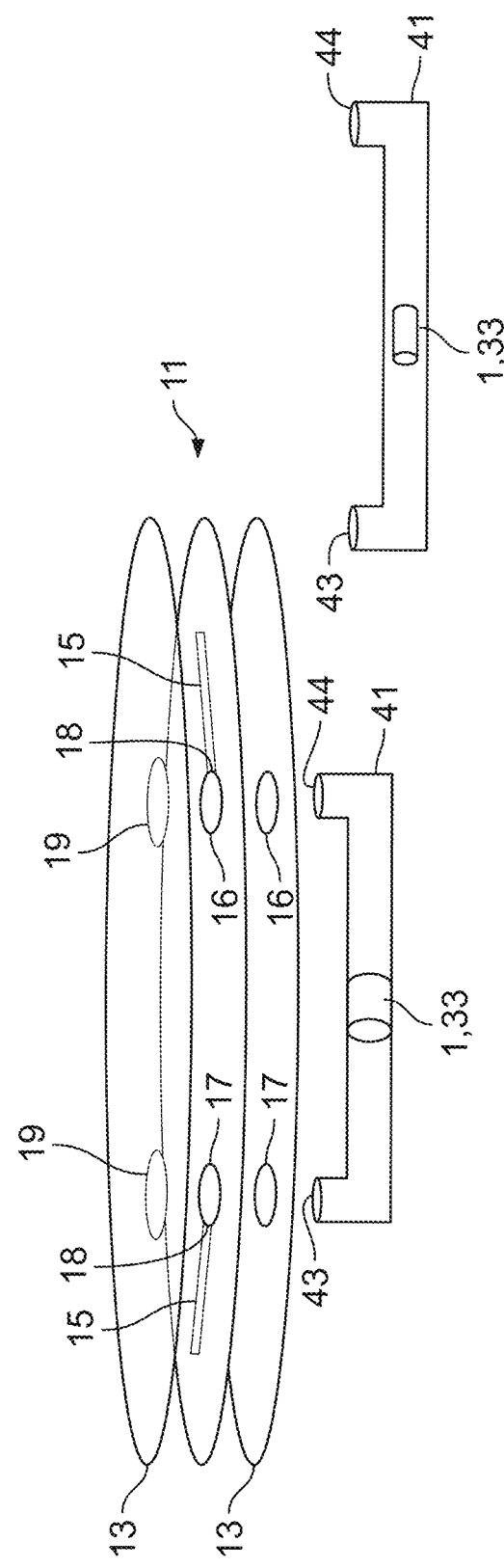
FIG. 9A schematically illustrates an exploded view of an embodiment of a fluidic device that includes a chamber and capsule disposed in relation to the base, wherein a fiber-based substrate (e.g., glass microfiber substrate or glass nanofiber substrate) is disposed in the capsule and the capsule includes multiple ports.

FIG. 9A is a schematic illustration of an exploded view of an embodiment of a fluidic device 11 (as schematically illustrated in the exploded view). The illustrated fluidic device 11 of FIG. 9A is configured for use with the capsule 41 and comprises a base 13; a first chamber 17 disposed in said base 13 and a second chamber 16 disposed in said base 12; and wherein the capsule 41 is configured to be in fluidic communication with each of said first chamber 17 and second chamber 16. In an embodiment, more than two chambers may be implemented. In an embodiment, the base 13, chamber 17, and fluidic channels 15 are incompatible with the substance 1 intended to be retained by, received by, and/or released from the glass microfiber substrate 33. In an embodiment, the capsule 41 may be utilized with one of the following implementations: a) said capsule 41 is configured to be attachable for connecting in mechanical communication with said base 13; b) said capsule 41 is configured to be both attachable for connecting in mechanical communication with said base 13 as well as being detachable for disconnecting from mechanical communication with said base 13; c) said capsule 41 is configured to be fixedly disposed to said base 13; or d) said capsule 41 is configured to be partially encapsulated by said base 13. In an embodiment, fluidic channels 15 are disposed on said base 13 wherein said fluidic channels 15 are configured to be in fluidic communication with said capsule 41 in a manner to define the fluid flow path 12. Further, the fiber-based substrate (e.g., glass microfiber substrate) 33 is disposed within said capsule 41 positioned in the defined fluid flow path 12, wherein said glass microfiber substrate 33 is configured to retain, receive and/or release a substance 1 thereon and be compatible with the substance 1 intended to be retained by, received by, or released from said microfiber substrate 33. In an embodiment, the capsule 41 includes two or more ports, including a first port 43 and second port 44 to provide for the fluidic communication with said first chamber 17 and second chamber 16, respectively.

Still referring to FIG. 9A, in an embodiment the fluid device 11 may comprise a a first barrier 19 disposed in said base adjacent to said first port 43 and a second barrier 19 disposed in said base adjacent to said second port 44, wherein said first barrier 19 and said second barrier 19 are compatible with the substance 1 intended to be retained by, received by, and/or released from said fiber-based substrate (e.g., glass microfiber substrate) 33, wherein said first barrier 19 and said second barrier 19 are positioned to protect said incompatible base 13 from contact with the fluid flow 12 at the vicinity of the said first port 43 and second port 44, respectively. In an embodiment, the first barrier 19 and said second barrier 19 are a vapor cover, respectively. In an embodiment, the first barrier 19 and said second barrier 19 comprise one or more of the following materials: polymer, glass, or metal (or other suitable materials that are compatible with the substance 1 intended to be retained by, received by, and/or released from the fiber-based substrate (e.g., glass microfiber substrate) 33).

Still referring generally to FIG. 9A, in an embodiment the base 13 includes one of the following: one or more material layers, microfluidic chip, nanofluidic chip, disk, housing, container, vessel, platform, or any surface (or structure) that can retain, hold or house said microfiber glass substrate and said chamber. In an embodiment, the channels 15 include one of the following: microchannels, nanochannels, pathways, trenches, grooves, capillaries, or passageways. In an embodiment, the material of said fiber-based substrate 33 may include, but is not limited thereto one or more of the following: glass microfiber or glass nanofiber. The glass may be one of more of the following: soda-lime, borosilicate, or quartz. In an embodiment, the fiber-based substrate may include, but is not limited thereto, one of more of the following stainless steel microfiber, stainless steel nanofiber, polypropylene microfiber or polypropylene nanofiber. In an embodiment, the substrate may be comprised of other fiber-based materials (or other types of materials) as desired or required to effectuate storage; meet the environmental and structural demands and operational requirements. In an embodiment, device 11 further comprises: a vent 20 in fluidic communication with at least one said fluidic channel 15; and/or a valve 21 in fluidic communication with at least one said fluidic channel 15 (as well an any other fluidic element as required or desired to be in fluidic communication with at least one fluidic channel or other fluidic element). In an embodiment, the chamber 17 includes one of the following: cavity, cylinder, cell, recess, compartment, aperture, receptacle, or widened-fluidic channel. In an embodiment, the capsule includes one of the following: container, repository, receptacle, or holder.

Still referring generally to FIG. 9A, as well as FIGS. 9B and 9C, an embodiment of the device 11 is configured to be subjected to an active force F; and wherein any traveling of the substance 1 on the fluid flow path 12 is a result of the active force F incurred on or applied to said device 11. In an embodiment, the active force, F, causes angular acceleration of the device 11 resulting in an apparent centrifugal force, wherein any traveling of the substance 1 on the fluid flow path 12 is a result of the centrifugal force experienced on said device 11 as a result of the centrifugal force experienced on said device as a result of angular acceleration of said device 11 (e.g., spinning of the device). In an embodiment, the active force F is one or more of the following: external fluid pressure, external gas pressure, internal hydrodynamic pressure, electrokinetic, dielectrophoretic, magnetic, or optical. For example, but is not limited thereto, in an embodiment the device 11 may be exposed to different forms of applied force to induce traveling, such as mechanical, angular acceleration, heat energy, gas expansion, pneumatic, vacuum or laser or mechanical puncture. In an embodiment, the device 11 is configured to be subjected to a passive force F; and wherein any traveling of the substance 1 on the fluid flow path 12 is a result of the passive force F incurred on or applied to said device 11. In an embodiment, the passive force F includes one or more of the following: gravity or interfacial surface tension gradients.

Still referring generally to FIG. 9A, an embodiment provides the substance that is one or more of the following: chemical substance, biochemical substance, or biological substance. An example of a chemical substance includes one of the following: corrosive reagents (including but not limited to: concentrated acids and strong oxidizers) and volatile liquids (including but not limited to: volatile organic solvents). An example of a biochemical substance includes hydrolase enzymes (e.g. cellulase, PETase, MHETase and others). An example of a biological substance includes small or microbial organisms (e.g. worms, fungi, or bacteria).

Still referring generally to FIG. 9A, in an embodiment the capsule 41 comprises one or more of the following materials: polymer, glass, or metal. In an embodiment, the capsule 41 being of polymer material may comprise one or more of the following thermoplastic, thermoset, or elastomeric materials: Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP). In an embodiment, the capsule 41 is compatible with the substance 1 intended to be retained by, received by, and/or released from said fiber-based substrate (e.g., glass microfiber substrate) 33.

In an embodiment, the fluidic device 11 further comprises: a first barrier 19 disposed in said base 13 adjacent to a first area where said capsule 41 establishes a first communication with said fluidic channels 15 and a second barrier 19 disposed in said base 13 adjacent to a second area where said capsule 41 establishes a second communication with said fluidic channels 15, wherein said first barrier 19 and said second barrier 19 are compatible with the substance 1 intended to be stored or received on said fiber-based substrate (e.g., glass microfiber substrate) 33, wherein said first barrier 19 and said second barrier 19 are positioned to protect said incompatible base 13 from contact with the fluid flow 12 at the vicinity of the first communication area and second communication area, respectively. In an embodiment, the barrier 19 is a vapor cover. In an embodiment, the barrier 19 comprises one or more of the following materials: polymer, glass, or metal.

FIG. 9B schematically illustrates a plan view of an embodiment generally reflected as the fluidic device 11 of FIG. 9A. The device 11 further comprises a vent 20 and a valve 21 in fluidic communication with at least one microfluidic channel 15 disposed on the base 13. This embodiment may be configured for, but not necessarily, centrifugal forces (or other active forces or alternatively passive forces). The base is illustrated as circular but may be a variety of geometries, shapes and contours.

FIG. 9C schematically illustrates a plan view of an embodiment generally reflected as the fluidic device 11 of FIG. 9A. The device further comprises a vent 20 in fluidic communication with at least one microfluidic channel 15 disposed on the base 13. This embodiment may be configured for, but not necessarily, other active forces or alternative passive forces. The base is illustrated as rectangular but may be a variety of geometries, shapes and contours.

FIG. 9D schematically illustrates an embodiment of the capsule generally reflected in FIG. 9A with an alternative glass microfiber substrate depicted therein. The specified diameter or width of the fiber-based substrate (e.g., glass microfiber substrate) 33 is designed to be less that the diameter or width of the capsule 41. The glass microfiber substrate 33 may take on all shapes along the entire continual geometric spectrum of manipulation of x, y and z planes to provide and meet the environmental and structural demands and operational requirements.

Figure 10C:
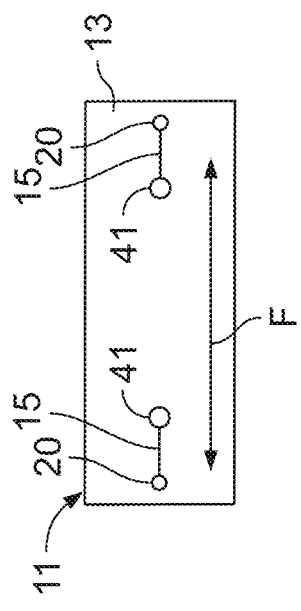
FIGS. 10A-10C correspond with the fluidic device reflected in FIGS. 9A-9C, respectively, and further depicts in FIG. 10A a fluid flow path as related to an aspect of an embodiment.
Figure 10A:
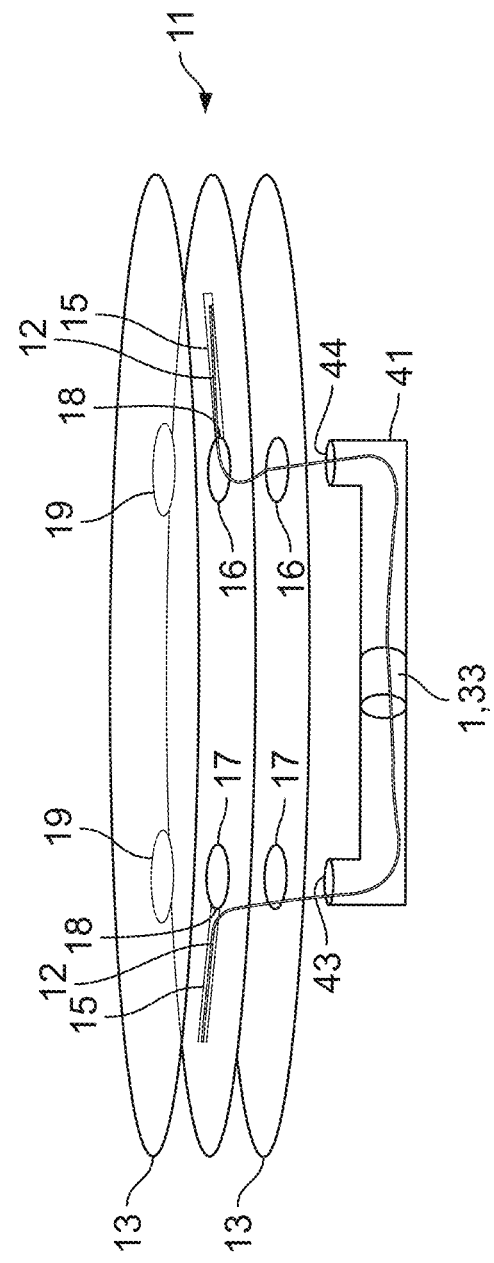
Figure 10B:
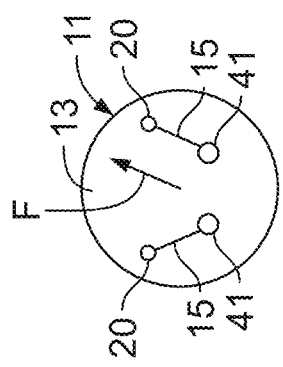

FIGS. 10A-10C correspond with the fluidic device 11 reflected in FIGS. 9A-9C, respectively, and further depicts a fluid flow path 12 as related to an aspect of an embodiment. In an application of an embodiment, but not limited thereto, fluid may travel within the device 11 through a first multidirectional microfluidic channel 15 into the capsule 41 through the first port 43; through the fiber-based substrate (e.g., glass microfiber substrate) 33 with the substance 1 disposed onto the fiber-based substrate (e.g., glass microfiber substrate) 33; and out of the capsule 41 through the second port 44 through the second multidirectional microfluidic channel 15. In an embodiment, the flow path 12 may pass through a variety of fluidic channels 15 (e.g., passages) and fluidic elements (e.g., components) and may start and finish at a variety of locations on the base 13 and fluidic device 11 as desired or required for structural demands and operational requirements. The fluidic device 11 may have a plurality of various fluidic channels 15 (e.g., passages) and fluidic elements (e.g., components) positioned on and spanning across various peripheries and regions of the base 13 and device 11 as desired or required for structural demands and operational requirements.

Figure 11C:
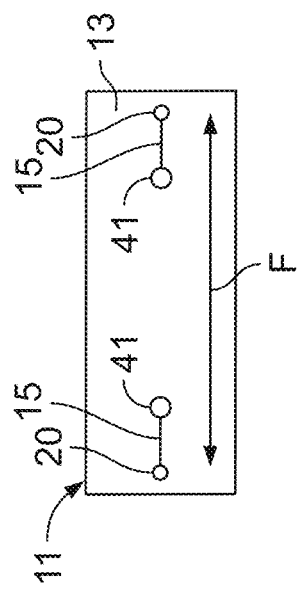
FIG. 11C schematically illustrates a plan view of an embodiment generally reflected as the fluidic device of FIG. 11A.
Figure 11A:
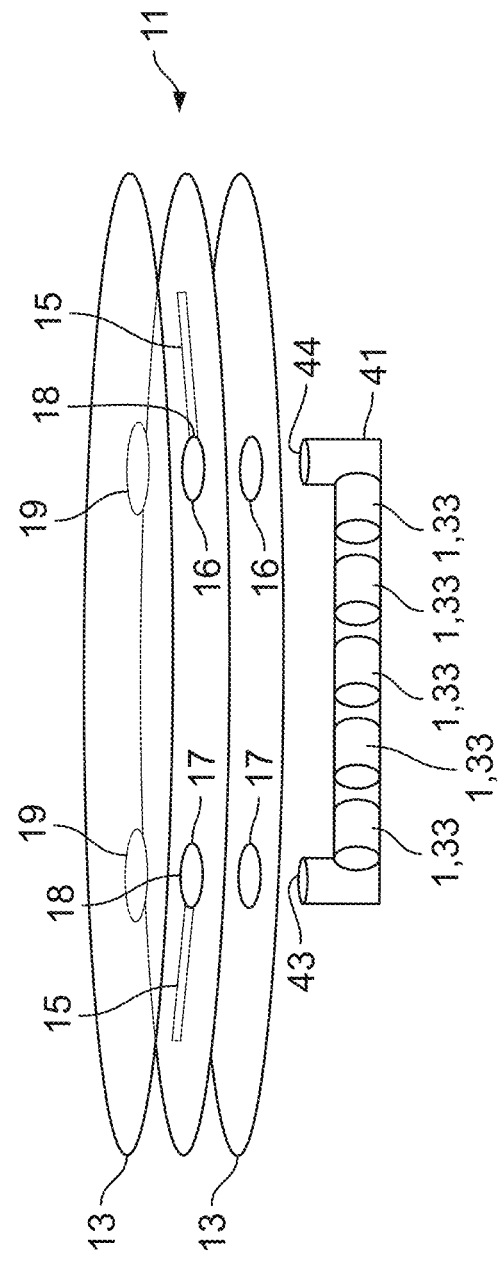
FIG. 11A schematically illustrates an exploded view of an embodiment of a fluidic device that includes a chamber and capsule disposed in relation to the base, wherein the capsule includes multiple ports and an arrangement of fiber-based substrates (e.g., glass microfiber substrates or glass nanofiber substrates) are disposed in the capsule.

Referring generally to FIG. 11A, for example but not wishing to be constrained by the illustrated depictions reflected in said cited Figures, FIG. 11A schematically illustrates a capsule 41 that provides sufficient volume or thickness as to permit an alignment of multiple of said fiber-based substrates (e.g., glass microfiber substrates) 33 in series within said capsule 41. In an embodiment, the individual said fiber-based substrates (e.g., glass microfiber substrates) 33, aligned in series, are positioned in such a manner as to permit enable the fluid flow 12 to sequentially travel through said aligned said fiber-based substrates (e.g., glass microfiber substrates) 33 within said capsule 41. In an embodiment, the alignment of the fiber-based substrates (e.g., glass microfiber substrates) 33 generally coincide with the contour of said capsule 41 in the span between said first port 43 and second port 44 of said capsule 41.

Figure 11B:
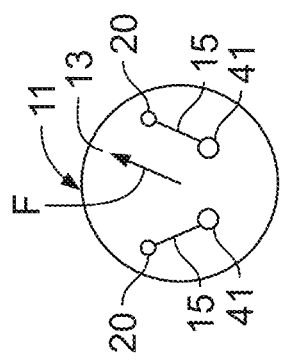
FIG. 11B schematically illustrates a plan view of an embodiment generally reflected as the fluidic device of FIG. 11A.

FIG. 11B schematically illustrates a plan view of an embodiment generally reflected as the fluidic device 11 of FIG. 1. The device 11 further comprises a vent 20 and a valve 21 in fluidic communication with at least one microfluidic channel 15 disposed on the base 13. This embodiment may be configured for, but not necessarily, centrifugal forces (or other active forces or alternatively passive forces). The base is illustrated as circular but may be a variety of geometries, shapes and contours.

FIG. 11C schematically illustrates a plan view of an embodiment generally reflected as the fluidic device 11 of FIG. 11A. The device further comprises a vent 20 in fluidic communication with at least one microfluidic channel 15 disposed on the base 13. This embodiment may be configured for, but not necessarily, non-centrifugal forces (or other active forces or alternatively passive forces). The base is illustrated as rectangular but may be a variety of geometries, shapes and contours.

FIGS. 12A-12C correspond with the fluidic device 11 reflected in FIGS. 11A-11C, respectively, and further depicts a fluid flow path 12 as related to an aspect of an embodiment. In an application of an embodiment, but not limited thereto, fluid may travel within the device 11 through a first multidirectional microfluidic channel 15 into the capsule 41 through the first port 43; through the first fiber-based substrate (e.g., glass microfiber substrate) 33 with the substance 1 disposed onto the fiber-based substrate (e.g., glass microfiber substrate) 33 and then through the designated remaining fiber-based substrates (e.g., glass microfiber substrates) 33 in a similar fashion and subsequently out of the capsule 41 through the second port 44 through the second multidirectional microfluidic channel 15. In an embodiment, the flow path 12 may pass through a variety of fluidic channels 15 (e.g., passages) and fluidic elements (e.g., components) and may start and finish at a variety of locations on the base 13 and fluidic device 11 as desired or required for structural demands and operational requirements. The fluidic device 11 may have a plurality of various fluidic channels 15 (e.g., passages) and fluidic elements (e.g., components) positioned on and spanning across various peripheries and regions of the base 13 and device 11 as desired or required for structural demands and operational requirements.

FIG. 13A schematically illustrates a plan view of an embodiment of a fluidic device 11 that may be configured for non-centrifugal forces whereby the valve 20 is in a disconnected state and the chamber 17 or capsule 41 is provided for a terminal application.

FIG. 13B schematically illustrates a plan view of an embodiment of a fluidic device 11 that may be configured for non-centrifugal forces whereby the valve 20 is in a disconnected state and the chamber 17 or capsule 41 is provided for a flow-through application.

FIG. 13C schematically illustrates a plan view of an embodiment of a fluidic device 11 that may be configured for non-centrifugal forces whereby the valve 20 is in a connected state and the chamber 17 or capsule 41 is provided for a terminal application.

FIG. 13D schematically illustrates a plan view of an embodiment of a fluidic device 11 that may be configured for non-centrifugal forces whereby the valve 20 is in a connected state and the chamber 17 or capsule 41 is provided for a flow-through application.

FIG. 13E schematically illustrates a plan view of an embodiment of a fluidic device 11 that may be configured for non-centrifugal forces whereby the valve 20 is in a connected state and the chamber 17 or capsule 41 is provided for a flow-through application as well as having a plurality of vents 21, which the valves and vents may be a variety of different types of access points.

FIG. 13F schematically illustrates a plan view of an embodiment of a fluidic device 11 that may be configured for non-centrifugal forces whereby the valve 20 is in a connected state and the chamber 17 or capsule 41 is provided for a flow-through application as well as having a plurality of vents 21, of which the valves and vents may be a variety of different types of access points.

FIG. 13G schematically illustrates a plan view of an embodiment of a fluidic device 11 that may be configured for non-centrifugal forces whereby the valve 20 is in a connected state and the chamber 17 or capsule 41 is provided for a flow-through application as well as having a plurality of vents 21, of which the valves and vents may be a variety of different types of access points.

FIG. 13H schematically illustrates a plan view of an embodiment of a fluidic device 11 that may be configured for non-centrifugal forces whereby the valve 20 is in a connected state and the chamber 17 or capsule 21 is provided for an antecedent application.

FIG. 13I schematically illustrates a plan view of an embodiment of a fluidic device 11 that may be configured for non-centrifugal forces whereby the valve 20 is in a disconnected state and the chamber 17 or capsule 41 is provided for an antecedent application.

FIG. 14A schematically illustrates a plan view of an embodiment of a fluidic device 11 that may be configured for centrifugal forces whereby the valve 20 is in a disconnected state and the chamber 17 or capsule 41 is provided for a terminal application.

FIG. 14B schematically illustrates a plan view of an embodiment of a fluidic device 11 that may be configured for centrifugal forces whereby the valve is in a disconnected state and the chamber 17 or capsule 41 is provided for a flow-through application.

FIG. 14C schematically illustrates a plan view of an embodiment of a fluidic device 11 that may be configured for centrifugal forces whereby the valve 20 is in a connected state and the chamber 17 or capsule 41 is provided for a terminal application.

FIG. 14D schematically illustrates a plan view of an embodiment of a fluidic device 11 that may be configured for centrifugal forces whereby the valve 20 is in a connected state and the chamber 17 or capsule 41 is provided for a flow-through application.

FIG. 14E schematically illustrates a plan view of an embodiment of a fluidic device 11 that may be configured for centrifugal forces whereby the valve 20 is in a connected state and the chamber 17 or capsule 41 is provided for a flow-through application as well as having a plurality of vents 21, of which the valves and vents may be a variety of different types of access points.

FIG. 14F schematically illustrates a plan view of an embodiment of a fluidic device 11 that may be configured for centrifugal forces whereby the valve 20 is in a connected state and the chamber 17 or capsule 41 is provided for a flow-through application as well as having a plurality of vents 21, of which the valves and vents may be a variety of different types of access points.

FIG. 14G schematically illustrates a plan view of an embodiment of a fluidic device 11 that may be configured for centrifugal forces whereby the valve 20 is in a connected state and the chamber 17 or capsule 41 is provided for a flow-through application as well as having a plurality of vents 21, of which the valves and vents may be a variety of different types of access points.

FIG. 14H schematically illustrates a plan view of an embodiment of a fluidic device 11 that may be configured for centrifugal forces whereby the valve 20 is in a connected state and the chamber 17 or capsule 41 is provided for an antecedent application.

FIG. 14I schematically illustrates a plan view of an embodiment of a fluidic device 11 that may be configured for centrifugal forces whereby the valve 20 is in a disconnected state and the chamber 17 or capsule 41 is provided for an antecedent application.

Figure 15:
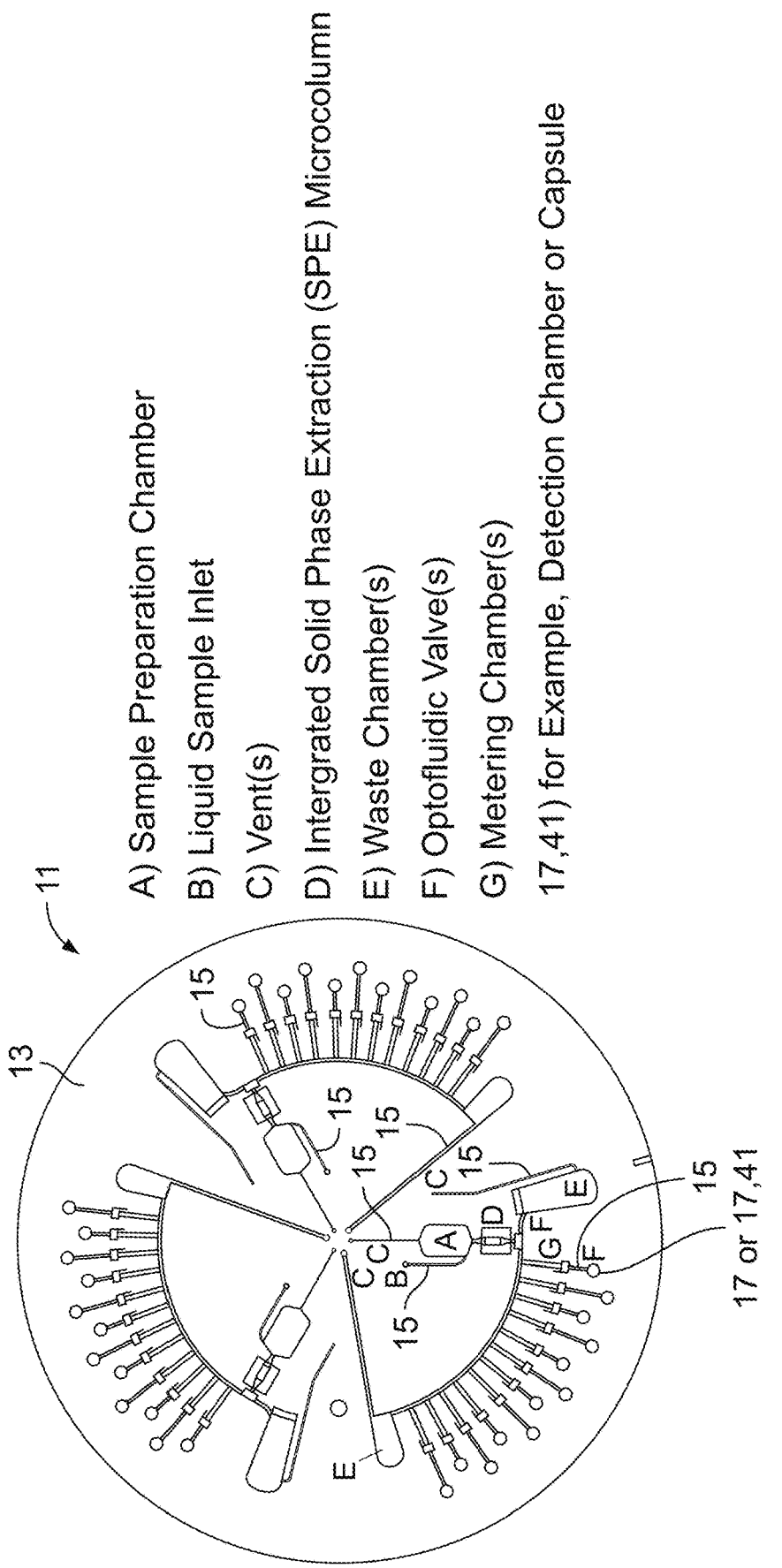
FIG. 15 schematically illustrates a plan view of an embodiment of a microfluidic device that includes a chamber and/or capsule disposed in relation to the base wherein the chamber and/or capsule includes a fiber-based substrate (e.g., glass microfiber substrate) (not shown).

FIG. 15 schematically illustrates a plan view of an embodiment of a fluidic device 11 that includes a chamber 17 and/or capsule 41 disposed in relation to the base 13 wherein the chamber 17 and/or capsule 41 includes a fiber-based substrate (e.g., glass microfiber substrate) (not shown) and a variety of fluidic channels 15. As illustrated, the fluidic device 11 is a microfluidic device, the base 13 is a microfluidic chip and the fluidic channels 15 are microfluidic channels. In an embodiment, the microfluidic device 11 may be implemented for, but not limited thereto, point-of-interdiction (POI) detection of illicit drugs of interest (IDIs) from mixed samples. In an embodiment, fluidic elements (e.g., components) may be positioned on and spanning across various peripheries and regions of the base 13 (e.g., microfluidic chip) and fluidic device 11 (e.g., microfluidic device) as desired or required for its intended or designated purpose. For example, the fluidic elements (e.g., components) may include, but are not limited thereto, the following: sample preparation chamber, liquid sample inlet, vent(s), integrated solid phase extraction (SPE) microcolumn, waste chamber(s), optofluidic valve(s), metering chamber(s), or the like. In an embodiment, chamber 17 and/or capsule 41 is a detection chamber (e.g., microencapsulation storage for corrosive reagents).

Figure 16:
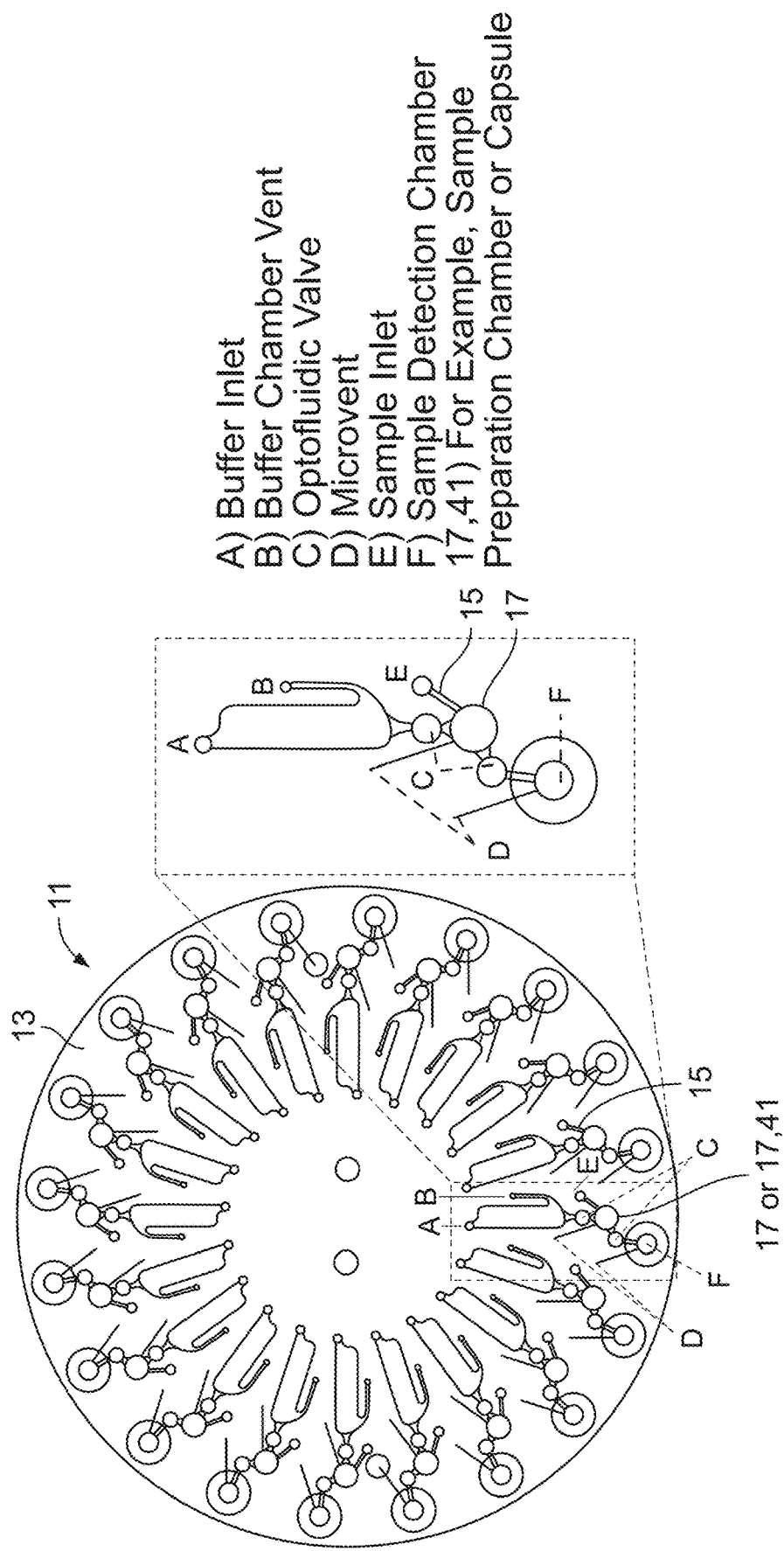
FIG. 16 schematically illustrates a plan view of an embodiment of a microfluidic device that includes a chamber and/or capsule disposed in relation to the base wherein the chamber and/or capsule includes a fiber-based substrate (e.g., glass microfiber substrate) (not shown).

FIG. 16 schematically illustrates a plan view of an embodiment of a fluidic device that includes a chamber 17 and/or capsule 41 disposed in relation to the base 13 wherein the chamber 17 and/or capsule 41 includes a fiber-based substrate (e.g., glass microfiber substrate) (not shown) and a variety of fluidic channels 15. As illustrated, the fluidic device 11 is a microfluidic device, the base 13 is a microfluidic chip and the fluidic channels 15 are microfluidic channels. In an embodiment, the microfluidic device 11 may be implemented for, but not limited thereto, detection of toxic heavy metals from soil samples. In an embodiment, fluidic elements (e.g., components) may be positioned on and spanning across various peripheries and regions of the base 13 (e.g., microfluidic chip) and fluidic device 11 (e.g., microfluidic device) as desired or required for its intended or designated purpose. For example, the fluidic elements (e.g., components) may include, but are not limited thereto, the following: buffer inlet, buffer chamber vent, optofluidic valve, microvent, sample inlet, sample detection chamber. In an embodiment, chamber 17 and/or capsule 41 is a sample preparation chamber (e.g., microencapsulation storage for corrosive reagents).

Figure 17:
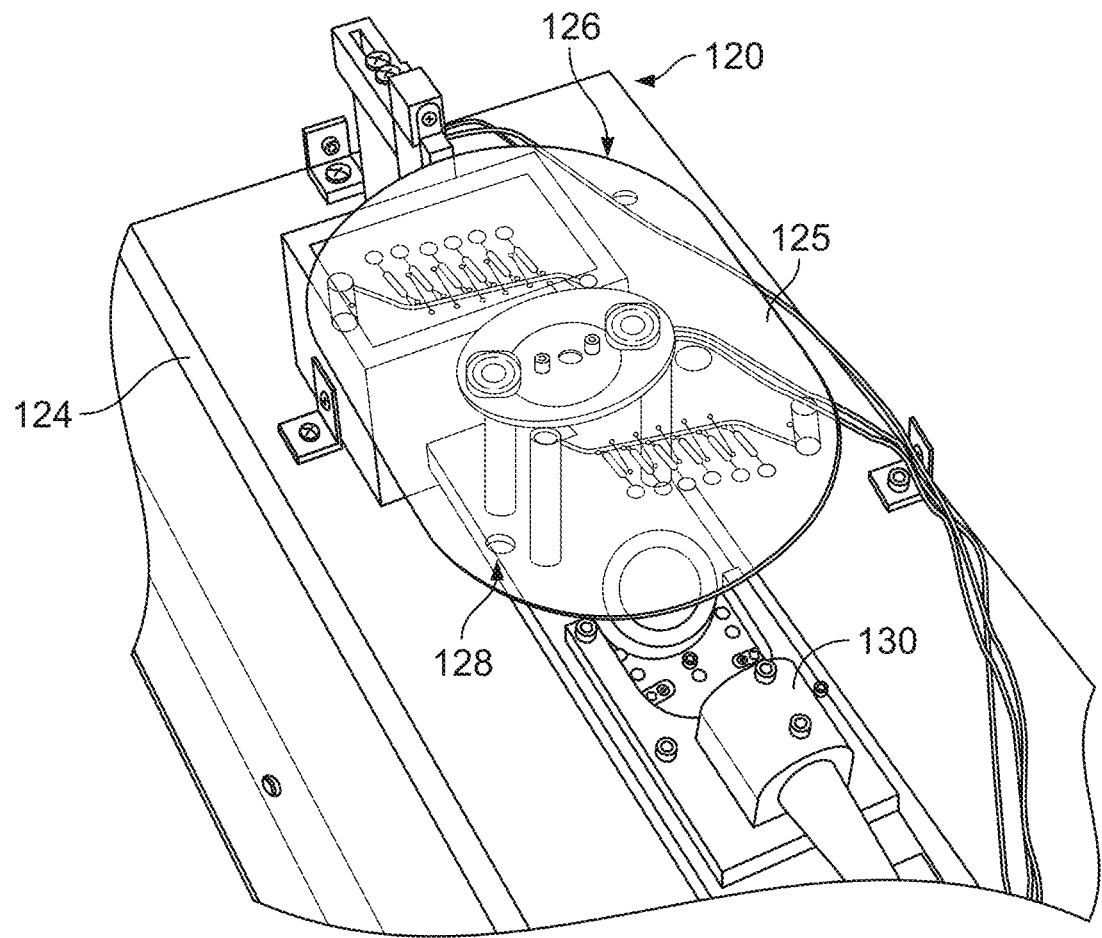
FIG. 17 is a perspective view of a microfluidic device mounted to a system including a spin motor and an optical sensor demonstrating a type of rotation driven microdevice (RDM) system.

FIG. 17 is a perspective view of a microfluidic device 126 having a base 125, such as microfluidic chip, mounted to a system 120 including a spin motor 128 and an optical sensor 130 within housing 124 (e.g., demonstrating a type of rotation driven microdevice (RDM) system). The smartphone 122, housing 124, microfluidic device 126, spin motor 128 and optical sensor 130 comprise components of the analysis system 120. In an embodiment, the optical sensor 130 may be used for, but not limited thereto, aligning the microfluidic device so that it may be determined what position the device is at in any given time or so that the position of the microfluidic device may be activated for imaging and/or laser valve actuation, or other desired functions or operations.

Figure 19:
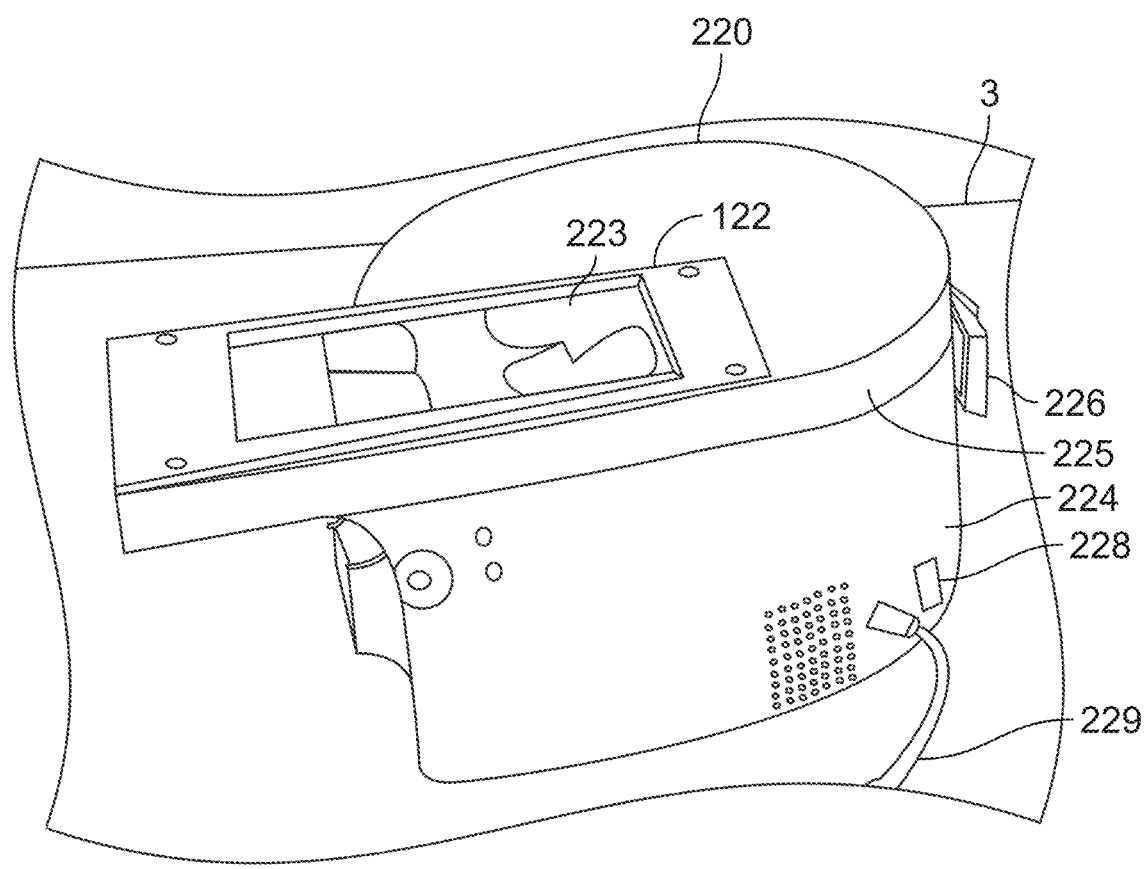
FIG. 19 is a perspective view of the rotation driven microdevice (RDM) of FIG. 18 with a closed lid, making the digital interface visible.

Images of the resulting color changes from drug-specific and explosive-specific colorimetric reagents are taken using a camera or video capture device, in this case one from a smartphone 122 or PDA (shown in FIG. 19). However, the housing 124 can be used in conjunction with a camera from another system that may be located locally or remotely. The camera of a smartphone 122 is positioned above the microfluidic device 126 using a holder (not shown). This holder may be made of various materials capable of holding smartphone 122 in place such as plastic or non-plastic materials like PMMA and various metals. This holder may be made of various structures capable positioning or retaining the smartphone 122 in place. The images may be cropped in an application, which may be deployed in a smart cell phone operating system for smartphone 122. Image analysis optimization and validation may be performed by scanning the devices using a device such as a scanner like an EPSON V100 Perfection Photo scanner. Scanned images can be cropped and analyzed using various programs such as ImageJ and Mathematica. Any video that is captured may be analyzed and processed over a time duration that is applicable or needed for obtaining desired information.

Under conditions where the observed color change is either not intense or in the part of the color spectrum where a positive result is not obvious, the system can be augmented using a 'tinting', or color manipulation, approach. The detectable color change can be improved for smartphone or other camera-based image detection in several ways: 1) a physical filter with the desired spectral characteristics can be inserted between the light source and detection chamber, 2) since microfluidic device fabrication involves printing, toner can be printed above or below (or both) detection chamber to tint the color of the light detected by the camera, or 3) reagents may be 'pretreated' as a means of tinting the result from the subsequent reaction with the sample solution. All of these approaches can allow for a shifting, or the color data adjustment, of the post-reaction 'resultant color' in a way that improves the sensitivity or lower the detection limit. An example of this is when a yellow to red color change could be changed to a green to purple color change when a reagent is tinted blue, to provide greater discrimination between the original results. In an embodiment, the filter function may not necessarily be to filter out any particular color or whether filtering should occur. But rather, filtering may be configured to add or combine colors to alter the way the color is perceived, or may be some other manipulation, application, or treatment.

Figure 18:
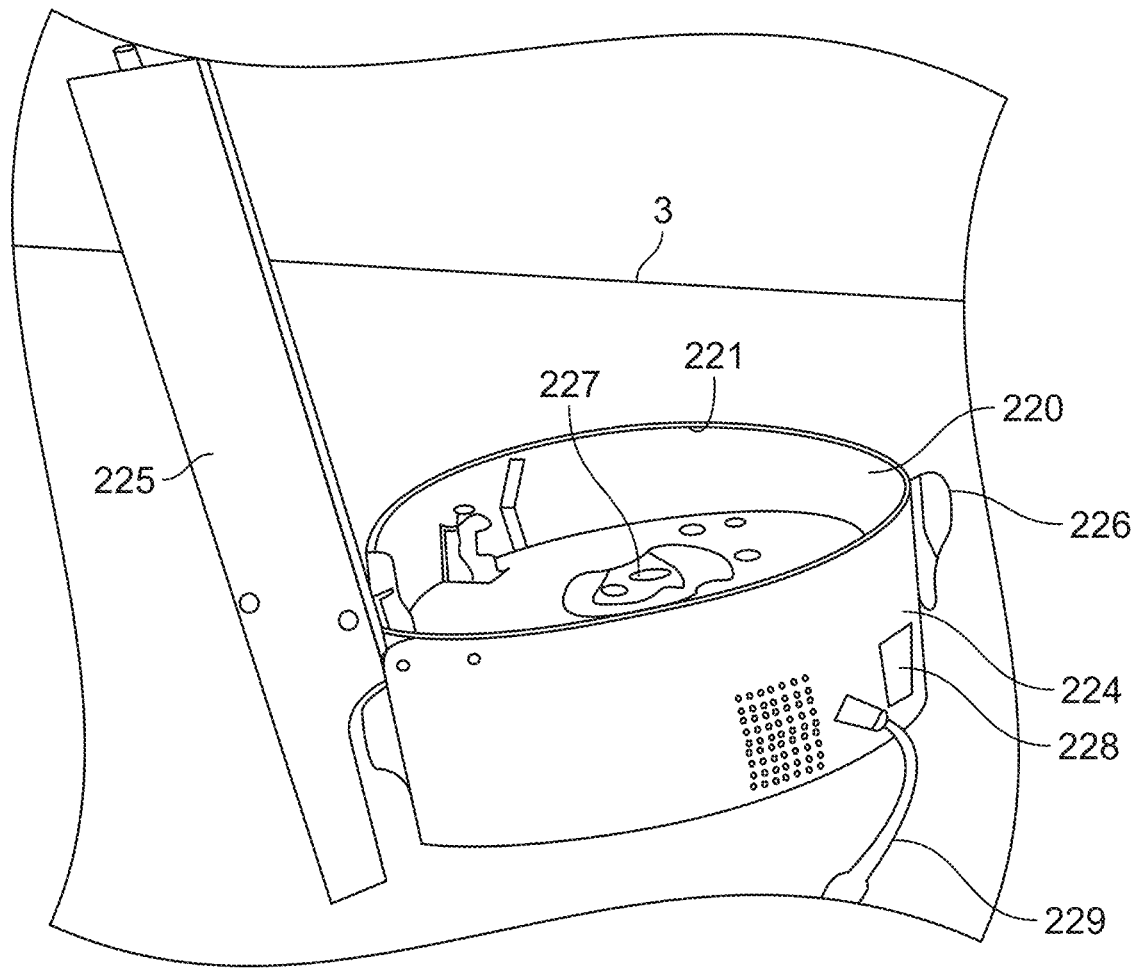
FIG. 18 is a perspective view of another type of rotation driven microdevice (RDM) system in an open lid position vacant of a microfluidic device (MFD).

FIG. 18 is a perspective view of another embodiment of an analysis system 220 contained in a housing 224 shown as a rotation-driven mircrodevice (RDM), with its lid 225 in an open position vacant of a microfluidic device (MFD). In an embodiment the microfluidic device may be inserted into a compartment 221 where it may attach to holder 227. In an embodiment, the holder 227 is a structure similar to that of a holder in a CD player, being a single centrally located point where the MFD may be attached. In another embodiment, the holder 227 may be a number of pegs which can insert into or through the MFD to hold it in place while the MFD is spun. In other embodiments, the holder 227 may be any restraint system known or to be known in the art for the securing of an MFD during the analysis process.

The analysis system 220 may be portable and without a stand as depicted in FIG. 18, resting on table 3. In another embodiment, the analysis system 220 may have its own stand system. The analysis system 220 may have a latch 226 to secure the lid 225, an on/off switch 228, and a power cord 229 leading to a power source. In another embodiment the analysis system 220 does not have a dedicated on/off switch 228, but instead may be controlled via an attached screen or smartphone.

Referring again to FIG. 18, in this and other embodiments disclosed herein, the transmission of power may be accomplished via a single or multiple power cords 228. This power cord 228 may able to be plugged into an outlet or may be designed so as to be connected to a local battery pack or something of the like. In this or other embodiments disclosed herein, this may also be accomplished via wireless power transmission. The analysis system 220 may be connected to a power source either locally or remotely. This connection in some embodiments may not require a power cord 228. The power may be supplied by battery, solar, DC supply, AC supply, or any other energy means available. In an embodiment, the system could incorporate a spin motor, cameras, software, laser actuators, optical sensors, cell phone, etc. to achieve the applicable results. In one aspect, among other steps and operations, the system may perform a given spin step and then may not perform the next spin step using the motor (or other applicable operation) until the cell phone captures the image (or other applicable operation).

FIG. 19 is a perspective view of an embodiment of analysis system 220 of FIG. 18 with a closed lid 225, making the digital interface 223 visible in this illustration. In an exemplary embodiment, the analysis system 220 may have a latch 226 that may be engaged when the lid 225 is closed to hold the lid 225 closed or secure for the duration of the analysis process (e.g., demonstrating a type of rotation driven microdevice (RDM) system). In an embodiment, the latch 226 is a manually engaged latch. In another embodiment the latch 226 is controlled by the analysis system 220 and is engaged when the lid is closed or the system is engaged to run. In yet another embodiment, the latch 226 (or locking mechanism or device) may be programmed to engage at any user desired or programmed time. In an embodiment, for example but not limited thereto, the lid in the closed position may serve as a safety feature, wherein the system will not activate a laser or spin (or spin speed or other applicable operation) while the lid is in an open position.

Referring again to FIG. 19, in this and other embodiments disclosed herein, the screen 223 may be the screen of a smartphone or of a dedicated computerized digital display. A processor implemented with the various embodiments discussed herein, may be integrally formed with the general housing 224 or may be part of a smartphone, PDA, or like such that it is a component that may be used with (or mounted to) the general housing. Alternatively, the design may include processors which in one aspect is integrally formed with the general housing and another aspect is a separate component wherein it exists as part of a smartphone, PDA, or the like that is used with (or mounted to) the general housing. In another embodiment, the analysis system 220 may be wirelessly controlled and screen 223 may not be needed. The data may be transmitted to a remote screen; or a local and/or remote computer, PDA, microprocessor-based device, or data storage medium or other output device (such as a graphical interface or printer).

EXAMPLES

Practice of an aspect of an embodiment (or embodiments) of the invention will be still more fully understood from the following examples, which are presented herein for illustration only and should not be construed as limiting the invention in any way.

Example Set No. 1

Referring generally to the schematic illustration of the exploded view of FIGS. 1A, 1E and 2A, for example, but not wishing to be constrained by the illustrated depictions reflected in said cited Figures, in an embodiment the base 13 may be a microfluidic chip (e.g., disk) having multiple layers wherein the combined thickness of the layers (in a non-exploded state) is about 0.1 cm to about 0.2 cm and wherein the microfluidic chip (e.g. disk) has a diameter of about 5 cm to about 20 cm. Three layers are illustrated but the number of layers may be greater or less than three layers to provide and meet the environmental and structural demands and operational requirements.

The fluidic channels 15 may be microchannels having a cross-sectional dimension of about 0.01 to about 0.05 cm.

The chamber 17 (which may be an extension of the fluidic channels) may be of a cylindrical configuration having a diameter of about 0.1 cm to about 0.5 cm and having a depth of about 0.05 cm to about 0.1 cm. In an embodiment the chamber is compatible or the chamber may have a treated surface or coated surface that is compatible.

The compatible fiber-based substrate (e.g., glass microfiber substrate) 33 may have a nominal thickness of about 0.01 cm to about 0.07 cm with a pore size of about 0.5 µm to about 2 µm. The shapes and contours of the aforementioned components may vary along the entire continual geometric spectrum of manipulation of x, y and z planes to provide and meet the environmental and structural demands and operational requirements. The dimensions of the aforementioned components may be greater or less than the specifically listed ranges or values to provide and meet the environmental and structural demands and operational requirements.

Example Set No. 2

Referring generally to the schematic illustration of the exploded view of FIGS. 3A and 4A, for example, but not wishing to be constrained by the illustrated depictions reflected in said cited Figures, in an embodiment the base 13 may be a microfluidic chip (e.g., disk) having multiple layers wherein the combined thickness of the layers (in a non-exploded state) is about 0.1 cm to about 0.2 cm and wherein the microfluidic chip (e.g. disk) has a diameter of about 5 cm to about 20 cm. Five layers are illustrated but the number of layers may be greater or less than five layers to provide and meet the environmental and structural demands and operational requirements.

The fluidic channels 15 may be microchannels having a cross-sectional dimension of about 0.01 to about 0.05 cm.

The compatible capsule 41 may be of a cylindrical configuration having a diameter of about 0.1 cm to about 0.5 cm and having a depth of about 0.05 cm to about 0.1 cm.

The compatible barriers 19, which may be configured as vapor covers, may have a diameter of about 0.1 cm to about 0.6 cm.

The compatible fiber-based substrate (e.g., glass microfiber substrate) 33 may have a nominal thickness of about 0.01 cm to about 0.07 cm with a pore size of about 0.5 µm to about 2 µm. The shapes and contours of the aforementioned components may vary along the entire continual geometric spectrum of manipulation of x, y and z planes to provide and meet the environmental and structural demands and operational requirements. The dimensions of the aforementioned components may be greater or less than the specifically listed ranges or values to provide and meet the environmental and structural demands and operational requirements.

Example Set No. 3

Referring generally to the schematic illustration of the exploded view of FIGS. 5A and 6A, for example, but not wishing to be constrained by the illustrated depictions reflected in said cited Figures, in an embodiment the base 13 may be a microfluidic chip (e.g., disk) having multiple layers wherein the combined thickness of the layers (in a non-exploded state) is about 0.1 cm to about 0.2 cm and wherein the microfluidic chip (e.g. disk) has a diameter of about 5 cm to about 20 cm. Eight layers are illustrated but the number of layers may be greater or less than eight layers to provide and meet the environmental and structural demands and operational requirements.

The fluidic channels 15 may be microchannels having a cross-sectional dimension of about 0.01 to about 0.05 cm.

The plurality of compatible capsules 41 may be aligned and each may be of a cylindrical configuration having a diameter of about 0.1 cm to about 0.5 cm and having a depth of about 0.05 cm to about 0.1 cm. The plurality of capsules may be located in a single continuous chamber 17 of the base 13 (e.g., microfluidic chip or disk), whereby the chamber 17 is configured essentially as an open cylinder or aperture to receive the capsules arranged throughout the base 13 (e.g., microfluidic chip or disk). In an embodiment the base may be molded or formed around the capsules during fabrication.

The compatible barriers 19, which may be configured as vapor covers, may have a diameter of about 0.1 cm to about 0.6 cm.

The compatible fiber-based substrate (e.g., glass microfiber substrate) 33 may have a nominal thickness of about 0.01 cm to about 0.07 cm with a pore size of about 0.5 µm to about 2 µm. The shapes and contours of the aforementioned components may vary along the entire continual geometric spectrum of manipulation of x, y and z planes to provide and meet the environmental and structural demands and operational requirements. The dimensions of the aforementioned components may be greater or less than the specifically listed ranges or values to provide and meet the environmental and structural demands and operational requirements.

Example Set No. 4

Referring generally to the schematic illustration of the exploded view of FIGS. 7A and 8A, for example, but not wishing to be constrained by the illustrated depictions reflected in said cited Figures, in an embodiment the base 13 may be a microfluidic chip (e.g., disk) having multiple layers wherein the combined thickness of the layers (in a non-exploded state) is about 0.1 cm to about 0.2 cm and wherein the microfluidic chip (e.g. disk) has a diameter of about 5 cm to about 20 cm. Three layers are illustrated but the number of layers may be greater or less than three layers to provide and meet the environmental and structural demands and operational requirements.

The fluidic channels 15 may be microchannels having a cross-sectional dimension of about 0.01 to about 0.05 cm.

The compatible capsule 41 may be of a cylindrical configuration having a diameter of about 0.1 cm to about 0.5 cm and having a depth of about 0.05 cm to about 0.1 cm. In an embodiment, the capsule 41 may be attachable to or removably detachable from the base 13; or may be partially encapsulated by the base 13.

The compatible barriers 19, which may be configured as vapor covers, may have a diameter of about 0.1 cm to about 0.6 cm.

The compatible fiber-based substrate (e.g., glass microfiber substrate) 33 may have a nominal thickness of about 0.01 cm to about 0.07 cm with a pore size of about 0.5 µm to about 2 µm. The shapes and contours of the aforementioned components may vary along the entire continual geometric spectrum of manipulation of x, y and z planes to provide and meet the environmental and structural demands and operational requirements. The dimensions of the aforementioned components may be greater or less than the specifically listed ranges or values to provide and meet the environmental and structural demands and operational requirements.

Example Set No. 5

Referring generally to the schematic illustration of the exploded view of FIGS. 9A and 10A, for example, but not wishing to be constrained by the illustrated depictions reflected in said cited Figures, in an embodiment the base 13 may be a microfluidic chip (e.g., disk) having multiple layers wherein the combined thickness of the layers (in a non-exploded state) is about 0.1 cm to about 0.2 cm and wherein the microfluidic chip (e.g. disk) has a diameter of about 5 cm to about 20 cm. Three layers are illustrated but the number of layers may be greater or less than three layers to provide and meet the environmental and structural demands and operational requirements.

The fluidic channels 15 may be microchannels having a cross-sectional dimension of about 0.01 to about 0.05 cm.

The compatible capsule 41 may be of an elongated configuration having two or more ports 43, 44. In an embodiment, the capsule may have a length of about 0.5 cm to about 1 cm with a diameter of about 0.1 cm to about 0.5 cm. Although not shown, the capsule may have multiple branches with corresponding ports, such as forming a Y-branch for the spans of the capsule (or four or more branches may be implemented). In an embodiment, the capsule 41 may be attachable to or removably detachable from the base 13; or may be partially encapsulated by the base 13.

The compatible barriers 19, which may be configured as vapor covers, may have a diameter of about 0.1 cm to about 0.6 cm.

Each end of the capsule (e.g., each end of the branch of the capsule) may be disposed in a single continuous chamber 17 of the base 13 (e.g., microfluidic chip or disk), whereby the chamber 17 is configured essentially as an open cylinder or aperture to receive an end of the capsule.

The compatible fiber-based substrate (e.g., glass microfiber substrate) 33 may have a nominal thickness of about 0.01 cm to about 0.07 cm with a pore size of about 0.5 µm to about 2 µm. The shapes and contours of the aforementioned components may vary along the entire continual geometric spectrum of manipulation of x, y and z planes to provide and meet the environmental and structural demands and operational requirements. The dimensions of the aforementioned components may be greater or less than the specifically listed ranges or values to provide and meet the environmental and structural demands and operational requirements.

Example Set No. 6

Referring generally to the schematic illustration of the exploded view of FIGS. 11A and 12A, for example, but not wishing to be constrained by the illustrated depictions reflected in said cited Figures, this embodiment corresponds with the fluidic device 11 of FIGS. 9A and 10A, but with the addition of multiple compatible fiber-based substrates (e.g., glass microfiber substrates) 33 disposed in the capsule 41.

Additional Examples

Example 1. A chamber for use with a fluidic device, wherein:

said chamber is configured to house a fiber-based substrate that is disposed in said chamber, said fiber-based substrate is configured to retain, receive and/or release a substance; and said fiber-based substrate is configured in such a manner as to prevent the retained substance thereon from contacting other regions of said fluidic device, beyond the perimeter of said fiber-based substrate, during retention of said substance on said fiber-based substrate.

Example 2. A fluidic device configured for use with said chamber of example 1 (as well as subject matter of one or more of any combination of examples 1-20, 121-123, 137 and 139), and for retaining, receiving, and/or releasing the substance, said device comprising:

a base; and said chamber is disposed in said base.

Example 3. The fluidic device of example 2 (as well as subject matter of one or more of any combination of examples 1-20, 121-123, 137 and 139), in whole or in part), wherein said chamber is compatible with the substance intended to be retained by, received by, and/or released from said fiber-based substrate.

Example 4. The fluidic device of example 2 (as well as subject matter of one or more of any combination of examples 1-20, 121-123, 137 and 139), said device further comprising:

fluidic channels disposed on said base wherein said fluidic channels are configured to be in fluidic communication with said chamber in a manner to define a fluid flow path; and said fiber-based substrate, disposed within said chamber, is positioned in the defined fluid flow path, wherein said fiber-based substrate is configured to retain, receive, and/or release a substance thereon and be compatible with the substance intended to be retained by, received by, and/or released from said fiber-based substrate.

Example 5. The fluidic device of example 4 (as well as subject matter of one or more of any combination of examples 1-20, 121-123, 137 and 139), wherein said chamber, base and fluidic channels are compatible with the substance intended to be retained by, received by, and/or released from said fiber-based substrate.

Example 6. The device of example 4 (as well as subject matter of one or more of any combination of examples 1-20, 121-123, 137 and 139), wherein said chamber includes one or more accesses including a first access and/or a second access to provide for the fluidic communication between said chamber and said fluidic channels.

Example 7. The device of example 2 (as well as subject matter of one or more of any combination of examples 1-20, 121-123, 137 and 139), wherein said base includes one of the following:

one or more material layers, microfluidic chip, nanofluidic chip, disk, housing, container, vessel, platform, or any surface or structure that can retain, hold or house said fiber-based substrate and said chamber.

Example 8. The device of example 2 (as well as subject matter of one or more of any combination of examples 1-20, 121-123, 137 and 139), wherein said channels includes one of the following: microchannels, nanochannels, pathways, trenches, grooves, capillaries, or passageways.

Example 9. The device of example 2 (as well as subject matter of one or more of any combination of examples 1-20, 121-123, 137 and 139), wherein said fiber-based substrate comprises one or more of the following materials:

glass microfiber, glass nanofiber, stainless steel microfiber, stainless steel nanofiber, polypropylene microfiber, or polypropylene nanofiber.

Example 10. The device of example 2 (as well as subject matter of one or more of any combination of examples 1-20, 121-123, 137 and 139), further comprising:

a vent in fluidic communication with at least one said fluidic channel; and/or a valve in fluidic communication with at least one said fluidic channel.

Example 11. The device of example 2 (as well as subject matter of one or more of any combination of examples 1-20, 121-123, 137 and 139), wherein said chamber includes one of the following:

cavity, cylinder, cell, recess, compartment, aperture, receptacle, or widened-fluidic channel.

Example 12. The device of example 2 (as well as subject matter of one or more of any combination of examples 1-20, 121-123, 137 and 139), wherein:

said device is configured to be subjected to an active force; and wherein any traveling of the substance on the fluid flow path is a result of the active force incurred on said device.

Example 13. The device of example 12 (as well as subject matter of one or more of any combination of examples 1-20, 121-123, 137 and 139), wherein:

said active force is an angular acceleration, wherein any traveling of the substance on the fluid flow path is a result of the angular acceleration experienced on said device as a result of said device spinning.

Example 14. The device of example 12 (as well as subject matter of one or more of any combination of examples 1-20, 121-123, 137 and 139), wherein said active force is one or more of the following:

external fluid pressure, external gas pressure, internal hydrodynamic pressure, electrokinetic, dielectrophoretic, magnetic, or optical.

Example 15. The device of example 2 (as well as subject matter of one or more of any combination of examples 1-20, 121-123, 137 and 139), wherein:

said base is configured to be subjected to a passive force; and wherein any traveling of the substance on the fluid flow path is a result of the passive force incurred on said device.

Example 16. The device of example 15 (as well as subject matter of one or more of any combination of examples 1-20, 121-123, 137 and 139), wherein said passive force includes one or more of the following: gravity or interfacial surface tension gradients.

Example 17. The device of example 2 (as well as subject matter of one or more of any combination of examples 1-20, 121-123, 137 and 139), wherein said substance is one or more of the following: chemical substance, biochemical substance, or biological substance.

Example 18. The device of example 2 (as well as subject matter of one or more of any combination of examples 1-20, 121-123, 137 and 139), wherein said base, chamber and fluidic channels comprise one or more of the following materials:

polymer, glass, or metal.

Example 19. The device of example 18 (as well as subject matter of one or more of any combination of examples 1-20, 121-123, 137 and 139), wherein said polymer material comprises one or more of the following thermoplastic, thermoset, or elastomeric materials:

Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), or cyclic olefin copolymer (COC), or cyclic olefin polymer (COP).

Example 20. The device of example 2 (as well as subject matter of one or more of any combination of examples 1-20, 121-123, 137 and 139), wherein said base, chamber, and fluidic channels are compatible with the substance intended to be retained by, received by, and/or released from said fiber-based substrate.

Example 21. A chamber for use with a fluidic device, wherein:

said chamber is configured to house a fiber-based substrate that is disposed in said chamber, said fiber-based substrate is configured to retain, receive and/or release a substance;

an area of said chamber includes a treated surface or coated surface that is compatible with the substance intended to be retained by, received by, and/or released from said fiber-based substrate; and wherein one of the following configurations apply:

a) said fiber-based substrate is configured in such a manner as to prevent the retained substance thereon from contacting other regions of said fluidic device, beyond said treated area or said coated area of said chamber, during retention of said substance on said fiber-based fiber-based substrate; or b) said fiber-based substrate is configured in such a manner as to prevent the retained substance thereon from contacting other regions of said fluidic device, beyond the perimeter of said fiber-based substrate, during retention of said substance on said fiber-based substrate.

Example 22. A fluidic device configured for use with said chamber of example 21 (as well as subject matter of one or more of any combination of examples 21-40, 124-126, 137 and 139), and for retaining, receiving, and/or releasing the substance, said device comprising:

a base; and said chamber is disposed in said base.

Example 23. The fluidic device of example 22 (as well as subject matter of one or more of any combination of examples 21-40, 124-126, 137 and 139), wherein said base and fluidic channels are incompatible with the substance intended to be retained by, received by, and/or released from said fiber-based substrate.

Example 24. The fluidic device of example 22 (as well as subject matter of one or more of any combination of examples 21-40, 124-126, 137 and 139), said device further comprising:

fluidic channels disposed on said base wherein said fluidic channels are configured to be in fluidic communication with said chamber in a manner to define a fluid flow path; and said fiber-based substrate, disposed within said chamber, is positioned in the defined fluid flow path, wherein said fiber-based substrate is configured to retain, receive, and/or release a substance thereon and be compatible with the substance intended to be retained by, received by, and/or released from said fiber-based substrate.

Example 25. The fluidic device of example 24 (as well as subject matter of one or more of any combination of examples 21-40, 124-126, 137 and 139), wherein said base and fluidic channels are incompatible with the substance intended to be retained by, received by, and/or released from said fiber-based substrate.

Example 26. The device of example 24 (as well as subject matter of one or more of any combination of examples 21-40, 124-126, 137 and 139), wherein said chamber includes one or more accesses including a first access and/or a second access to provide for the fluidic communication between said chamber and said fluidic channels.

Example 27. The device of example 22 (as well as subject matter of one or more of any combination of examples 21-40, 124-126, 137 and 139), wherein said base includes one of the following:

one or more material layers, microfluidic chip, nanofluidic chip, disk, housing, container, vessel, platform, or any surface or structure that can retain, hold or house said fiber-based substrate and said chamber.

Example 28. The device of example 22 (as well as subject matter of one or more of any combination of examples 21-40, 124-126, 137 and 139), wherein said channels includes one of the following:

microchannels, nanochannels, pathways, trenches, grooves, capillaries, or passageways.

Example 29. The device of example 22 (as well as subject matter of one or more of any combination of examples 21-40, 124-126, 137 and 139), wherein said fiber-based substrate comprises one or more of the following materials:

glass microfiber, glass nanofiber, stainless steel microfiber, stainless steel nanofiber, polypropylene microfiber, or polypropylene nanofiber.

Example 30. The device of example 22 (as well as subject matter of one or more of any combination of examples 21-40, 124-126, 137 and 139), further comprising:

a vent in fluidic communication with at least one said fluidic channel; and/or a valve in fluidic communication with at least one said fluidic channel.

Example 31. The device of example 22 (as well as subject matter of one or more of any combination of examples 21-40, 124-126, 137 and 139), wherein said chamber includes one of the following:

cavity, cylinder, cell, recess, compartment, aperture, receptacle, or widened-fluidic channel.

Example 32. The device of example 22 (as well as subject matter of one or more of any combination of examples 21-40, 124-126, 137 and 139), wherein:

said device is configured to be subjected to an active force; and wherein any traveling of the substance on the fluid flow path is a result of the active force incurred on said device.

Example 33. The device of example 32 (as well as subject matter of one or more of any combination of examples 21-40, 124-126, 137 and 139), wherein:

said active force is an angular acceleration, wherein any traveling of the substance on the fluid flow path is a result of the angular acceleration experienced on said device as a result of said device spinning.

Example 34. The device of example 32 (as well as subject matter of one or more of any combination of examples 21-40, 124-126, 137 and 139), wherein said active force is one or more of the following:

external fluid pressure, external gas pressure, internal hydrodynamic pressure, electrokinetic, dielectrophoretic, magnetic, or optical.

Example 35. The device of example 22 (as well as subject matter of one or more of any combination of examples 21-40, 124-126, 137 and 139), wherein:

said device is configured to be subjected to a passive force; and wherein any traveling of the substance on the fluid flow path is a result of the passive force incurred on said device.

Example 36. The device of example 35 (as well as subject matter of one or more of any combination of examples 21-40, 124-126, 137 and 139), wherein said passive force includes one or more of the following: gravity or interfacial surface tension gradients.

Example 37. The device of example 22 (as well as subject matter of one or more of any combination of examples 21-40, 124-126, 137 and 139), wherein said substance is one or more of the following: chemical substance, biochemical substance, or biological substance.

Example 38. The device of example 22 (as well as subject matter of one or more of any combination of examples 21-40, 124-126, 137 and 139), wherein said treated surface or coated surface comprise one or more of the following materials: polymer, glass, or metal.

Example 39. The device of example 38 (as well as subject matter of one or more of any combination of examples 21-40, 124-126, 137 and 139), wherein said polymer material comprises one or more of the following thermoplastic, thermoset, or elastomeric materials:

Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP).

Example 40. The device of example 22 (as well as subject matter of one or more of any combination of examples 21-40, 124-126, 137 and 139), wherein said treated surface or coated surface are compatible with the substance intended to be retained by, received by, and/or released from said fiber-based substrate.

Example 41. A capsule for use with a fluidic device, wherein:

said capsule is configured to encapsulate a fiber-based substrate that is disposed in said capsule, said fiber-based substrate is configured to retain, receive, and/or release a substance;

wherein one of the following configurations apply:

a) said capsule is configured in such a manner as to prevent the retained substance on said fiber-based substrate and within said capsule from contacting other regions of said fluidic device outside said capsule;

b) said fiber-based substrate is configured in such a manner as to prevent the retained substance thereon from contacting other regions of said fluidic device outside said capsule; or c) said fiber-based substrate is configured in such a manner as to prevent the retained substance thereon from contacting other regions of said fluidic device, beyond the perimeter of said fiber-based substrate, during retention of said substance on said non-porous fiber-based substrate.

Example 42. A fluidic device configured for use with said capsule of example 41 (as well as subject matter of one or more of any combination of examples 41-68, 127-129, 132-133, 138 and 140), and for retaining, receiving, and/or releasing the substance, said device comprising:

a base;

a chamber disposed in said base; and said capsule is disposed in said chamber.

Example 43. The fluidic device of example 42 (as well as subject matter of one or more of any combination of examples 41-68, 127-129, 132-133, 138 and 140), wherein said base, chamber, and fluidic channels are incompatible with the substance intended to be retained by, received by, and/or released from said fiber-based substrate.

Example 44. The fluidic device of example 42 (as well as subject matter of one or more of any combination of examples 41-68, 127-129, 132-133, 138 and 140), said device further comprising:

fluidic channels disposed on said base wherein said fluidic channels are configured to be in fluidic communication with said capsule in a manner to define a fluid flow path; and said fiber-based substrate, disposed within said capsule, is positioned in the defined fluid flow path, wherein said fiber-based substrate is compatible with the substance intended to be retained by, received by, and/or released from said fiber-based substrate.

Example 45. The fluidic device of example 44 (as well as subject matter of one or more of any combination of examples 41-68, 127-129, 132-133, 138 and 140), wherein said base, chamber, and fluidic channels are incompatible with the substance intended to be retained by, received by, and/or released from said fiber-based substrate.

Example 46. The device of example 42 (as well as subject matter of one or more of any combination of examples 41-68, 127-129, 132-133, 138 and 140), wherein said capsule includes one or more ports, including a first port and/or a second port to provide for the fluidic communication with said fluidic channels.

Example 47. The device of example 46 (as well as subject matter of one or more of any combination of examples 41-68, 127-129, 132-133, 138 and 140), further comprising:

a barrier disposed in said base adjacent to said first port and/or second port, wherein said barrier is compatible with the substance intended to be retained by, received by, and/or released from said fiber-based substrate, wherein said barrier is positioned to protect said incompatible base from contact with the fluid flow at the vicinity of the said first port and/or second port.

Example 48. The device of example 47 (as well as subject matter of one or more of any combination of examples 41-68, 127-129, 132-133, 138 and 140), wherein said barrier is a vapor cover.

Example 49. The device of example 47 (as well as subject matter of one or more of any combination of examples 41-68, 127-129, 132-133, 138 and 140), wherein said barrier comprises one or more of the following materials: polymer, glass, or metal.

Example 50. The device of example 42 (as well as subject matter of one or more of any combination of examples 41-68, 127-129, 132-133, 138 and 140), wherein said base includes one or more of the following:

one or more material layers, microfluidic chip, nanofluidic chip, disk, housing, container, vessel, platform, or any surface or structure that can retain, hold or house said fiber-based substrate, said chamber and said capsule.

Example 51. The device of example 42 (as well as subject matter of one or more of any combination of examples 41-68, 127-129, 132-133, 138 and 140), wherein said channels includes one of the following: microchannels, nanochannels, pathways, trenches, grooves, capillaries, or passageways.

Example 52. The device of example 42 (as well as subject matter of one or more of any combination of examples 41-68, 127-129, 132-133, 138 and 140), wherein said fiber-based substrate comprises one or more of the following materials:

glass microfiber, glass nanofiber, stainless steel microfiber, stainless steel nanofiber, polypropylene microfiber, or polypropylene nanofiber.

Example 53. The device of example 42 (as well as subject matter of one or more of any combination of examples 41-68, 127-129, 132-133, 138 and 140), further comprising:

a vent in fluidic communication with a least one said fluidic channel; and/or a valve in fluidic communication with at least one said fluidic channel.

Example 54. The device of example 42 (as well as subject matter of one or more of any combination of examples 41-68, 127-129, 132-133, 138 and 140), wherein said chamber includes one of the following:

cavity, cylinder, cell, recess, compartment, aperture, receptacle, or widened-fluidic channel Example 55. The device of example 42 (as well as subject matter of one or more of any combination of examples 41-68, 127-129, 132-133, 138 and 140), wherein:

said device is configured to be subjected to an active force; and wherein any traveling of the substance on the fluid flow path is a result of the active force incurred on said device.

Example 56. The device of example 55 (as well as subject matter of one or more of any combination of examples 41-68, 127-129, 132-133, 138 and 140), wherein:

said active force is a centrifugal force, wherein any traveling of the substance on the fluid flow path is a result of the centrifugal force exerted on said device as a result of said device spinning.

Example 57. The device of example 55 (as well as subject matter of one or more of any combination of examples 41-68, 127-129, 132-133, 138 and 140), wherein said active force is one or more of the following:

external fluid pressure, external gas pressure, internal hydrodynamic pressure, electrokinetic, dielectrophoretic, magnetic, or optical.

Example 58. The device of example 42 (as well as subject matter of one or more of any combination of examples 41-68, 127-129, 132-133, 138 and 140), wherein:

said base is configured to be subjected to a passive force; and wherein any traveling of the substance on the fluid flow path is a result of the passive force incurred on said device.

Example 59. The device of example 58 (as well as subject matter of one or more of any combination of examples 41-68, 127-129, 132-133, 138 and 140), wherein said passive force includes one or more of the following: gravity or interfacial surface tension gradients.

Example 60. The device of example 42 (as well as subject matter of one or more of any combination of examples 41-68, 127-129, 132-133, 138 and 140), wherein said substance is one or more of the following chemical substance, biochemical substance, or biological substance.

Example 61. The device of example 42 (as well as subject matter of one or more of any combination of examples 41-68, 127-129, 132-133, 138 and 140), wherein capsule comprises one or more of the following materials: polymer, glass, or metal.

Example 62. The device of example 61 (as well as subject matter of one or more of any combination of examples 41-68, 127-129, 132-133, 138 and 140), wherein said polymer material comprises one or more of the following thermoplastic, thermoset, or elastomeric materials:

Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP).

Example 63. The device of example 42 (as well as subject matter of one or more of any combination of examples 41-68, 127-129, 132-133, 138 and 140), wherein said capsule is compatible with the substance intended to be retained by, received by, and/or released from said fiber-based substrate.

Example 64. The device of example 42 (as well as subject matter of one or more of any combination of examples 41-68, 127-129, 132-133, 138 and 140), further comprising:

a barrier disposed in said base adjacent to an area wherein said capsule establishes communication with said fluidic channels, wherein said barrier is compatible with the substance intended to be retained by, received by, and/or released from said fiber-based substrate, wherein said barrier is positioned to protect said incompatible base from contact with the fluid flow at the vicinity of the communication area.

Example 65. The device of example 64 (as well as subject matter of one or more of any combination of examples 41-68, 127-129, 132-133, 138 and 140), wherein said barrier is a vapor cover.

Example 66. The device of example 64 (as well as subject matter of one or more of any combination of examples 41-68, 127-129, 132-133, 138 and 140), wherein said barrier comprises one or more of the following materials: polymer, glass, or metal.

Example 67. The device according to example 42 (as well as subject matter of one or more of any combination of examples 41-68, 127-129, 132-133, 138 and 140), wherein:

said base provides sufficient volume as to permit an arrangement of multiple of said capsules in series disposed in said base; and individual said capsules, with said fiber-based substrate disposed therein, are positioned in such a manner that said first port and second port of individual said capsules are arranged to enable sequential fluid flow to travel through said arranged capsules within said base.

Example 68. The device according to example 67 (as well as subject matter of one or more of any combination of examples 41-68, 127-129, 132-133, 138 and 140), wherein:

said arrangement includes a vertical alignment in said base or a stacking in said base.

Example 69. A fluidic device configured for use with said capsule of example 41 (as well as subject matter of one or more of any combination of examples 69-93, 130, 134, 138 and 140) and for retaining, receiving, and/or releasing the substance, said device comprising:
a base;
a chamber disposed in said base; and
said capsule is configured to be in fluidic communication with said chamber.

Example 70. The device of example 69 (as well as subject matter of one or more of any combination of examples 69-93, 130, 134, 138 and 140), said base, chamber, and fluidic channels are incompatible with the substance intended to be retained by, received by, and/or released from said fiber-based substrate.

Example 71. The fluidic device of example 69 (as well as subject matter of one or more of any combination of examples 69-93, 130, 134, 138 and 140), wherein:
said capsule is configured to be attachable for connecting in mechanical communication with said base;
said capsule is configured to be both attachable for connecting in mechanical communication with said base as well as being detachable for disconnecting from mechanical communication with said base;
said capsule is configured to be fixedly disposed to said base; or
said capsule is configured to be partially encapsulated by said base;
fluidic channels disposed on said base wherein said fluidic channels are configured to be in fluidic communication with said capsule in a manner to define the fluid flow path; and
said fiber-based substrate is disposed within said capsule positioned in the defined fluid flow path, wherein said fiber-based substrate is configured to retain, receive and/or release a substance thereon and be compatible with the substance intended to be retained by, received by, or released from said fiber-based substrate.

Example 72. The device of example 71 (as well as subject matter of one or more of any combination of examples 69-93, 130, 134, 138 and 140), said base, chamber, and fluidic channels are incompatible with the substance intended to be retained by, received by, and/or released from said fiber-based substrate.

Example 73. The device of example 69 (as well as subject matter of one or more of any combination of examples 69-93, 130, 134, 138 and 140), wherein:
said capsule includes a first port in fluidic communication with said fluidic channels that enables a fluid flow to travel to or from said capsule; or
said capsule is in fluidic communication with a first access and a second access of said chamber for said capsule to be in fluidic communication with said fluidic channels that enables a fluid flow to travel to or from said capsule.

Example 74. The device of example 73 (as well as subject matter of one or more of any combination of examples 69-93, 130, 134, 138 and 140), further comprising:
a barrier disposed in said base adjacent to said first port, wherein said barrier is compatible with the substance intended to be retained by, received by, and/or released from said fiber-based substrate, wherein said barrier is positioned to protect said incompatible base from contact with the fluid flow at the vicinity of the said first port.

Example 75. The device of example 74 (as well as subject matter of one or more of any combination of examples 69-93, 130, 134, 138 and 140), wherein said barrier is a vapor cover.

Example 76. The device of example 74 (as well as subject matter of one or more of any combination of examples 69-93, 130, 134, 138 and 140), wherein said barrier comprises one or more of the following materials: polymer, glass, or metal.

Example 77. The device of example 69 (as well as subject matter of one or more of any combination of examples 69-93, 130, 134, 138 and 140), wherein said base includes one of the following:
one or more material layers, microfluidic chip, nanofluidic chip, disk, housing, container, vessel, platform, or any surface or structure that can retain, hold or house said fiber-based substrate, said chamber and said capsule.

Example 78. The device of example 69 (as well as subject matter of one or more of any combination of examples 69-93, 130, 134, 138 and 140), wherein said channels includes one of the following:
microchannels, nanochannels, pathways, trenches, grooves, capillaries, or passageways.

Example 79. The device of example 69 (as well as subject matter of one or more of any combination of examples 69-93, 130, 134, 138 and 140), wherein said fiber-based substrate comprises one or more of the following materials:
glass microfiber, glass nanofiber, stainless steel microfiber, stainless steel nanofiber, polypropylene microfiber, or polypropylene nanofiber.

Example 80. The device of example 69 (as well as subject matter of one or more of any combination of examples 69-93, 130, 134, 138 and 140), further comprising:
a vent in fluidic communication with at least one said fluidic channel; and/or a valve in fluidic communication with at least one said fluidic channel.

Example 81. The device of example 69 (as well as subject matter of one or more of any combination of examples 69-93, 130, 134, 138 and 140), wherein said chamber includes one of the following:
cavity, cylinder, cell, recess, compartment, aperture, receptacle, or widened-fluidic channel.

Example 82. The device of example 69 (as well as subject matter of one or more of any combination of examples 69-93, 130, 134, 138 and 140), wherein:
said device is configured to be subjected to an active force; and
wherein any traveling of the substance on the fluid flow path is a result of the active force incurred on said device.

Example 83. The device of example 82 (as well as subject matter of one or more of any combination of examples 69-93, 130, 134, 138 and 140), wherein:
said active force is an angular acceleration, wherein any traveling of the substance on the fluid flow path is a result of the angular acceleration experienced on said device as a result of said device spinning.

Example 84. The device of example 82 (as well as subject matter of one or more of any combination of examples 69-93, 130, 134, 138 and 140), wherein said active force is one or more of the following:
external fluid pressure, external gas pressure, internal hydrodynamic pressure, electrokinetic, dielectrophoretic, magnetic, or optical.

Example 85. The device of example 69 (as well as subject matter of one or more of any combination of examples 69-93, 130, 134, 138 and 140), wherein:

said base is configured to be subjected to a passive force; and wherein any traveling of the substance on the fluid flow path is a result of the passive force incurred on said device.

Example 86. The device of 85 (as well as subject matter of one or more of any combination of examples 69-93, 130, 134, 138 and 140), wherein said passive force includes one or more of the following: gravity or interfacial surface tension gradients.

Example 87. The device of example 69 (as well as subject matter of one or more of any combination of examples 69-93, 130, 134, 138 and 140), wherein said substance is one or more of the following chemical substance, biochemical substance, or biological substance.

Example 88. The device of example 69 (as well as subject matter of one or more of any combination of examples 69-93, 130, 134, 138 and 140), wherein capsule comprises one or more of the following materials:

polymer, glass, or metal.

Example 89. The device of example 88 (as well as subject matter of one or more of any combination of examples 69-93, 130, 134, 138 and 140), wherein said polymer material comprises one or more of the following thermoplastic, thermoset, or elastomeric materials:

Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP).

Example 90. The device of example 69 (as well as subject matter of one or more of any combination of examples 69-93, 130, 134, 138 and 140), wherein said capsule is compatible with the substance intended to be retained by, received by, and/or released from said fiber-based substrate.

Example 91. The device of example 69 (as well as subject matter of one or more of any combination of examples 69-93, 130, 134, 138 and 140), further comprising:

a barrier disposed in said base adjacent to an area where said capsule establishes communication with said fluidic channels, wherein said barrier is compatible with the substance intended to be stored or received on said fiber-based substrate, wherein said barrier is positioned to protect said incompatible base from contact with the fluid flow at the vicinity of the communication area.

Example 92. The device of example 91 (as well as subject matter of one or more of any combination of examples 69-93, 130, 134, 138 and 140), wherein said barrier is a vapor cover.

93. The device of example 91 (as well as subject matter of one or more of any combination of examples 69-93, 130, 134, 138 and 140), wherein said barrier comprises one or more of the following materials: polymer, glass, or metal.

Example 94. A fluidic device configured for use with said capsule of example 41 (as well as subject matter of one or more of any combination of examples 94-120, 131, 135, 136, 138 and 140), and for retaining, receiving, and/or releasing the substance, said device comprising:

a base;

a first chamber disposed in said base and a second chamber disposed in said base; and said capsule wherein said capsule is configured to be in fluidic communication with each of said first chamber and second chamber.

Example 95. The fluidic device of example 94 (as well as subject matter of one or more of any combination of examples 94-120, 131, 135, 136, 138 and 140), wherein said base, chamber, and fluidic channels are incompatible with the substance intended to be retained by, received by, and/or released from said fiber-based substrate.

Example 96. The fluidic device of example 94 (as well as subject matter of one or more of any combination of examples 94-120, 131, 135, 136, 138 and 140), wherein:

said capsule is configured to be attachable for connecting in mechanical communication with said base;

said capsule is configured to be both attachable for connecting in communication with said base as well as being detachable for disconnecting from mechanical communication from said base;

said capsule is configured to be fixedly disposed to said base; or said capsule is configured to be partially encapsulated by said base;

fluidic channels disposed on said base wherein said fluidic channels are configured to be in fluidic communication with capsule in a manner to define the fluid flow path; and said fiber-based substrate disposed within said capsule and positioned in the defined fluid flow path, wherein said fiber-based substrate is configured to retain, receive and/or release a substance thereon and be compatible with the substance intended to be retained by, received by, and/or released from said fiber-based substrate.

Example 97. The fluidic device of example 96 (as well as subject matter of one or more of any combination of examples 94-120, 131, 135, 136, 138 and 140), wherein said base, chamber, and fluidic channels are incompatible with the substance intended to be retained by, received by, and/or released from said fiber-based substrate.

Example 98. The device of example 94 (as well as subject matter of one or more of any combination of examples 94-120, 131, 135, 136, 138 and 140), wherein said capsule includes two or more ports, including a first port and second port to provide for the fluidic communication with said first chamber and second chamber, respectively.

Example 99. The device of example 98 (as well as subject matter of one or more of any combination of examples 94-120, 131, 135, 136, 138 and 140), further comprising:

a first barrier disposed in said base adjacent to said first port and a second barrier disposed in said base adjacent to said second port, wherein said first barrier and said second barrier are compatible with the substance intended to be retained by, received by, and/or released from said fiber-based substrate, wherein said first barrier and said second barrier are positioned to protect said incompatible base from contact with the fluid flow at the vicinity of the said first port and second port, respectively.

Example 100. The device of example 99 (as well as subject matter of one or more of any combination of examples 94-120, 131, 135, 136, 138 and 140), wherein said first barrier and said second barrier are a vapor cover, respectively.

Example 101. The device of example 99 (as well as subject matter of one or more of any combination of examples 94-120, 131, 135, 136, 138 and 140), wherein said first barrier and said second barrier comprise one or more of the following materials: polymer, glass, or metal.

Example 102. The device of example 94 (as well as subject matter of one or more of any combination of examples 94-120, 131, 135, 136, 138 and 140), wherein said base includes one of the following:

one or more material layers, microfluidic chip, nanofluidic chip, disk, housing, container, vessel, platform, or any surface or structure that can retain, hold or house said fiber-based substrate, said chamber and said capsule.

Example 103. The device of example 94 (as well as subject matter of one or more of any combination of examples 94-120, 131, 135, 136, 138 and 140), wherein said channels includes one of the following: microchannels, nanochannels, pathways, trenches, grooves, capillaries, or passageways.

Example 104. The device of example 94 (as well as subject matter of one or more of any combination of examples 94-120, 131, 135, 136, 138 and 140), wherein said fiber-based substrate comprises one or more of the following materials:

glass microfiber, glass nanofiber, stainless steel microfiber, stainless steel nanofiber, polypropylene microfiber, or polypropylene nanofiber.

Example 105. The device of example 94 (as well as subject matter of one or more of any combination of examples 94-120, 131, 135, 136, 138 and 140), further comprising:

a vent in fluidic communication with at least one said fluidic channel; and/or a valve in fluidic communication with at least one said fluidic channel.

Example 106. The device of example 94 (as well as subject matter of one or more of any combination of examples 94-120, 131, 135, 136, 138 and 140), wherein said chamber includes one of the following:

cavity, cylinder, cell, recess, compartment, aperture, receptacle, or widened-fluidic channel.

Example 107. The device of example 94 (as well as subject matter of one or more of any combination of examples 94-120, 131, 135, 136, 138 and 140), wherein:

said device is configured to be subjected to an active force; and wherein any traveling of the substance on the fluid flow path is a result of the active force incurred on said device.

Example 108. The device of example 107 (as well as subject matter of one or more of any combination of examples 94-120, 131, 135, 136, 138 and 140), wherein:

said active force is an angular acceleration, wherein any traveling of the substance on the fluid flow path is a result of the angular acceleration experienced on said device as a result of said device spinning.

Example 109. The device of example 107 (as well as subject matter of one or more of any combination of examples 94-120, 131, 135, 136, 138 and 140), wherein said active force is one or more of the following:

external fluid pressure, external gas pressure, internal hydrodynamic pressure, electrokinetic, dielectrophoretic, magnetic, or optical.

Example 110. The device of example 94 (as well as subject matter of one or more of any combination of examples 94-120, 131, 135, 136, 138 and 140), wherein:

said base is configured to be subjected to a passive force; and wherein any traveling of the substance on the fluid flow path is a result of the passive force incurred on said device.

Example 111. The device of 110 (as well as subject matter of one or more of any combination of examples 94-120, 131, 135, 136, 138 and 140), wherein said passive force includes one or more of the following: gravity or interfacial surface tension gradients.

Example 112. The device of example 94 (as well as subject matter of one or more of any combination of examples 94-120, 131, 135, 136, 138 and 140), wherein said substance is one or more of the following: chemical substance, biochemical substance, or biological substance.

Example 113. The device of example 94 (as well as subject matter of one or more of any combination of examples 94-120, 131, 135, 136, 138 and 140), wherein capsule comprises one or more of the following materials:

polymer, glass, or metal.

Example 114. The device of example 113 (as well as subject matter of one or more of any combination of examples 94-120, 131, 135, 136, 138 and 140), wherein said polymer material comprises one or more of the following thermoplastic, thermoset, or elastomeric materials:

Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP).

Example 115. The device of example 94 (as well as subject matter of one or more of any combination of examples 94-120, 131, 135, 136, 138 and 140), wherein said capsule is compatible with the substance intended to be retained by, received by, and/or released from said fiber-based substrate.

Example 116. The device of example 94 (as well as subject matter of one or more of any combination of examples 94-120, 131, 135, 136, 138 and 140), further comprising:

a first barrier disposed in said base adjacent to a first area where said capsule establishes a first communication with said fluidic channels and a second barrier disposed in said base adjacent to a second area where said capsule establishes a second communication with said fluidic channels, wherein said first barrier and said second barrier are compatible with the substance intended to be stored or received on said fiber-based substrate, wherein said first barrier and said second barrier are positioned to protect said incompatible base from contact with the fluid flow at the vicinity of the first communication area and second communication area, respectively.

Example 117. The device of example 116 (as well as subject matter of one or more of any combination of examples 94-120, 131, 135, 136, 138 and 140), wherein said first barrier and said second barrier are a vapor cover.

Example 118. The device of example 116 (as well as subject matter of one or more of any combination of examples 94-120, 131, 135, 136, 138 and 140), wherein said first barrier and said second barrier comprises one or more of the following materials:

polymer, glass, or metal.

Example 119. The device of example 94 (as well as subject matter of one or more of any combination of examples 94-120, 131, 135, 136, 138 and 140), wherein:

said capsule provides sufficient volume as to permit an alignment of multiple of said fiber-based substrates in series within said capsule; and individual said fiber-based substrates, aligned in series, are positioned in such a manner as to permit enable the fluid flow to sequentially travel through said aligned said fiber-based substrates within said capsule.

Example 120. The device according to example 119 (as well as subject matter of one or more of any combination of examples 94-120, 131, 135, 136, 138 and 140), wherein:

said alignment of said capsules generally coincide with the contour of said capsule in the span between said first port and second port of said capsule.

Example 121. The device of example 9 (as well as subject matter of one or more of any combination of examples 1-20, 121-123, 137 and 139), wherein said glass microfiber or said glass nanofiber comprises one or more of the following materials: soda-lime, borosilicate, or quartz.

Example 122. The device of example 1 (as well as subject matter of one or more of any combination of examples 1-20, 121-123, 137 and 139), wherein said preventing of the retained substance is provided by capillary action of said fiber based substrate.

Example 123. The device of example 1 (as well as subject matter of one or more of any combination of examples 1-20, 121-123, 137 and 139), wherein said preventing of the retained substance avoids unintended transfer or movement of the substance from said fiber-based substrate.

Example 124. The device of example 29 (as well as subject matter of one or more of any combination of examples 21-40, 124-126, 137 and 139), wherein said glass microfiber or said glass nanofiber comprises one or more of the following materials: soda-lime, borosilicate, or quartz.

Example 125. The device of example 21 (as well as subject matter of one or more of any combination of examples 21-40, 124-126, 137 and 139), wherein said preventing of the retained substance is provided by capillary action of said fiber-based substrate.

Example 126. The device of example 21 (as well as subject matter of one or more of any combination of examples 21-40, 124-126, 137 and 139), wherein said preventing of the retained substance avoids unintended transfer or movement of the substance from said fiber-based substrate.

Example 127. The device of example 52 (as well as subject matter of one or more of any combination of examples 41-68, 127-129, 132-133, 138 and 140), wherein said glass microfiber or said glass nanofiber comprises one or more of the following materials: soda-lime, borosilicate, or quartz.

Example 128. The device of example 41 (as well as subject matter of one or more of any combination of examples 41-68, 127-129, 132-133, 138 and 140), wherein said preventing of the retained substance is provided by capillary action of said fiber-based substrate.

Example 129. The device of example 41 (as well as subject matter of one or more of any combination of examples 41-68, 127-129, 132-133, 138 and 140), wherein said preventing of the retained substance avoids unintended transfer or movement of the substance from said fiber-based substrate.

Example 130. The device of example 79 (as well as subject matter of one or more of any combination of examples 69-93, 130, 134, 138 and 140), wherein said glass microfiber or said glass nanofiber comprises one or more of the following materials:
soda-lime, borosilicate, or quartz.

Example 131. The device of example 104 (as well as subject matter of one or more of any combination of examples 94-120, 131, 135, 136, 138 and 140), wherein said glass microfiber or said glass nanofiber comprises one or more of the following materials:
soda-lime, borosilicate, or quartz.

Example 132. The device of example 42 (as well as subject matter of one or more of any combination of examples 41-68, 127-129, 132-133, 138 and 140), wherein said capsule includes one of the following: container, repository, receptacle, or holder.

Example 133. The device of example 67 (as well as subject matter of one or more of any combination of examples 41-68, 127-129, 132-133, 138 and 140), wherein said capsule includes one of the following: container, repository, receptacle, or holder.

Example 134. The device of example 69 (as well as subject matter of one or more of any combination of examples 69-93, 130, 134, 138 and 140), wherein said capsule includes one of the following: container, repository, receptacle, or holder.

Example 135. The device of example 94 (as well as subject matter of one or more of any combination of examples 94-120, 131, 135, 136, 138 and 140), wherein said capsule includes one of the following: container, repository, receptacle, or holder.

Example 136. The device of example 119 (as well as subject matter of one or more of any combination of examples 94-120, 131, 135, 136, 138 and 140), wherein said capsule includes one of the following: container, repository, receptacle, or holder.

Example 137. The device of any one of examples 1, 8, 21, or 28 (as well as subject matter of one or more of any combination of examples 1-20, 21-40, 121-126, 137 and 139), wherein said chamber is fluidic communication with one or more of the following:
  a sample preparation chamber disposed in said base;
  a liquid sample inlet disposed in said base;
  a vent disposed in said base;
  an integrated solid phase extraction (SPE) microcolumn disposed in said base;
  a waste chamber disposed in said base;
  an optofluidic valve disposed in said base; or
  a metering chamber disposed in said base.

Example 138. The device of any one of examples 41, 42, 43, 51, 69, 70, 78, 94, 95, and 103 (as well as subject matter of one or more of any combination of examples 41-120, 127-136, 138 and 140), wherein said capsule is fluidic communication with one or more of the following:
  a sample preparation chamber disposed in said base;
  a liquid sample inlet disposed in said base;
  a vent disposed in said base;
  an integrated solid phase extraction (SPE) microcolumn disposed in said base;
  a waste chamber disposed in said base; or
  an optofluidic valve disposed in said base; or
  a metering chamber disposed in said base.

Example 139. The device of any one of examples 1, 8, 21, or 28 (as well as subject matter of one or more of any combination of examples 1-20, 21-40, 121-126, 137 and 139), wherein said chamber is fluidic communication with one or more of the following:
  a buffer inlet disposed in said base;
  a buffer chamber vent disposed in said base;
  an optofluidic valve disposed in said base;
  a microvent disposed in said base;
  a sample inlet disposed in said base; or
  a sample detection chamber disposed in said base.

Example 140. The device of any one of examples 41, 42, 43, 51, 69, 70, 78, 94, 95, and 103 (as well as subject matter of one or more of any combination of examples 41-120, 127-136, 138 and 140), wherein said capsule is fluidic communication with one or more of the following:
  a buffer inlet disposed in said base;
  a buffer chamber vent disposed in said base;
  an optofluidic valve disposed in said base;
  a microvent disposed in said base;
  a sample inlet disposed in said base; or
  a sample detection chamber disposed in said base.

Example 141. A method of using a chamber for use with a fluidic device, said method comprising:

retaining a substance on a fiber-based substrate, receiving the substance on said fiber-based substrate, and/or releasing a substance from the fiber-based substrate;

wherein said fiber-based substrate is housed in said chamber; and preventing the retained substance thereon said fiber-based substrate from contacting other regions of said fluidic device, beyond the perimeter of said fiber-based substrate, during retention of said substance on said fiber-based substrate.

Example 142. The method of example 141, wherein said preventing of the retained substance is provided by capillary action.

Example 143. The method of example 141, wherein said preventing of the retained substance avoids unintended transfer or movement of the substance from said fiber-based substrate.

Example 144. A method of using a chamber for use with a fluidic device, said method comprising:

retaining a substance on a fiber-based substrate, receiving the substance on said fiber-based substrate, and/or releasing the substance on said fiber-based substrate;

wherein the fiber-based substrate is disposed on an area of said chamber that includes a treated surface or coated surface that is compatible with the substance intended to be retained by, received by, and/or released from said fiber-based substrate; and wherein one of the following steps apply:

a) preventing the retained substance thereon said fiber-based substrate from contacting other regions of said fluidic device, beyond said treated area or said coated area of said chamber, during retention of said substance on said fiber-based substrate; or b) preventing the retained substance thereon said fiber-based substrate from contacting other regions of said fluidic device, beyond the perimeter of said fiber-based substrate, during retention of said substance on said fiber-based substrate.

Example 145. The method of example 144, wherein said preventing of the retained substance is provided by capillary action.

Example 146. The method of example 144, wherein said preventing of the retained substance avoids unintended transfer or movement of the substance from said fiber-based substrate.

Example 147. A method of using a capsule for use with a fluidic device, said method comprising:

retaining a substance on a fiber-based substrate, receiving the substance on said fiber-based substrate, and/or releasing the substance on said fiber-based substrate;

wherein said fiber-based substrate is encapsulated by said capsule; and wherein one of the following steps apply:

a) preventing the retained substance on said fiber-based substrate and within said capsule from contacting other regions of said fluidic device outside said capsule;

b) preventing the retained substance thereon said fiber-based substrate from contacting other regions of said fluidic device outside said capsule; or c) preventing the retained substance thereon from contacting other regions of said fluidic device, beyond the perimeter of said fiber-based substrate, during retention of said substance on said fiber-based substrate.

Example 148. The method of example 147, wherein said preventing of the retained substance is provided by capillary action.

Example 149. The method of example 147, wherein said preventing of the retained substance avoids unintended transfer or movement of the substance from said fiber-based substrate.

Example 150. The method of using any of the devices (structures or systems, or material) or its components or sub-components provided in any one or more of examples 1-140, in whole or in part.

Example 151. The method of manufacturing any of the devices (structures or systems, or material) or its components or sub-components provided in any one or more of examples 1-140, in whole or in part.

Example 152. A non-transitory machine readable medium including instructions for using a chamber or capsule, which when executed by a machine, cause the machine to perform any of the steps or activities provided in any one or more of examples 141-148.

REFERENCES

The devices, systems, apparatuses, modules, compositions, materials, components, computer program products, non-transitory computer readable medium, fluidic or microfluidic devices, bases, microfluidic chips or nanofluidic chips, and methods of various embodiments of the invention disclosed herein may utilize aspects (such as devices, apparatuses, modules, systems, compositions, materials, components, computer program products, non-transitory computer readable medium, fluidic or microfluidic devices, bases, microfluidic chips or nanofluidic chips, and methods) disclosed in the following references, applications, publications and patents and which are hereby incorporated by reference herein in their entirety (and which are not admitted to be prior art with respect to the present invention by inclusion in this section).

1. Musile; et al. The development of paper microfluidic devices for presumptive drug detection. *Anal Methods*. (2015). 7: 8025-8033.
2. Qiao, L.; et al. A colorimetric sensor array based on sulfuric acid assisted $KMnO_4$ fading for detection and identification of pesticides. *Talanta*. (2018). 181: 305-310.
3. Mariet, C.; et al. Microfluidics devices applied to radionuclides separation in acidic media for the nuclear fuel cycle. *Micro and Nano Engineering*. (2019). 3: 7-14.
4. Blackledge, W.; et al. A new facile method to measure cyanide in blood. *Anal Chem*. (2010). 82(10): 4216-4221.
5. ThinXXS A G Microtechnologies. IDEX Health & Science. Microfluidic Systems: Blister solutions.
6. Krauss, S.; et al. Centrifugal microfluidic devices using low-volume reagent storage and inward fluid displacement for presumptive drug detection. *Sensors and Actuators B: Chemical*. (2019). 284: 704-710.
7. Cissell D D, Link J M, Hu J C, Athanasiou K A, "A Modified Hydroxyproline Assay Based on Hydrochloric Acid in Ehrlich's Solution Accurately Measures Tissue Collagen Content", Tissue Engineering. Part C, Methods. 2017; 23(3): 243-250. https://doi.org/10.1089/ten.tec.2017.0018.
8. Zhong H, Marcus S L, Li L, "Microwave-assisted Acid Hydrolysis of Proteins Combined with Liquid Chromatography MALDI MS/MS for Protein Identification", Journal of the American Society for Mass Spectrometry. 2005; 16(4): 471-481. https://doi.org/10.1016/j.jasms.2004.12.017.
9. Cannon J, Lohnes K, Wynne C, Wang Y, Edwards N, Fenselau C, "High-Throughput Middle-Down Analysis Using an Orbitrap", Journal of Proteome Research; 2010. 9(8): 3886-3890. https://doi.org/10.1021/pr1000994.
10. Fenselau C, Laine O, Swatkoski S, "Microwave Assisted Acid Cleavage for Denaturation and Proteolysis of Intact Human Adenovirus", International Journal of Mass Spectrometry. 2011; 301(1-3): 7-11. https://doi.org/10.1016/j.ijms.2010.05.026.

ADDITIONAL REFERENCES

The devices, systems, apparatuses, modules, compositions, materials, components, computer program products, non-transitory computer readable medium, fluidic or microfluidic devices, bases, microfluidic chips or nanofluidic chips, and methods of various embodiments of the invention disclosed herein may utilize aspects (such as devices, apparatuses, modules, systems, compositions, materials, components, computer program products, non-transitory computer readable medium, fluidic or microfluidic devices, bases, microfluidic chips or nanofluidic chips, and methods) disclosed in the following references, applications, publications and patents and which are hereby incorporated by reference herein in their entirety (and which are not admitted to be prior art with respect to the present invention by inclusion in this section).

A. U.S. Utility patent application Ser. No. 17/447,015, entitled "DEVICES AND METHODS FOR EXTRACTION, SEPARATION AND THERMOCYCLING", filed Sep. 7, 2021.
B. U.S. Utility patent application Ser. No. 15/768,115, entitled "DEVICES AND METHODS FOR EXTRACTION, SEPARATION AND THERMOCYCLING", filed Apr. 13, 2018; U.S. Pat. No. 11,135,583, issued Oct. 5, 2021.
C. International Patent Application Serial No. PCT/US2016/056906, entitled "DEVICES AND METHODS FOR EXTRACTION, SEPARATION AND THERMOCYCLING", filed Oct. 13, 2016; Publication No. WO 2017/066485, Apr. 20, 2017.
D. U.S. Utility patent application Ser. No. 16/484,142, entitled "MICRODEVICE FOR DIFFERENTIAL SEPARATION, PURIFICATION AND AMPLIFICATION OF FORENSIC SAMPLES", filed Aug. 7, 2019; Publication No. US-2020-0023366-A1, Jan. 23, 2020.
E. International Patent Application Serial No. PCT/US2018/017213, entitled "MICRODEVICE FOR DIFFERENTIAL SEPARATION, PURIFICATION AND AMPLIFICATION OF FORENSIC SAMPLES", filed Feb. 7, 2018; Publication No. WO 2018/148271, Aug. 16, 2018.
F. U.S. Utility patent application Ser. No. 16/225,527, entitled "DEVICES, SYSTEMS, AND METHODS FOR DETECTING SUBSTANCES", filed Dec. 19, 2018; Publication No. US-2019-0275518-A1, Sep. 12, 2019.
G. U.S. Utility patent application Ser. No. 16/039,184, entitled "METHOD FOR DETECTING NUCLEIC ACIDS BASED ON AGGREGATE FORMATION", filed Jul. 18, 2018.
H. U.S. Utility patent application Ser. No. 13/699,983, entitled "METHOD FOR DETECTING NUCLEIC ACIDS BASED ON AGGREGATE FORMATION", filed Nov. 26, 2012; Publication No. 2013/0203045, Aug. 8, 2013.
I. International Patent Application Serial No. PCT/US2011/038166, entitled "METHOD FOR DETECTING NUCLEIC ACIDS BASED ON AGGREGATE FORMATION", filed May 26, 2011; Publication No. WO 2011/150226, Dec. 1, 2011.
J. U.S. Utility patent application Ser. No. 15/770,413, entitled "DEVICES, SYSTEMS AND METHODS FOR SAMPLE DETECTION", filed Apr. 23, 2018; Publication No. US-2019-0054468-A1, Feb. 21, 2019.
K. International Patent Application Serial No. PCT/US2016/058263, entitled "DEVICES, SYSTEMS AND METHODS FOR SAMPLE DETECTION", filed Oct. 21, 2016; Publication No. WO 2017/070571, Apr. 27, 2017.
L. U.S. Utility patent application Ser. No. 15/770,035, entitled "SYSTEMS, DEVICES AND METHODS FOR ANALYZING AND IDENTIFYING SUBSTANCES", filed Apr. 20, 2018; Publication No. US-2018-0313765-A1, Nov. 1, 2018.
M. International Patent Application Serial No. PCT/US2016/058304, entitled "SYSTEMS, DEVICES AND METHODS FOR ANALYZING AND IDENTIFYING SUBSTANCES", filed Oct. 21, 2016; Publication No. WO 2017/070607, Apr. 27, 2017.
N. U.S. Utility patent application Ser. No. 14/650,743, entitled "FREQUENCY-BASED FILTERING OF MECHANICAL ACTUATION USING FLUIDIC DEVICE", filed Jun. 9, 2015; U.S. Pat. No. 9,987,576, issued Jun. 5, 2018.
O. International Patent Application Serial No. PCT/US2013/074152, entitled "FREQUENCY-BASED FILTERING OF MECHANICAL ACTUATION USING FLUIDIC DEVICE", filed Dec. 10, 2013; Publication No. WO 2014/093360, Jun. 19, 2014.
P. U.S. Utility patent application Ser. No. 14/503,955, entitled "MICROFLUIDIC VALVE SYSTEMS", filed Oct. 1, 2014; Publication No. 2015/0093838, Apr. 2, 2015.
Q. U.S. Utility patent application Ser. No. 13/849,691, entitled "Electrostatic Actuation for Management of Flow in Micro-Total Analysis Systems (u-TAS) and Related Method Thereof", filed Mar. 25, 2013.
R. U.S. Utility patent application Ser. No. 13/294,908, entitled "Electrostatic Actuation for Management of Flow in Micro-Total Analysis Systems (u-TAS) and Related Method Thereof", filed Nov. 11, 2011; U.S. Pat. No. 8,403,294, issued Mar. 26, 2013.
S. U.S. Utility patent application Ser. No. 11/665,326, entitled "Electrostatic Actuation for Management of Flow in Micro Total Analysis Systems and Related Method Thereof", filed Apr. 13, 2007; U.S. Pat. No. 8,056,881, issued Nov. 15, 2011.
T. International Patent Application Serial No. PCT/US2005/036675, entitled "Electrostatic Actuation for Management of Flow in Micro Total Analysis Systems and Related Method Thereof", filed Oct. 13, 2005; Publication No. WO06044458, Apr. 27, 2006.
U. U.S. Utility patent application Ser. No. 13/474,420, entitled "Passive Components for Micro-Fluidic Flow Profile Shaping and Related Method Thereof", filed May 17, 2012; U.S. Pat. No. 9,050,596, issued Jun. 9, 2015.
V. U.S. Utility patent application Ser. No. 12/064,557, entitled "Passive Components for Micro-Fluidic Flow Profile Shaping and Related Method Thereof", filed Feb. 22, 2008; U.S. Pat. No. 8,220,493, issued Jul. 17, 2012.

W. International Patent Application Serial No. PCT/US2006/032717, entitled "Passive Components for Micro-Fluidic Flow Profile Shaping and Related Method Thereof", filed Aug. 23, 2006; Publication No. WO 2007/024829, Mar. 1, 2007.

X. International Patent Application Serial No. PCT/US2012/036105, entitled "METHOD AND SYSTEM FOR HIGH THROUGHPUT OPTICAL AND LABEL FREE DETECTION OF ANALYTES", filed May 2, 2012; Publication No. WO 2012/151268, Nov. 8, 2012.

Y. International Patent Application Serial No. PCT/US2012/036139, entitled "METHOD AND SYSTEM TO DETECT AGGREGATE FORMATION ON A SUBSTRATE", filed May 2, 2012; Publication No. WO 2012/151289, Nov. 8, 2012.

Z. U.S. Utility patent application Ser. No. 13/505,406, entitled "VERSATILE, VISIBLE METHOD FOR DETECTING POLYMERIC ANALYTES", filed May 1, 2012; Publication No. 2013/0084565, Apr. 4, 2013.

AA. U.S. Utility patent application Ser. No. 13/116,659, entitled "METHOD FOR DETECTING NUCLEATED CELLS", filed May 26, 2011; Publication No. 2012/0149587, Jun. 14, 2012.

BB. International Patent Application Serial No. PCT/US2010/002883, entitled "VERSATILE, VISIBLE METHOD FOR DETECTING POLYMERIC ANALYTES", filed Nov. 3, 2010; Publication No. WO 2011/056215, May 12, 2011.

CC. U.S. Utility patent application Ser. No. 12/879,810, entitled "DETECTION OF POLYMERIC ANALYTES", filed Sep. 10, 2010; U.S. Pat. No. 10,656,146, issued May 19, 2020.

DD. International Patent Application Serial No. PCT/US2009/036983, entitled "DETECTION OF POLYMERIC ANALYTES", filed Mar. 12, 2009; Publication No. WO 2009/114709, Sep. 17, 2009.

EE. U.S. Utility patent application Ser. No. 12/892,618, entitled "DNA EXTRACTION USING A PHOTO-POLYMERIZED MONOLITH IN A CAPILLARY", filed Sep. 28, 2010; U.S. Pat. No. 9,044,735, issued Jun. 2, 2015.

FF. U.S. Utility patent application Ser. No. 11/885,181, entitled "Grafted Photo-Polymerized Monolithic Column", filed Aug. 28, 2007; U.S. Pat. No. 7,815,802, issued Oct. 19, 2010.

GG. International Patent Application Serial No. PCT/US2006/006845, entitled "DNA Extraction Using a Photo-Polymerized Monolith in a Capillary", filed Feb. 28, 2006; Publication No. WO06093865, Sep. 8, 2006.

HH. International Patent Application Serial No. PCT/US2010/026791, entitled "MULTIPLE-SAMPLE MICROFLUIDIC CHIP FOR DNA ANALYSIS", filed Mar. 10, 2010; Publication No. WO 2010/141139, Dec. 9, 2010.

II. International Patent Application Serial No. PCT/US2010/026801, entitled "Optical Approach for Microfluidic DNA Electrophoresis Detection", filed Mar. 10, 2010; Publication No. WO 2010/141140, Dec. 9, 2010.

JJ. U.S. Utility patent application Ser. No. 12/090,233, entitled "Integrated Microfluidic Analysis Systems", filed Apr. 14, 2008; U.S. Pat. No. 8,916,375, issued Dec. 23, 2014.

KK. International Patent Application Serial No. PCT/US2006/039809, entitled "Integrated Microfluidic Analysis Systems", filed Oct. 12, 2006; Publication No. WO 2007/047336, Apr. 26, 2007.

LL. U.S. Utility patent application Ser. No. 12/089,320, entitled "Microchip-based Acoustic Trapping or Capture of Cells for Forensic Analysis and Related Method Thereof", filed Apr. 4, 2008; Publication No. 2011/0033922, Feb. 10, 2011.

MM. International Patent Application Serial No. PCT/US2006/038943, entitled "Microchip-based Acoustic Trapping or Capture of Cells for Forensic Analysis and Related Method Thereof", filed Oct. 4, 2006; Publication No. WO 2007/041671, Apr. 12, 2007.

NN. U.S. Utility patent application Ser. No. 11/989,794, entitled "Microdevices for Chemical Sensing and Chemical Actuation", filed Jan. 31, 2008; U.S. Pat. No. 8,343,755, issued Jan. 1, 2013.

OO. International Patent Application Serial No. PCT/US2006/030127, entitled "Microdevices for Chemical Sensing and Chemical Actuation", filed Aug. 1, 2006; Publication No. WO 2007/030240, Mar. 15, 2007.

PP. U.S. Utility patent application Ser. No. 11/793,428, entitled "Use of Microwaves for Thermal and Non-Thermal Applications in Micro and Nanoscale Devices", filed Jan. 7, 2008; Publication No. 2008/0277387, Nov. 13, 2008.

QQ. International Patent Application Serial No. PCT/US2005/046756, entitled "The Use of Microwaves for Thermal and Non-Thermal Applications in Micro and Nanoscale Devices", filed Dec. 22, 2005; Publication No. WO06069305, Jun. 29, 2006.

RR. International Patent Application Serial No. PCT/US2007/088662, entitled "Non-Contact Thermal Control of Small Volume and Related Apparatus Thereof", filed Dec. 21, 2007; Publication No. WO 2008/080106, Jul. 3, 2008.

SS. International Patent Application Serial No. PCT/US2007/083964, entitled "DNA Purification in a Multi-Stage, Multi-Phase Microchip", filed Nov. 7, 2007; Publication No. WO 2008/058204, May 15, 2008.

TT. U.S. Utility patent application Ser. No. 11/884,351, entitled "Nucleic Acid Isolation Methods and Materials and Devices Thereof", filed Aug. 15, 2007; Publication No. 2009/0215124, Aug. 27, 2009.

UU. International Patent Application Serial No. PCT/US2006/005241, entitled "Nucleic Acid Isolation Methods and Materials and Devices Thereof", filed Feb. 15, 2006; Publication No. WO06088907, Aug. 24, 2006.

VV. U.S. Utility patent application Ser. No. 11/664,297, entitled "Localized Control of Thermal Properties on Microdevices and Applications Thereof", filed Mar. 19, 2007; Publication No. 2008/0193961, Aug. 14, 2008.

WW. International Patent Application Serial No. US2005/034674, entitled "Localized Control of Thermal Properties on Microdevices and Applications Thereof", filed Sep. 29, 2005; Publication No. WO06039293, Apr. 13, 2006.

XX. U.S. Utility patent application Ser. No. 10/535,926, entitled "Isolation of Sperm Cells from Other Biological Materials Using Microfabricated Devices and Related Methods Thereof", filed May 23, 2005; Publication No. -060144707, Jul. 6, 2006.

YY. International Patent Application Serial No. US2003/037205, entitled "Isolation of Sperm Cells from Other Biological Materials Using Microfabricated Devices and Related Methods Thereof", filed Nov. 20, 2003; Publication No. WO04046712, Jun. 3, 2004.

ZZ. U.S. Utility patent application Ser. No. 10/530,728, entitled "Methods and Systems for Multiplexing IR-Mediated Heating on a Microchip", filed Apr. 8, 2005; Publication No. 05-0287661, Dec. 29, 2005.

AAA. International Patent Application Serial No. US2003/031806, entitled "Methods and Systems for Multiplexing IR Mediated Heating on a Microchip", filed Oct. 8, 2003; Publication No. WO04033099, Apr. 22, 2004.

BBB. International Patent Application Serial No. US2005/005490, entitled "Method and System for Eluting Cells", filed Feb. 22, 2005; Publication No. WO05079531, Sep. 1, 2005.

CCC. U.S. Utility patent application Ser. No. 10/520,763, entitled "Hybrid Polymers for Functional Tuning of Microfluidic Device Surfaces", filed Jan. 10, 2005; U.S. Pat. No. 7,381,471, issued Jun. 3, 2008.

DDD. International Patent Application Serial No. US2003/022162, entitled "Hybrid Polymers for Functional Tuning of Microfluidic Device Surfaces", filed Jul. 15, 2003; Publication Ser. No. 04/007,582, Jan. 22, 2004.

EEE. U.S. Utility patent application Ser. No. 10/517,980, entitled "Apparatus and Method for Purification of Nucleic Acids", filed Dec. 13, 2004; U.S. Pat. No. 7,534,623, issued May 19, 2009.

FFF. International Patent Application Serial No. US2003/018403, entitled "Apparatus and Method for Purification of Nucleic Acids", filed Jun. 11, 2003; Publication No. WO03104774, Dec. 18, 2003.

GGG. International Patent Application Serial No. US2004/001276, entitled "Method for Microchip and Capillary Detection of Proteins in the Sub-µ G/ML Range", filed Jan. 20, 2004; Publication No. WO 2005/033687, Apr. 14, 2005.

HHH. International Patent Application Serial No. US2003/029249, entitled "Remote Temperature Sensing of Small Volume and Related Apparatus Thereof", filed Sep. 17, 2003; Publication No. WO04027361, Apr. 1, 2004.

III. U.S. Utility patent application Ser. No. 10/664,064, entitled "Remote Temperature Sensing of Small Volume and Related Apparatus Thereof", filed Sep. 17, 2003; Publication No. -0131504-, Jul. 8, 2004.

JJJ. Mohanan N, Montazer Z, Sharma P K, Levin D B. "Microbial and Enzymatic Degradation of Synthetic Plastics", Frontiers in Microbiology. 2020; 11: 580709. doi.org/10/3389/fmicb.2020.580709.

KKK. Thompson, B., et al., "Protein Quantitation from Whole Blood on Polyester-Toner Laser-Printed Microfluidic Discs with Cell Phone Image Analysis", Oct. 26, 2014, pages 1434-1326, XP0553334290, URL:http//www.rsc.org/images/loc/2014/PDFs/Papers/474_0913.pdf.

LLL. Thompson, B., et al., "Inexpensive, rapid prototyping of microfluidic devices using overhead transparencies and a laser print, cute and laminate fabrication method", Nature Protocols, Vol. 10, No. 6, May 14, 2015, pages 875-886.

MMM. U.S. Patent Application Publication No. US 2007/0166721 A1, Phan, B., et al., "Fluidic Circuits, Methods and Apparatus for Use of Whole Blood Samples in Colorimetric Assays", Jul. 19, 2007.

NNN. U.S. Patent Application Publication No. US 2014/0017802 A1, Smith, E., "Method to Identify Chemical Compounds Using Colorimetric Spot Tests", Jan. 16, 2014.

OOO. Choodum, A., et al., "A sol-gel colorimetric sensor for methamphetamine detection", Sensors and Actuators B: Chemical: International Journal Devoted to Research and Development of Physical and Chemical Transducers, Vol. 215, Apr. 14, 2014, pages 553-450.

PPP. Krauss, S., et al., "First-Generation NARCDISC™; Cost-Effective Printed Microdevices for Screening of Narcotics at the Point of Interdiction with Cell Phone Detection", 19$^{th}$ International Conference on Miniaturized Systems for Chemistry and Life Sciences, Oct. 29, 2015, pages 1810-1812.

QQQ. Krauss, S., et al., "Objective Method for Presumptive Field-Testing of Illicit Drug Possession Using Centrifugal Microdevices and Smartphone Analysis", Analytical Chemistry, Vol. 88, No. 17, Sep. 6, 2016, pages 8689-8697.

RRR. Ouyang, Y., et al., "Multilevel Fluidic Flow Control in a Rotationally-Driven Polyester Film Microdevice Created Using Laser Print, Cut and Laminate", Lab on a Chip, The Royal Society of Chemistry, Dec. 16, 2015, Vol. 16, No. 2, pages 377-387.

SSS. US. Patent Application Publication No. US 2013/0295602, A1, Fowler, et al., "Methods, Systems and Devices for Multiple Single-Cell Capturing and Processing Using Microfluidics, Nov. 7, 2013.

TTT. U.S. Patent Application Publication No. US 2013/0004956 A1, Landers, et al., "DNA Analyzer", Jan. 3, 2013.

UUU. U.S. Patent Application Publication No. US 2014/0134631 A1, Clime, et al., "Centrifugal Microfluidic Platform", May 15, 2014.VVV. International Patent Application Serial No. WO 2017/019768 A1, Lee, et al., "Optical Cavity PCR", Feb. 2, 2017.

WWW. U.S. Patent Application Publication No. US 2013/0157381 A1, Pang, et al., "Sample Testing Apparatus and Method", Jun. 20, 2013. We note that this '7381 Patent Application Publication to Pang illustrates a technique other than the centrifugal disk (spinning disk) design of which the teaching is incorporated by reference herein.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A fluidic device, wherein said fluidic device comprises:
a base;
a chamber, which is disposed in said base;
a capsule, which is disposed in said chamber;
a fiber-based substrate, which is disposed in said capsule, wherein said capsule is configured to encapsulate said fiber-based substrate that is disposed in said capsule, wherein said fiber-based substrate includes individual fibers that are themselves are non-porous;
said fiber-based substrate is configured to retain, receive, and/or release a substance;
wherein said fiber-based substrate is configured in such a manner as to prevent the retained substance thereon from contacting other regions of said fluidic device a) outside said capsule or b) beyond the perimeter of said fiber-based substrate, during retention of said substance on said fiber-based substrate; and
wherein said preventing of the retained substance by said fiber-based substrate is provided by capillary action between said non-porous fibers of said fiber-based substrate, wherein said preventing of the retained substance by said fiber-based substrate avoids unintended transfer or movement of the substance from said fiber-based substrate.

2. The fluidic device of claim 1, further comprising:
fluidic channels, which are disposed on said base, and wherein said base, chamber, and fluidic channels are made of a material that is incompatible with the substance intended to be retained by, received by, and/or released from said fiber-based substrate.

3. The fluidic device of claim 2, wherein said capsule is in fluidic communication with one or more of the following:
a sample preparation chamber disposed in said base;
a liquid sample inlet disposed in said base;
a vent disposed in said base;
an integrated solid phase extraction (SPE) microcolumn disposed in said base;
a waste chamber disposed in said base;
an optofluidic valve disposed in said base; or
a metering chamber disposed in said base.

4. The fluidic device of claim 2, wherein said capsule is in fluidic communication with one or more of the following:
a buffer inlet disposed in said base;
a buffer chamber vent disposed in said base;
an optofluidic valve disposed in said base;
a microvent disposed in said base;
a sample inlet disposed in said base; or
a sample detection chamber disposed in said base.

5. The fluidic device of claim 1, said device further comprising:
fluidic channels, which are disposed on said base wherein said fluidic channels are configured to be in fluidic communication with said capsule in a manner to define a fluid flow path; and
wherein said fiber-based substrate, disposed within said capsule, is positioned in the defined fluid flow path, wherein said fiber-based substrate is made of a material that is compatible with the substance intended to be retained by, received by, and/or released from said fiber-based substrate.

6. The fluidic device of claim 5, wherein said base, chamber, and fluidic channels are made of a material that is incompatible with the substance intended to be retained by, received by, and/or released from said fiber-based substrate.

7. The fluidic device of claim 5, wherein said capsule includes one or more ports, including a first port and/or a second port to provide for the fluidic communication with said fluidic channels.

8. The fluidic device of claim 7, further comprising:
a barrier disposed in said base adjacent to said first port and/or second port, wherein said barrier is made of a material that is compatible with the substance intended to be retained by, received by, and/or released from said fiber-based substrate, wherein said barrier is positioned to protect said base which is made of material that is incompatible from contact with the fluid flow path at the vicinity of the said first port and/or second port.

9. The fluidic device of claim 8, wherein said barrier is a vapor cover.

10. The fluidic device of claim 8, wherein said barrier comprises one or more of the following materials: polymer, glass, or metal.

11. The fluidic device of claim 5, further comprising:
a vent in fluidic communication with at least one said fluidic channel; and/or
a valve in fluidic communication with at least one said fluidic channel.

12. The fluidic device of claim 5, wherein:
said device is configured to be subjected to an active force; and
wherein any traveling of the substance on the fluid flow path is a result of the active force incurred on said device.

13. The fluidic device of claim 12, wherein:
said active force is a centrifugal force, wherein any traveling of the substance on the fluid flow path is a result of the centrifugal force exerted on said device as a result of said device spinning.

14. The fluidic device of claim 12, wherein said active force is one or more of the following:

external fluid pressure, external gas pressure, internal hydrodynamic pressure, electrokinetic, dielectrophoretic, magnetic, or optical.

15. The fluidic device of claim 5, wherein:
said base is configured to be subjected to a passive force; and
wherein any traveling of the substance on the fluid flow path is a result of the passive force incurred on said device.

16. The fluidic device of claim 15, wherein said passive force includes one or more of the following: gravity or interfacial surface tension gradients.

17. The fluidic device of claim 5, further comprising:
a barrier disposed in said base adjacent to an area wherein said capsule establishes communication with said fluidic channels, wherein said barrier is made of a material that is compatible with the substance intended to be retained by, received by, and/or released from said fiber-based substrate, wherein said barrier is positioned to protect said base which is made of a material that is incompatible from contact with the fluid flow path at the vicinity of the communication area.

18. The fluidic device of claim 17, wherein said barrier is a vapor cover.

19. The fluidic device of claim 17, wherein said barrier comprises one or more of the following materials: polymer, glass, or metal.

20. The fluidic device according to claim 7, further comprising:
a plurality of said capsule;
said base provides sufficient volume as to permit an arrangement of said plurality of said capsule in series disposed in said base; and
individual capsules of said arrangement of said plurality of said capsule, with said fiber-based substrate disposed therein, are positioned in such a manner that said first port and said second port of said individual capsules of said arrangement of said plurality of said capsule are arranged to enable sequential fluid flow to travel through said arrangement of said plurality of said capsule within said base.

21. The fluidic device according to claim 20, wherein:
said arrangement includes a vertical alignment in said base or a stacking in said base.

22. The fluidic device of claim 20, wherein said capsule includes one of the following: container, repository, receptacle, or holder.

23. The fluidic device of claim 1, wherein said base includes one or more of the following:
one or more material layers, microfluidic chip, nanofluidic chip, disk, housing, container, vessel, platform, or any surface or structure that can retain, hold or house said fiber-based substrate, said chamber and said capsule.

24. The fluidic device of claim 1, wherein said fluidic channels includes one of the following: microchannels, nanochannels, trenches, grooves, capillaries, or passageways.

25. The fluidic device of claim 24, wherein said capsule is in fluidic communication with one or more of the following:
a sample preparation chamber disposed in said base;
a liquid sample inlet disposed in said base;
a vent disposed in said base;
an integrated solid phase extraction (SPE) microcolumn disposed in said base;
a waste chamber disposed in said base;
an optofluidic valve disposed in said base; or
a metering chamber disposed in said base.

26. The fluidic device of claim 24, wherein said capsule is in fluidic communication with one or more of the following:
a buffer inlet disposed in said base;
a buffer chamber vent disposed in said base;
an optofluidic valve disposed in said base;
a microvent disposed in said base;
a sample inlet disposed in said base; or
a sample detection chamber disposed in said base.

27. The fluidic device of claim 1, wherein said non-porous fibers of said fiber-based substrate comprises one or more of the following materials:
glass microfiber, glass nanofiber, stainless steel microfiber, stainless steel nanofiber, polypropylene microfiber, or polypropylene nanofiber.

28. The fluidic device of claim 27, wherein said glass microfiber or said glass nanofiber comprises one or more of the following materials: soda-lime, borosilicate, or quartz.

29. The fluidic device of claim 1, wherein said chamber includes one of the following:
cavity, cylinder, cell, recess, compartment, aperture, receptacle, or widened-fluidic channel, wherein said widened-fluidic channel is wider than said fluid channels.

30. The fluidic device of claim 1, wherein said substance is one or more of the following: chemical substance, biochemical substance, or biological substance.

31. The fluidic device of claim 1, wherein capsule comprises one or more of the following materials: polymer, glass, or metal.

32. The fluidic device of claim 31, wherein said polymer material comprises one or more of the following thermoplastic, thermoset, or elastomeric materials:
Polyethylene (FFPE, HDPE, LDPE), Polypropylene (FLPP), Polytetrafluoroethylene (PTFE), Fluorinated ethylene propylene (FEP), Ethylene tetrafluoroethylene (ETFE), Polyvinyl Chloride (PVC), Polycarbonate (PC), Polyvinylidene (PVDF), Perfluoro alkoxy alkane (PFA), polymethylpentene (PMP), cyclic olefin copolymer (COC), or cyclic olefin polymer (COP).

33. The fluidic device of claim 1, further comprising:
a substance, which is disposed on said fiber-based substrate, wherein said substance is one or more of the following materials: chemical substance, biochemical substance, or biological substance;
wherein said capsule comprises one or more of the following materials: polymer, glass, or metal; and
wherein said material of said capsule is compatible with said material of said substance, which is disposed on said fiber-based substrate.

34. The fluidic device of claim 1, wherein said capsule includes one of the following: container, repository, receptacle, or holder.

35. The fluidic device of claim 1, wherein said capsule is in fluidic communication with one or more of the following:
a sample preparation chamber disposed in said base;
a liquid sample inlet disposed in said base;
a vent disposed in said base;
an integrated solid phase extraction (SPE) microcolumn disposed in said base;
a waste chamber disposed in said base; or
an optofluidic valve disposed in said base; or
a metering chamber disposed in said base.

36. The fluidic device of claim 1, wherein said capsule is in fluidic communication with one or more of the following:
a buffer inlet disposed in said base;

a buffer chamber vent disposed in said base;
an optofluidic valve disposed in said base;
a microvent disposed in said base;
a sample inlet disposed in said base; or
a sample detection chamber disposed in said base.

37. The fluidic device of claim 1, wherein said non-pours fibers are configured as any one of the following structures: mesh, web, screen, network of pores, solid matrix with pores, fabric, or lattice network.

* * * * *